US012719387B2

(12) United States Patent
Inoue et al.

(10) Patent No.: US 12,719,387 B2
(45) Date of Patent: Aug. 25, 2026

(54) POWER CONVERSION DEVICE AND POWER CONVERSION SYSTEM

(71) Applicant: Mitsubishi Electric Corporation, Tokyo (JP)

(72) Inventors: Sadayuki Inoue, Tokyo (JP); Koki Matsumoto, Tokyo (JP); Rutvikanandan Manohar, Tokyo (JP); Yasuhiro Kojima, Tokyo (JP); Keishi Matsuda, Tokyo (JP); Masanobu Koshio, Tokyo (JP); Ken Kurose, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 200 days.

(21) Appl. No.: 18/730,321

(22) PCT Filed: Jan. 31, 2022

(86) PCT No.: PCT/JP2022/003609
§ 371 (c)(1),
(2) Date: Jul. 19, 2024

(87) PCT Pub. No.: WO2023/145074
PCT Pub. Date: Aug. 3, 2023

(65) Prior Publication Data
US 2025/0125745 A1 Apr. 17, 2025

(51) Int. Cl.
*H02J 3/38* (2026.01)
*H02J 3/48* (2026.01)
(Continued)

(52) U.S. Cl.
CPC ........... *H02M 7/5395* (2013.01); *H02J 3/381* (2013.01); *H02J 3/48* (2013.01); *H02M 1/0003* (2021.05);
(Continued)

(58) Field of Classification Search
CPC ............. H02M 1/0003; H02M 1/0009; H02M 1/0012; H02M 1/0025; H02M 1/007;
(Continued)

(56) References Cited

U.S. PATENT DOCUMENTS

| | | | | |
|---|---|---|---|---|
| 2014/0152110 A1* | 6/2014 | Sugimoto | ............... | H02J 3/381 307/66 |
| 2015/0028851 A1 | 1/2015 | Ohori et al. | | |

(Continued)

FOREIGN PATENT DOCUMENTS

| | | |
|---|---|---|
| JP | 6143829 B2 | 6/2017 |
| JP | 2019-176584 A | 10/2019 |
| JP | 6691730 B2 | 5/2020 |

OTHER PUBLICATIONS

International Search Report and Written Opinion mailed on Mar. 29, 2022, received for PCT Application No. PCT/JP2022/003609, filed on Jan. 31, 2022, 08 pages including English Translation.

*Primary Examiner* — Thienvu V Tran
*Assistant Examiner* — Shahzeb K Ahmad
(74) *Attorney, Agent, or Firm* — XSENSUS LLP

(57) ABSTRACT

A power conversion device includes a second DC/AC conversion circuit. The second DC/AC conversion circuit operates as a voltage source for an AC grid based on a command notified from an external controller to a communication interface. A fourth control circuit generates phase information of the grid AC voltage based on an actually measured value of a grid AC voltage output from the second DC/AC conversion circuit to a power distribution grid, and calculates a target AC voltage in a shape of a sinusoidal wave using a frequency command value of the grid AC voltage from the outside and the generated phase information. The fourth control circuit controls an operation of the second DC/AC conversion circuit to compensate for a deviation
(Continued)

between the actually measured value of the grid AC voltage and the target AC voltage.

20 Claims, 33 Drawing Sheets

(51) Int. Cl.

| | |
|---|---|
| ***H02M 1/00*** | (2006.01) |
| ***H02M 3/00*** | (2006.01) |
| ***H02M 7/44*** | (2006.01) |
| ***H02M 7/5395*** | (2006.01) |
| *H02J 101/24* | (2026.01) |

(52) U.S. Cl.
CPC ......... *H02M 1/0025* (2021.05); *H02M 1/007* (2021.05); *H02M 3/00* (2013.01); *H02M 7/44* (2013.01); *H02J 2101/25* (2026.01)

(58) Field of Classification Search
CPC ............ H02M 1/10; H02M 1/12; H02M 1/32; H02M 1/36; H02M 1/42; H02M 7/42; H02M 7/44; H02M 7/48; H02M 7/4815; H02M 7/515; H02M 7/537; H02M 7/5395; H02M 3/00; H02J 3/381; H02J 3/48; H02J 2101/25
See application file for complete search history.

(56) References Cited

U.S. PATENT DOCUMENTS

| | | | | |
|---|---|---|---|---|
| 2016/0134202 | A1 | 5/2016 | Lu et al. | |
| 2017/0047861 | A1 * | 2/2017 | Sakimoto | H02M 7/5395 |
| 2020/0099315 | A1 * | 3/2020 | Lee | H02M 7/53871 |
| 2021/0194383 | A1 * | 6/2021 | Tsuruma | H02M 7/53871 |
| 2021/0288592 | A1 * | 9/2021 | Kouno | H02M 7/537 |
| 2023/0087529 | A1 * | 3/2023 | Suzuki | H02J 3/381 700/286 |

* cited by examiner

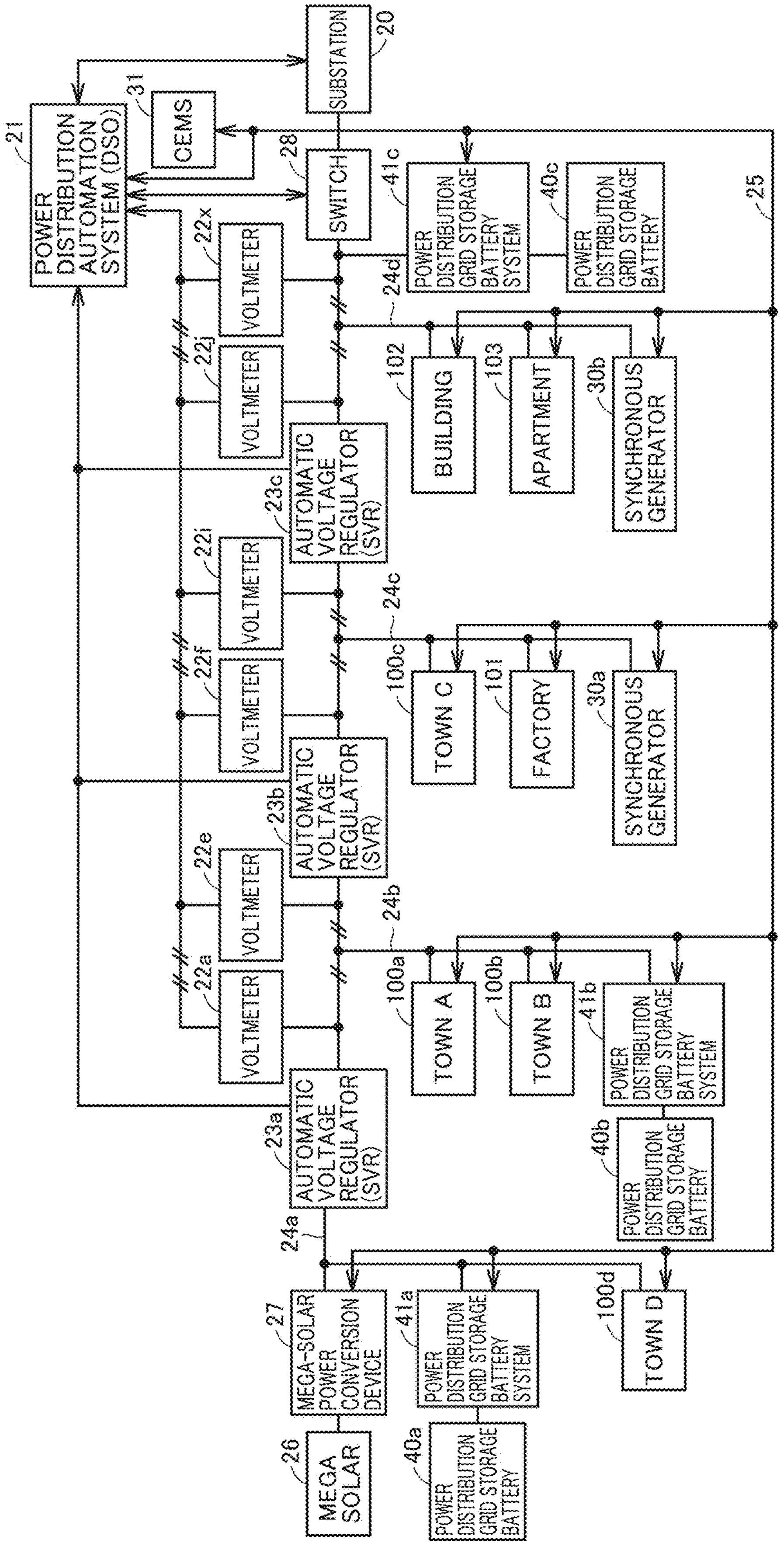

FIG.1
SUBSTATION
20
POWER DISTRIBUTION AUTOMATION SYSTEM (DSO)
21
CEMS
31
SWITCH
28
POWER DISTRIBUTION GRID STORAGE BATTERY SYSTEM
41c
POWER DISTRIBUTION GRID STORAGE BATTERY
40c
25
VOLTMETER
22x
VOLTMETER
22j
24d
BUILDING
102
APARTMENT
103
SYNCHRONOUS GENERATOR
30b
AUTOMATIC VOLTAGE REGULATOR (SVR)
23c
VOLTMETER
22i
VOLTMETER
22f
24c
TOWN C
100c
FACTORY
101
SYNCHRONOUS GENERATOR
30a
AUTOMATIC VOLTAGE REGULATOR (SVR)
23b
VOLTMETER
22e
VOLTMETER
22a
24b
TOWN A
100a
TOWN B
100b
POWER DISTRIBUTION GRID STORAGE BATTERY SYSTEM
41b
POWER DISTRIBUTION GRID STORAGE BATTERY
40b
AUTOMATIC VOLTAGE REGULATOR (SVR)
23a
24a
MEGA-SOLAR POWER CONVERSION DEVICE
27
POWER DISTRIBUTION GRID STORAGE BATTERY SYSTEM
41a
TOWN D
100d
MEGA SOLAR
26
POWER DISTRIBUTION GRID STORAGE BATTERY
40a

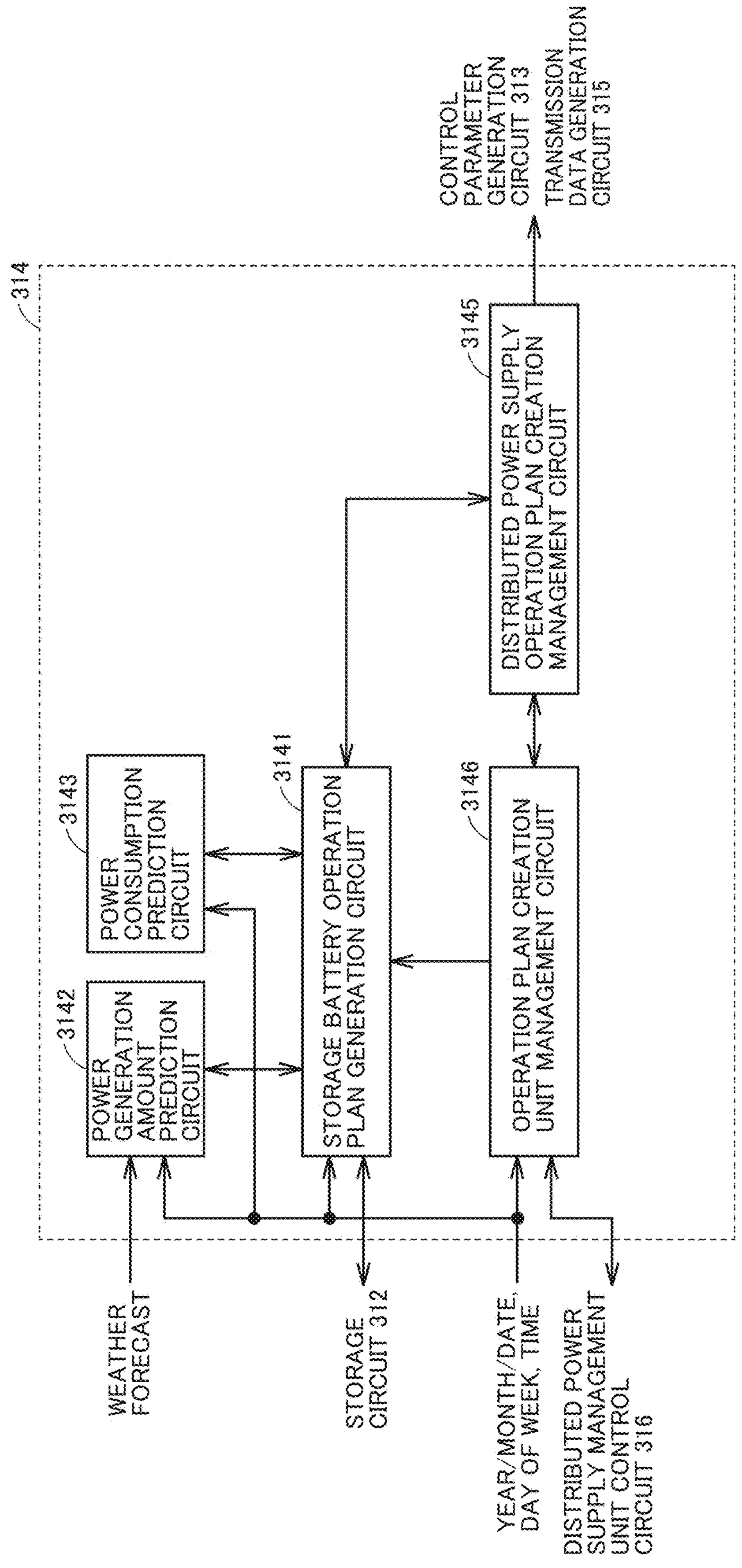

FIG.4
314
3142
POWER GENERATION AMOUNT PREDICTION CIRCUIT
3143
POWER CONSUMPTION PREDICTION CIRCUIT
3141
STORAGE BATTERY OPERATION PLAN GENERATION CIRCUIT
3146
OPERATION PLAN CREATION UNIT MANAGEMENT CIRCUIT
3145
DISTRIBUTED POWER SUPPLY OPERATION PLAN CREATION MANAGEMENT CIRCUIT
CONTROL PARAMETER GENERATION CIRCUIT 313
TRANSMISSION DATA GENERATION CIRCUIT 315
WEATHER FORECAST
STORAGE CIRCUIT 312
YEAR/MONTH/DATE, DAY OF WEEK, TIME
DISTRIBUTED POWER SUPPLY MANAGEMENT UNIT CONTROL CIRCUIT 316

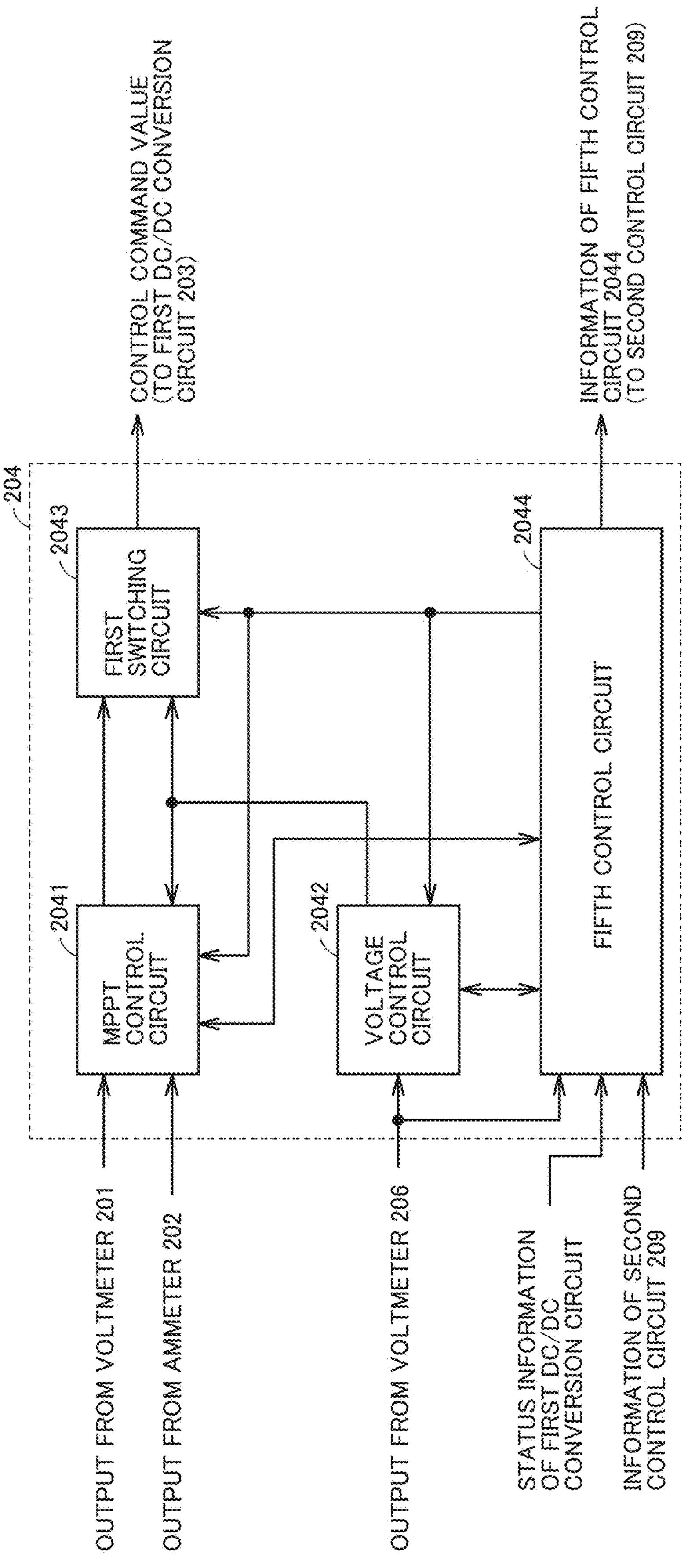

FIG.7
204
2041
MPPT CONTROL CIRCUIT
2042
VOLTAGE CONTROL CIRCUIT
2043
FIRST SWITCHING CIRCUIT
2044
FIFTH CONTROL CIRCUIT
OUTPUT FROM VOLTMETER 201
OUTPUT FROM AMMETER 202
OUTPUT FROM VOLTMETER 206
STATUS INFORMATION OF FIRST DC/DC CONVERSION CIRCUIT
INFORMATION OF SECOND CONTROL CIRCUIT 209
CONTROL COMMAND VALUE (TO FIRST DC/DC CONVERSION CIRCUIT 203)
INFORMATION OF FIFTH CONTROL CIRCUIT 2044 (TO SECOND CONTROL CIRCUIT 209)

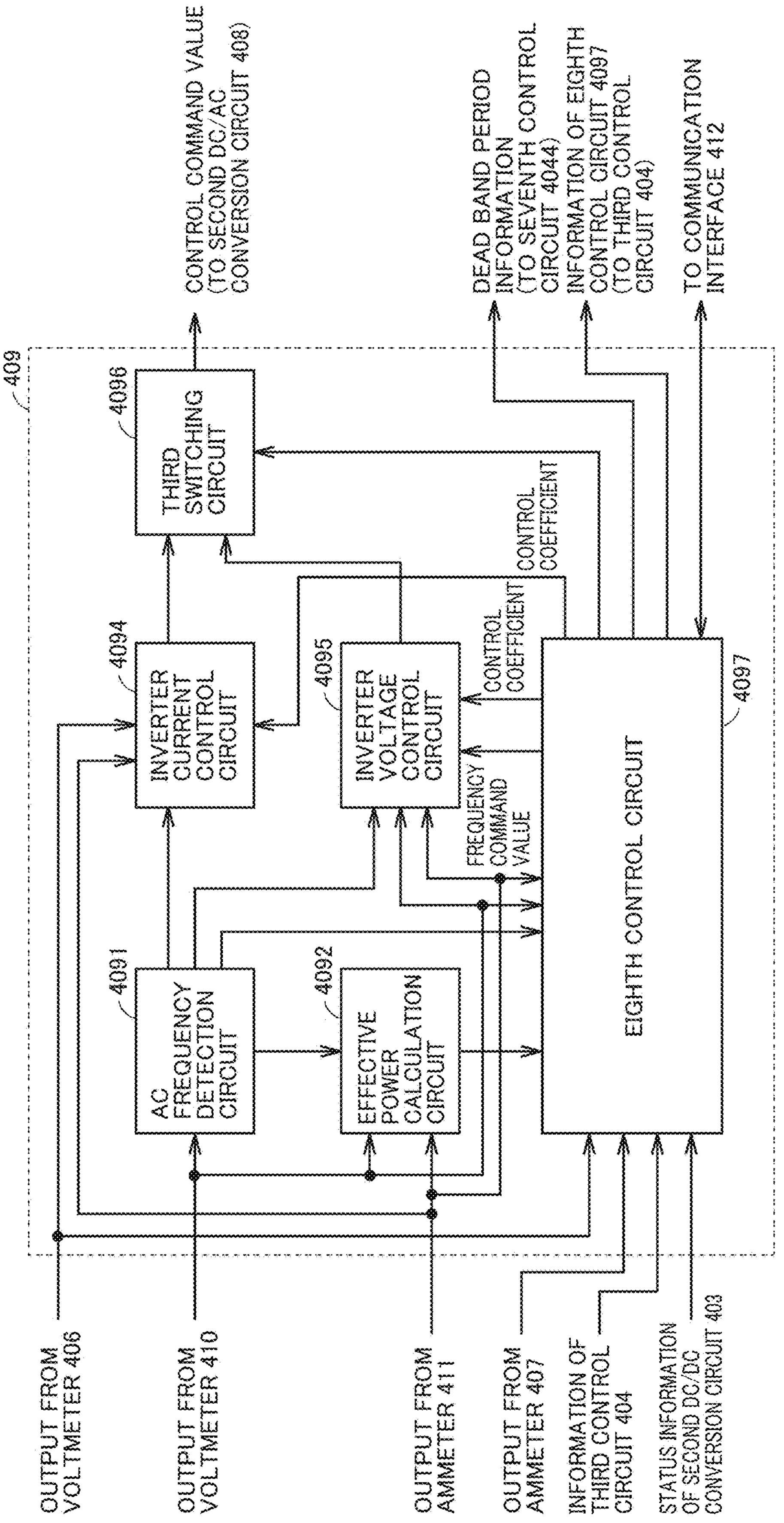

FIG.10
OUTPUT FROM VOLTMETER 406
OUTPUT FROM VOLTMETER 410
OUTPUT FROM AMMETER 411
OUTPUT FROM AMMETER 407
INFORMATION OF THIRD CONTROL CIRCUIT 404
STATUS INFORMATION OF SECOND DC/DC CONVERSION CIRCUIT 403
409
4091
AC FREQUENCY DETECTION CIRCUIT
4092
EFFECTIVE POWER CALCULATION CIRCUIT
4094
INVERTER CURRENT CONTROL CIRCUIT
4095
INVERTER VOLTAGE CONTROL CIRCUIT
4096
THIRD SWITCHING CIRCUIT
4097
EIGHTH CONTROL CIRCUIT
FREQUENCY COMMAND VALUE
CONTROL COEFFICIENT
CONTROL COEFFICIENT
CONTROL COMMAND VALUE (TO SECOND DC/AC CONVERSION CIRCUIT 408)
DEAD BAND PERIOD INFORMATION (TO SEVENTH CONTROL CIRCUIT 4044)
INFORMATION OF EIGHTH CONTROL CIRCUIT 4097 (TO THIRD CONTROL CIRCUIT 404)
TO COMMUNICATION INTERFACE 412

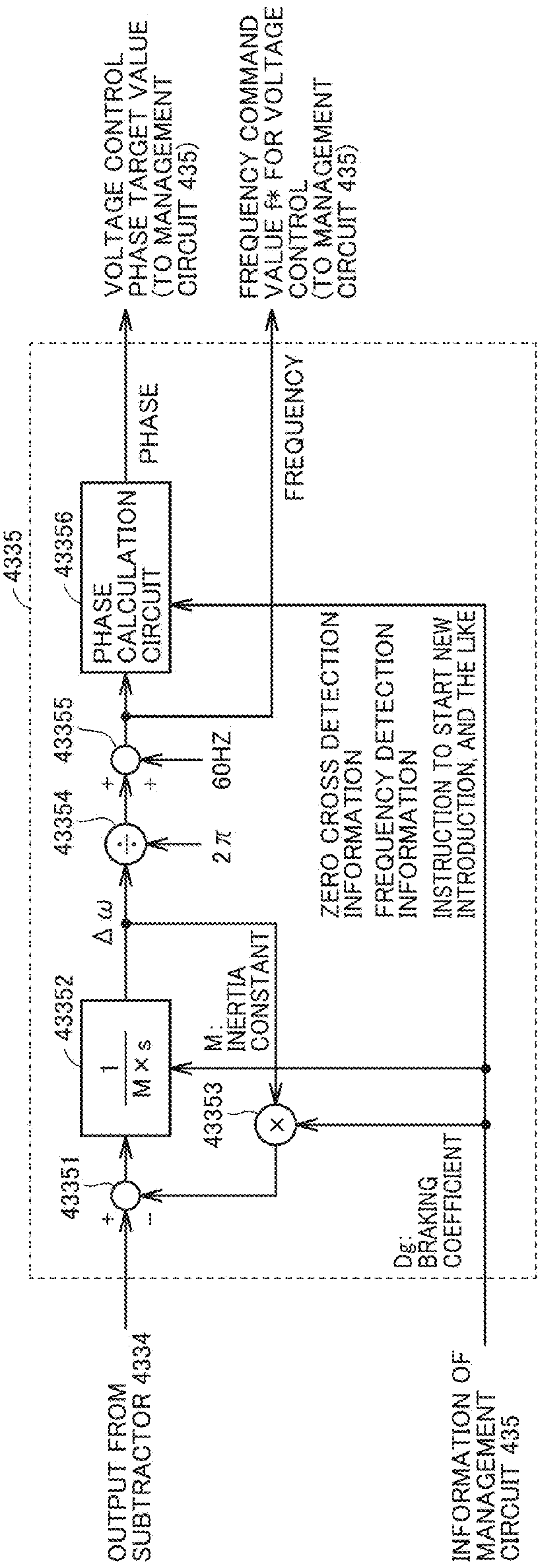

FIG.16
OUTPUT FROM SUBTRACTOR 4334
INFORMATION OF MANAGEMENT CIRCUIT 435
4335
43351
+
-
43352
1
M × s
43353
×
M: INERTIA CONSTANT
Dg: BRAKING COEFFICIENT
Δω
43354
÷
2π
43355
+
+
60HZ
43356
PHASE CALCULATION CIRCUIT
PHASE
FREQUENCY
ZERO CROSS DETECTION INFORMATION
FREQUENCY DETECTION INFORMATION
INSTRUCTION TO START NEW INTRODUCTION, AND THE LIKE
VOLTAGE CONTROL PHASE TARGET VALUE (TO MANAGEMENT CIRCUIT 435)
FREQUENCY COMMAND VALUE f* FOR VOLTAGE CONTROL (TO MANAGEMENT CIRCUIT 435)

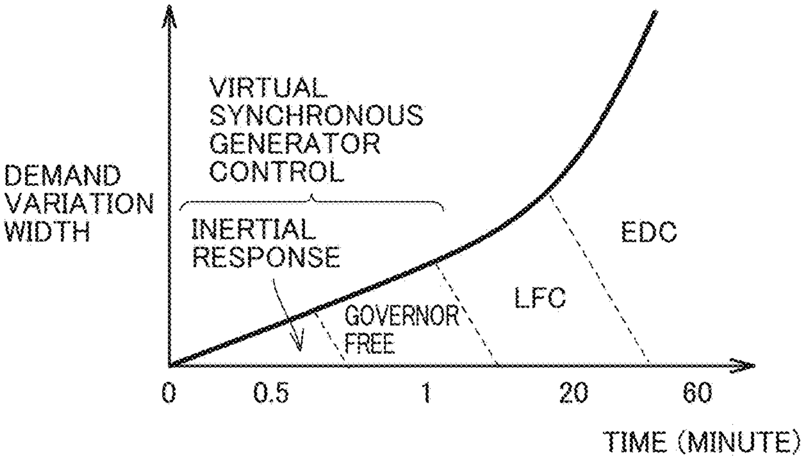

FIG.17

DEMAND VARIATION WIDTH

VIRTUAL SYNCHRONOUS GENERATOR CONTROL

INERTIAL RESPONSE

GOVERNOR FREE

LFC

EDC 0 0.5 1 20 60

TIME (MINUTE)

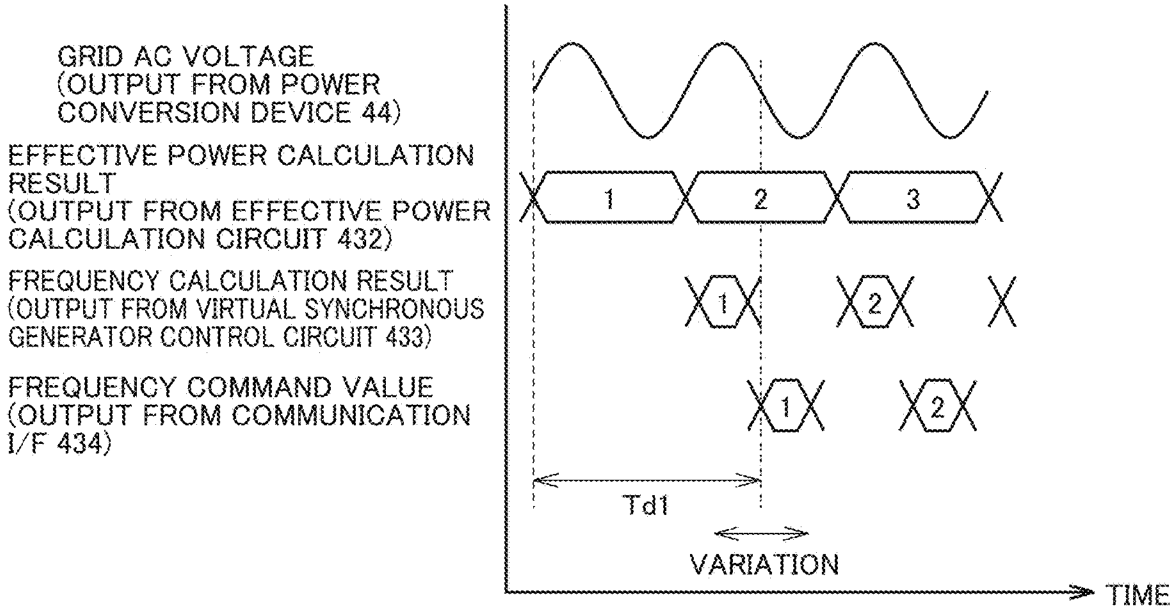

FIG.18

GRID AC VOLTAGE (OUTPUT FROM POWER CONVERSION DEVICE 44)

EFFECTIVE POWER CALCULATION RESULT (OUTPUT FROM EFFECTIVE POWER CALCULATION CIRCUIT 432)

FREQUENCY CALCULATION RESULT (OUTPUT FROM VIRTUAL SYNCHRONOUS GENERATOR CONTROL CIRCUIT 433)

FREQUENCY COMMAND VALUE (OUTPUT FROM COMMUNICATION I/F 434)

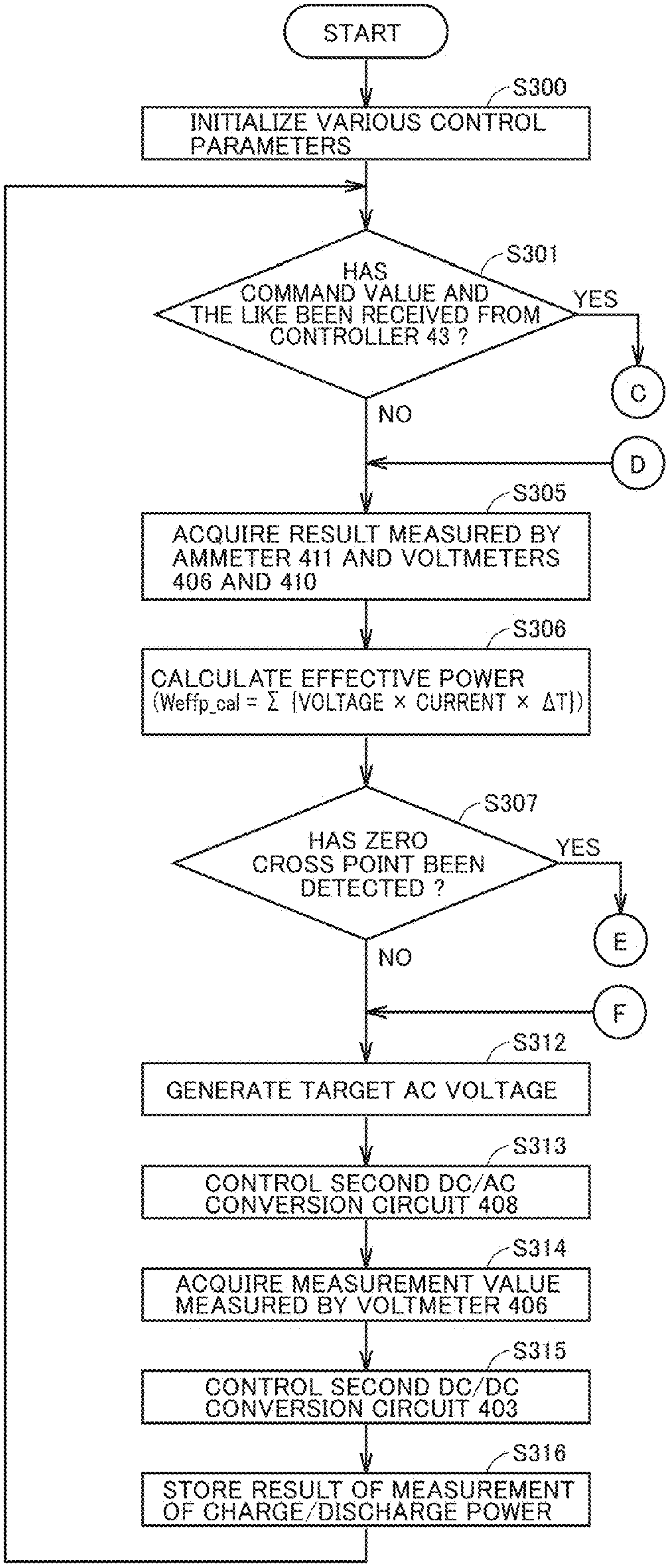

FIG.27A

START

S300 INITIALIZE VARIOUS CONTROL PARAMETERS

S301 HAS COMMAND VALUE AND THE LIKE BEEN RECEIVED FROM CONTROLLER 43 ?
YES → C
NO

D

S305 ACQUIRE RESULT MEASURED BY AMMETER 411 AND VOLTMETERS 406 AND 410

S306 CALCULATE EFFECTIVE POWER (Weffp_cal = Σ {VOLTAGE × CURRENT × ΔT})

S307 HAS ZERO CROSS POINT BEEN DETECTED ?
YES → E
NO

F

S312 GENERATE TARGET AC VOLTAGE

S313 CONTROL SECOND DC/AC CONVERSION CIRCUIT 408

S314 ACQUIRE MEASUREMENT VALUE MEASURED BY VOLTMETER 406

S315 CONTROL SECOND DC/DC CONVERSION CIRCUIT 403

S316 STORE RESULT OF MEASUREMENT OF CHARGE/DISCHARGE POWER

FREQUENCY COMMAND VALUE f*
ΔT
40956
409551
409552
409553
409554
409555
409556
409557
409558
409559
409560
ω*
Δθ
2π
TRUNCATION CIRCUIT
REGISTER
SINUSOIDAL WAVE TABLE
VOLTAGE COMMAND VALUE V*
VTr
TO SUBTRACTOR 40952

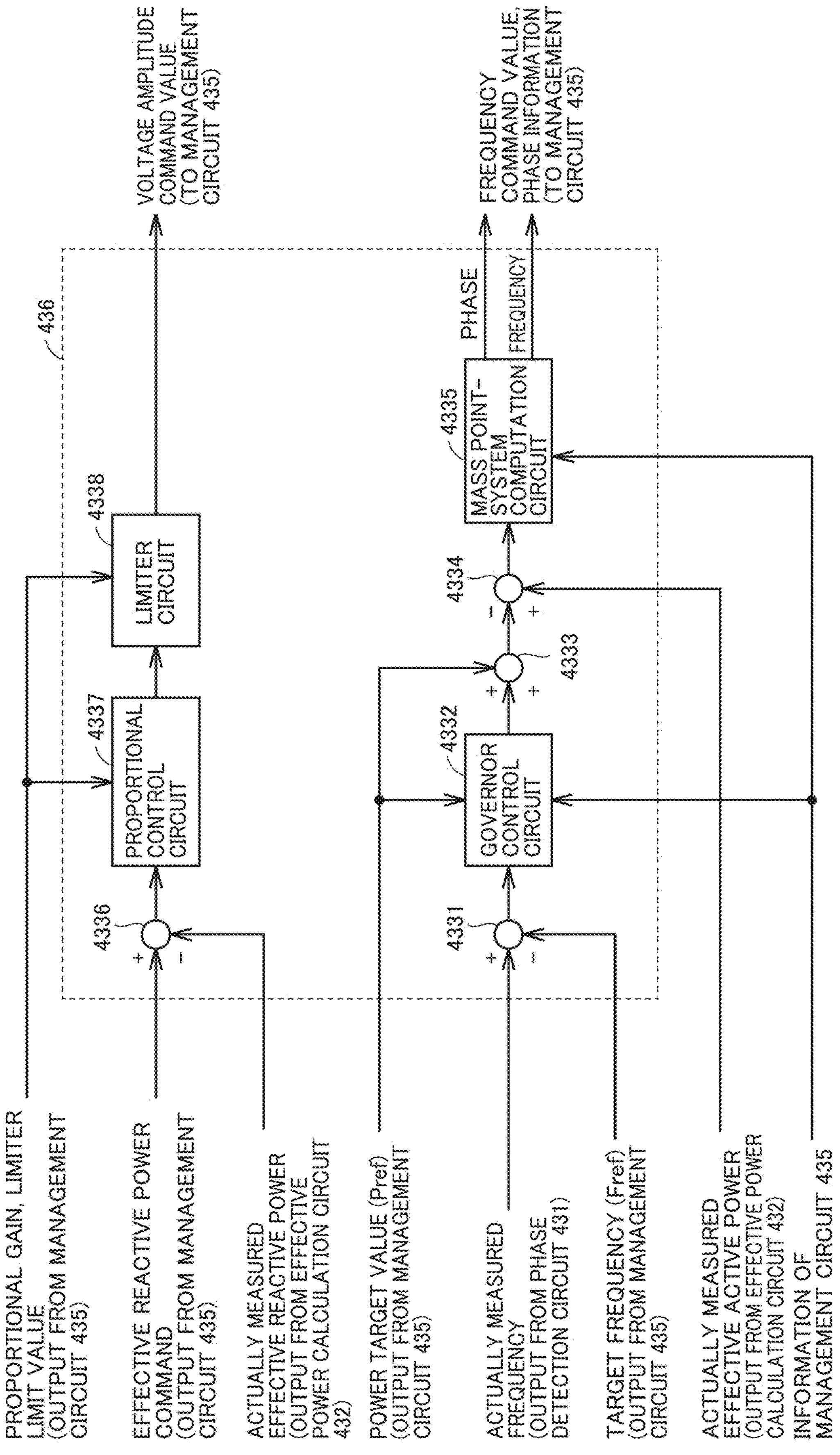

FIG.31
PROPORTIONAL GAIN, LIMITER LIMIT VALUE (OUTPUT FROM MANAGEMENT CIRCUIT 435)
EFFECTIVE REACTIVE POWER COMMAND (OUTPUT FROM MANAGEMENT CIRCUIT 435)
ACTUALLY MEASURED EFFECTIVE REACTIVE POWER (OUTPUT FROM EFFECTIVE POWER CALCULATION CIRCUIT 432)
POWER TARGET VALUE (Pref) (OUTPUT FROM MANAGEMENT CIRCUIT 435)
ACTUALLY MEASURED FREQUENCY (OUTPUT FROM PHASE DETECTION CIRCUIT 431)
TARGET FREQUENCY (Fref) (OUTPUT FROM MANAGEMENT CIRCUIT 435)
ACTUALLY MEASURED EFFECTIVE ACTIVE POWER (OUTPUT FROM EFFECTIVE POWER CALCULATION CIRCUIT 432)
INFORMATION OF MANAGEMENT CIRCUIT 435
436
4336
+
-
4337
PROPORTIONAL CONTROL CIRCUIT
4338
LIMITER CIRCUIT
VOLTAGE AMPLITUDE COMMAND VALUE (TO MANAGEMENT CIRCUIT 435)
4331
+
-
4332
GOVERNOR CONTROL CIRCUIT
+
+
4333
4334
-
+
4335
MASS POINT-SYSTEM COMPUTATION CIRCUIT
PHASE
FREQUENCY
FREQUENCY COMMAND VALUE, PHASE INFORMATION (TO MANAGEMENT CIRCUIT 435)

POWER CONVERSION DEVICE AND POWER CONVERSION SYSTEM

CROSS-REFERENCE TO RELATED APPLICATION

The present application is based on PCT filing PCT/JP2022/003609, filed Jan. 31, 2022, the entire contents of which are incorporated herein by reference.

TECHNICAL FIELD

The present disclosure relates to a power conversion device and a power conversion system.

BACKGROUND ART

In recent years, for reducing environmental burdens, introduction of a power generation system employing a static inverter and harnesses natural energy, such as a solar cell not emitting carbon dioxide, has been accelerated. Further, in order to address power shortage and the like since the Great East Japan Earthquake, product commercialization has been underway for a system including a storage battery, a system utilizing an electric vehicle as a storage battery, a system formed of a combination of a solar cell and a storage battery, and the like. In any of the systems (a power conversion device), a static inverter is adopted.

On the other hand, with increase of the amount of power generation using renewable energy, thermal power plants serving to adjust the amount of power generation are expected to be closed in the future due to an undesirable increase in power generation costs including management costs. In that case, synchronous generators for thermal power generation and the like potentially have functions (for example, inertial force, synchronization force, etc.) to suppress fluctuations of the grid frequency. Thus, there is a concern that further closure of thermal power plants (reduction in number of synchronous generators) may make it difficult to ensure the stability of power grids.

From the viewpoint as described above, development of virtual synchronous generator control for controlling the operation of a power conversion device (a static inverter) so as to have characteristics of a synchronous generator has been underway. For example, by implementing the characteristics of the synchronous generator in a controller connected to the outside of the power conversion device and controlling the power conversion device based on a command value from the controller, the function of the synchronous generator can be virtually provided in an energy creating device (hereinafter also referred to as an "energy creation device") such as a plurality of solar cells that harnesses renewable energy, an energy storing device (hereinafter also referred to as an "energy storage device") such as a storage battery.

In particular, unlike a renewable energy power supply such as a solar cell and a wind power generator, a storage battery can control the charge/discharge power, and thereby, a storage battery implementing virtual synchronous generator control can be used as a main power supply (a master power supply) in a standalone-type microgrid or the like.

Japanese Patent Laying-Open No. 2019-176584 (PTL 1) discloses a method of setting control parameters for a power conversion device (a distributed power supply equipped with a static inverter) implementing virtual synchronous generator control.

Specifically, it discloses that a control parameter for setting virtual inertia for a power conversion device of a renewable energy system is generated based on one of a required inertia value requested by a grid operator and a virtual inertia value calculated based on the specifications and the operation state of the power conversion device. More specifically, regarding a total virtual inertia value Jopt suitable for the renewable energy system, a virtual inertia value (Jreq) requested by the grid operator for the power conversion device is received, and based on the operation state and the specification data of the renewable energy system, an upper limit value (Jmax, i) of the virtual inertia and a lower limit value (Dmin, i) of the virtual attenuation constant during an operation applying the upper limit value (Jmax, i) of the virtual inertia are set for each of a plurality of power conversion devices included in the renewable energy system.

Then, it is determined whether or not the total value (ΣJmax, i) of each upper limit value (Jmax, i) is smaller than the requested virtual inertia value (Jreq). When the total value (ΣJmax, i) is smaller than the requested virtual inertia value (Jreq), the total virtual inertia value Jopt suitable for the renewable energy system is calculated as Jopt=ΣJmax, i.

On the other hand, when the total value (ΣJmax, i) is larger than the requested virtual inertia value (Jreq), the total virtual inertia value Jopt is set at Jopt=Jreq. PTL 1 similarly discloses the calculation of a total virtual attenuation constant value Doptimal (an optimum value) suitable for the renewable energy system.

CITATION LIST

Patent Literature

PTL 1: Japanese Patent Laying-Open No. 2019-176584

SUMMARY OF INVENTION

Technical Problem

According to PTL 1, control parameters (a total virtual inertia value and a total virtual attenuation constant value) for controlling the virtual synchronous generator control of the static inverter implementing a virtual synchronous generator control function are calculated as described above and notified to the static inverter. In this case, the inertial force of the grid intended by the grid administrator is ensured by the virtual synchronous generator control implemented in the static inverter.

On the other hand, in a standalone-type microgrid or the like, a storage battery whose charge/discharge power is controlled by a static inverter implementing a plurality of virtual synchronous generator controls can be configured to operate as a main power supply (a master power supply) to support a standalone grid. However, such a configuration requires a virtual synchronous generator control to be implemented in each static inverter, which makes it difficult to configure the system using an existing static inverter.

On the other hand, in the case of starting up a standalone-type microgrid by a conventional static inverter not implementing virtual synchronous generator control, for example, the static inverter in one storage battery power conversion device is operated as a main power supply (a master power supply) by voltage control, specifically, by constant voltage constant frequency (CVCF) control. In this case, when a load fluctuation or a change in power generation amount occurs, the output power from the main power supply is adjusted so as to adjust the balance between the load and the power generation.

In general, the electric power input to/output from the main power supply is monitored by a management device such as a community energy management system (CEMS) that manages a standalone-type microgrid. When the electric power input to/output from the main power supply deviates from the operation plan of the main power supply that has been created in advance, the CEMS notifies other distributed power supplies, such as a storage battery operating as a slave power supply (current control) in the same microgrid, to adjust the charge/discharge power. Thereby, the entire microgrid can be controlled to prevent the charge/discharge power from being biased to the master power supply.

Further, a smart inverter that has recently attracted attention operates as a slave power supply for controlling a current, but has a function of autonomously controlling charge/discharge power based on the frequency of the grid alternating-current (AC) voltage (a drooping characteristic). However, as described above, the main power supply (master power supply) outputs a grid AC voltage of a constant frequency, which makes it difficult to control the standalone-type microgrid through utilization of the function of the smart inverter.

On the other hand, in a standalone-type microgrid in which a storage battery whose charge/discharge power is controlled by a static inverter implementing virtual synchronous generator control serves as a main power supply, when the charge/discharge power of the main power supply deviates from an operation plan due to load fluctuations and a change in power generation amount, the frequency of the grid AC voltage output from the static inverter changes. Thus, when the smart inverter is used as a slave power supply, excessive or insufficient electric power in the microgrid caused by the load fluctuation and the change in power generation amount can be covered not only by the main power supply but also by the slave power supply in a shared manner through utilization of the drooping characteristic function of the smart inverter.

Recently, there are cases where power infrastructures are damaged due to disasters such as earthquakes, typhoons, and heavy rains and thereby power failures continue for more than one week. In order to deal with such situations, introduction of a new system such as a licensing system for power distribution service provider has currently been under discussion. One object of such a licensing system for power distribution service provide is to temporarily recover from a power failure during a disaster by utilizing a distributed power supply for a power distribution grid in which a power infrastructure is not damaged.

In such a case, it is assumed that a standalone microgrid is configured through utilization of a power supply facility such as an existing storage battery. As described above, in the case where the main power supply (master power supply) is operated by voltage control (CVCF control) using a conventional static inverter not implementing virtual synchronous generator control, and if the standalone microgrid is operated for a long time period in cooperation with the master power supply and the distributed power supply (slave power supply) such as a solar cell, there is a concern that, for example, the stability of the grid may not be ensured due to the above-described problem.

In this way, from the viewpoint of ensuring the grid stability, it is preferable to introduce a power converter implementing virtual synchronous generator control.

However, when an existing power conversion device is replaced with a power converter implementing virtual synchronous generator control, construction of a standalone microgrid may be restricted in terms of costs and the like.

The present disclosure has been made in order to solve the above-described problems, and an object of the present disclosure is to, in a power conversion device including an inverter that operates as a voltage source for an AC grid, based on a command notified from outside, eliminate influences such as variations in communication delay, to stably control an AC voltage output from the power conversion device to ensure the stability of the grid.

Solution to Problem

According to an aspect of the present disclosure, a power conversion device is provided. The power conversion device operates based on a command from a controller that controls a distributed power supply, and includes an inverter, a communication unit, a voltage measurement unit, a target AC voltage generation unit, and a voltage control unit. The inverter is connected between an AC grid and the distributed power supply to operate as a voltage source for the AC grid based on the command. The communication unit receives information necessary for controlling the inverter, the information including the command notified from the controller. The voltage measurement unit measures a voltage value of a grid AC voltage output from the inverter to the AC grid. The target AC voltage generation unit generates a target AC voltage in a shape of a sinusoidal wave as an output target value of the inverter that operates as the voltage source. The voltage control unit controls an operation of the inverter to compensate for a deviation between the voltage value measured by the voltage measurement unit and the target AC voltage. The information includes a frequency command value of the grid AC voltage. The target AC voltage generation unit calculates the target AC voltage using an amplitude command value of the grid AC voltage, the frequency command value received by the communication unit, and phase information of the grid AC voltage generated in the power conversion device.

According to another aspect of the present disclosure, a power conversion system is provided. The power conversion system includes: a controller for a distributed power supply; and a power conversion device that operates based on a command from the controller. A virtual synchronous generator control function of simulating a characteristic of a synchronous generator is implemented in the controller. The power conversion device includes an inverter, a communication unit, a voltage measurement unit, a target AC voltage generation unit, and a voltage control unit. The inverter is connected between an AC grid and the distributed power voltage to operate as a voltage source for the AC grid based on the command. The communication unit receives information necessary for controlling the inverter, the information including the command notified from the controller. The voltage measurement unit measures a voltage value of a grid AC voltage output from the inverter to the AC grid. The target AC voltage generation unit generates a target AC voltage in a shape of a sinusoidal wave as an output target value of the inverter that operates as the voltage source. The voltage control unit controls an operation of the inverter to compensate for a deviation between the voltage value measured by the voltage measurement unit and the target AC voltage. The information includes a frequency command value of the grid AC voltage. The target AC voltage generation unit calculates the target AC voltage using an amplitude command value of the grid AC voltage, the frequency command value received by the communication unit, and phase information of the grid AC voltage generated in the power conversion device.

Advantageous Effects of Invention

According to the present disclosure, in the power conversion device including an inverter that operates as a voltage source for an AC grid, based on a command notified from outside, influences such as variations in communication delay are eliminated to ensure the continuity of an output target value (a target AC voltage) of the inverter to thereby stably control an AC voltage output from the power conversion device to make it possible to ensure the stability of the grid.

BRIEF DESCRIPTION OF DRAWINGS

FIG. 1 is a block diagram illustrating a configuration of a power distribution grid to which a power conversion device according to a first embodiment is connected.

FIG. 4 is a block diagram illustrating a configuration of an operation plan creation circuit shown in FIG. 3.

FIG. 7 is a block diagram illustrating a configuration of a first control circuit shown in FIG. 5.

FIG. 10 is a block diagram illustrating a configuration of a fourth control circuit shown in FIG. 6.

FIG. 16 is a block diagram illustrating a configuration of a mass point-system computation circuit shown in FIG. 14.

FIG. 17 is a conceptual diagram illustrating a region covered by virtual synchronous generator control implemented in the power distribution grid storage battery system.

FIG. 18 is a timing chart for illustrating a problem in virtual synchronous generator control implemented in the power distribution grid storage battery system according to the first embodiment.

FIG. 27A is a first flowchart illustrating an operation of the power distribution grid storage battery power conversion device shown in FIG. 2.

FIG. 31 is a block diagram illustrating a configuration example of a second virtual synchronous generator control circuit shown in FIG. 30.

DESCRIPTION OF EMBODIMENTS

Figure 2:
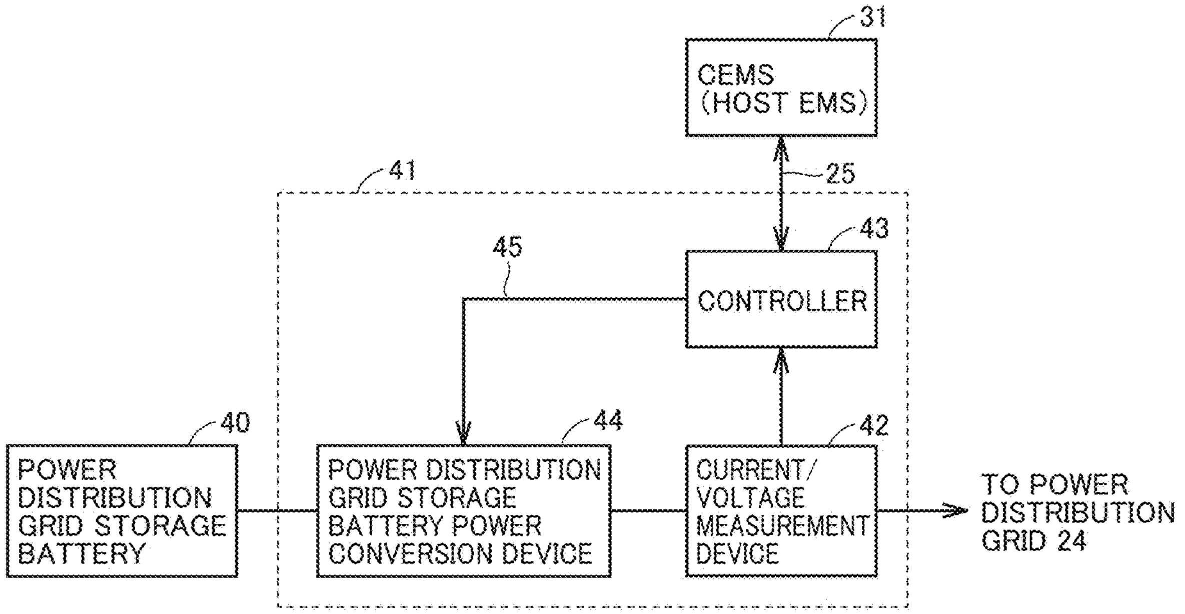
FIG. 2 is a block diagram for further illustrating a configuration of a power distribution grid storage battery system shown in FIG. 1.

Hereinafter, embodiments of the present disclosure will be described in detail with reference to the accompanying drawings. In the following description, the same or corresponding portions in the accompanying drawings are denoted by the same reference characters, and the description thereof will not be repeated in principle.

First Embodiment

FIG. 1 is a block diagram illustrating a configuration of a power distribution grid to which a power conversion device according to the first embodiment is connected. In the following description, in the present embodiment, a single-phase power distribution grid is exemplified for simplicity of explanation, but it is needless to say that the same configuration is applicable to a three-phase power distribution grid.

Referring to FIG. 1, a distribution grid 24 (24*a* to 24*d*) is connected to a substation 20 through a switch 28. On power distribution grid 24, a plurality of automatic voltage regulators 23 (23*a* to 23*c*) are connected in series. In the present embodiment, automatic voltage regulator 23 is configured by a step voltage regulator (SVR), and thus, will be hereinafter also referred to as an SVR 23.

Power distribution grid 24*d* is connected to substation 20 through switch 28, and SVR 23*c* is connected between power distribution grids 24*d* and 24*c*. SVR 23*b* is connected between power distribution grids 24*c* and 24*b*, and SVR 23*a* is connected between power distribution grids 24*b* and 24*a*.

To power distribution grids 24*a* to 24*b*, a town A 100*a*, a town B 100*b*, a town C 100*c*, a town D 100*d*, a factory 101, a building 102, and an apartment 103 each are connected as a load.

Further, to power distribution grid 24*a*, a mega solar 26 is connected through a mega-solar power conversion device 27, and also, a power distribution grid storage battery 40*a* is connected through a power distribution grid storage battery system 41*a*. A power distribution grid storage battery 40*b* is connected to power distribution grid 24*b* through a power distribution grid storage battery system 41*b*, and a synchronous generator 30*a* is connected to power distribution grid 24*c*. Also, a synchronous generator 30*b* is connected to power distribution grid 24*d*, and a power distribution grid storage battery 40*c* is connected to power distribution grid 24*d* through a power distribution grid storage battery system 41*c*.

In the following description, when each element distinguished by addition of a subscript of a small letter in the accompanying drawings is collectively denoted, each element is represented without the subscript. For example, power distribution grid storage batteries 40*a* to 40*c* in FIG. 1 are collectively denoted simply as a power distribution grid storage battery 40, and power distribution grid storage battery systems 41*a* to 41*c* in FIG. 1 are collectively denoted simply as a power distribution grid storage battery system 41.

A plurality of voltmeters 22 (22*a*, 22*e*, 22*f*, 22*i*, 22*j*, and 22*x*) are connected to power distribution grid 24, and the measurement result is transmitted to a power distribution automation system (DSO: Distribution System Operator) 21 in a predetermined period. Further, DSO 21 is notified also about the tap position information, the primary-side voltage information, and the secondary-side voltage information of SVR 23. In the present embodiment, SVR 23 notifies about the tap position information and the primary-side and secondary-side voltage information in a predetermined period, and during tap switching of SVR 23, notifies about the tap position information and the primary-side and secondary-side voltage information at irregular intervals.

In a predetermined period, a CEMS 31 collects information such as various measurement results from each customer (in the example shown in FIG. 1, town A 100*a*, town B 100*b*, town C 100*c*, town D 100*d*, building 102, apartment 103, and factory 101), mega-solar power conversion device 27, synchronous generators 30*a* and 30*b*, and power distribution grid storage battery systems 41*a* to 41*c*.

The data collected by CEMS 31 is notified from CEMS 31 to DSO 21 based on a request from DSO 21. Also, the electric power consumed by the consumers in town A 100*a*, town B 100*b*, town C 100*c*, and town D 100*d*, and the electric power generated by the energy creation device are collected by CEMS 31 in a predetermined period (for example, in a 30-minute period) from a smart meter (not shown) installed in each consumer.

FIG. 2 is a block diagram for further illustrating a configuration of power distribution grid storage battery system 41 including power distribution grid storage battery 40 connected to power distribution grid 24 shown in FIG. 1.

Referring to FIG. 2, power distribution grid storage battery system 41 includes a current/voltage measurement device 42, a controller 43, and a power distribution grid storage battery power conversion device 44.

Current/voltage measurement device 42 measures the voltage and the current of power distribution grid 24 to which power distribution grid storage battery system 41 is connected. The measurement values of the voltage and the current measured by current/voltage measurement device 42 are notified to controller 43 connected to CEMS 31 through a communication line 25.

Power distribution grid storage battery power conversion device 44 is connected between power distribution grid storage battery 40 and power distribution grid 24 to convert electric power between power distribution grid storage battery 40 and power distribution grid 24 such that active power and reactive power according to a command value are input and output. Thereby, charging and discharging of power distribution grid storage battery 40 are controlled.

In the first embodiment, from CEMS 31, controller 43 receives command values of active power and reactive power input to/output from power distribution grid storage battery power conversion device 44, control parameters used in a virtual synchronous generator control circuit 433 (described later) inside controller 43, and control parameters used in an inverter voltage control circuit 4095 inside power distribution grid storage battery power conversion device 44. On the other hand, controller 43 notifies CEMS 31 about the measurement results and the like of the active power and the reactive power output from power distribution grid storage battery power conversion device 44.

In the first embodiment, through a communication line 45, controller 43 notifies power distribution grid storage battery power conversion device 44 about the frequency command value and the voltage amplitude command value calculated by virtual synchronous generator control circuit 433 (described later).

Power distribution grid storage battery system 41 shown in FIG. 2 corresponds to one example of the "power conversion system" according to the present embodiment, and power distribution grid storage battery power conversion device 44 corresponds to one example of the "power conversion device" according to the present embodiment. Also, power distribution grid 24 corresponds to one example of the "AC grid", and power distribution grid storage battery 40 corresponds to one example of the "distributed power supply". Although FIG. 1 illustrates an AC grid (power distribution grid 24) to which a plurality of power distribution grid storage battery systems 41 (i.e., power distribution grid storage battery power conversion device 44) are connected, it is disclosed for the sake of confirmation that the present disclosure is applicable also to a case where one power distribution grid storage battery system 41 and one power distribution grid storage battery power conversion device 44 are connected to the AC grid.

Figure 3:
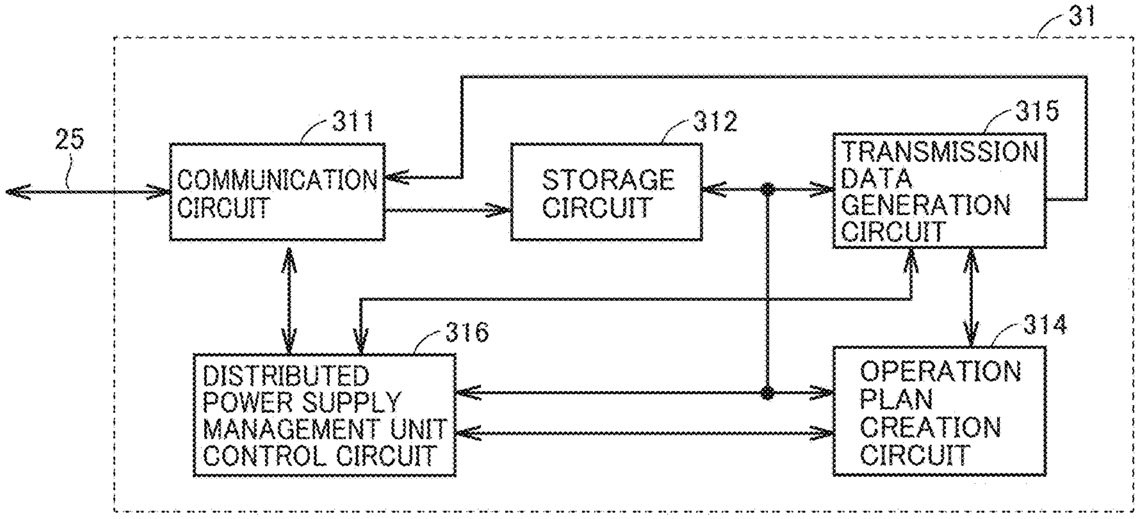
FIG. 3 is a block diagram illustrating a configuration of a CEMS shown in FIG. 1.

FIG. 3 is a block diagram illustrating the configuration of CEMS 31 shown in FIG. 1. Referring to FIG. 3, CEMS 31 includes a communication circuit 311, a storage circuit 312, an operation plan creation circuit 314, a transmission data generation circuit 315, and a distributed power supply management unit control circuit 316.

Through communication line 25, communication circuit 311 communicates with DSO 21, each consumer (town A

100*a*, town B 100*b*, town C 100*c*, town D 100*d*, building 102, apartment 103, and factory 101), mega-solar power conversion device 27, synchronous generators 30*a* and 30*b*, and power distribution grid storage battery systems 41*a*, 41*b*, and 41*c*.

Storage circuit 312 stores various pieces of information (measurement results, status information of each distributed power supply, and the like) obtained via communication circuit 311. The measurement results include SOC information and the like collected from power distribution grid storage battery systems 41*a*, 41*b*, and 41*c*.

Operation plan creation circuit 314 creates an operation plan for each of power distribution grid storage battery systems 41*a*, 41*b*, and 41*c* based on a control command from DSO 21. For example, in the first embodiment, an operation plan performed at 30-minute intervals for 24 hours is created.

Transmission data generation circuit 315 stores the data related to the operation plan output from operation plan creation circuit 314, and outputs the stored data to communication circuit 311 based on a transmission command from distributed power supply management unit control circuit 316. Communication circuit 311 transmits the data output from transmission data generation circuit 315 based on a control signal output from distributed power supply management unit control circuit 316.

Distributed power supply management unit control circuit 316 manages the operations of communication circuit 311, storage circuit 312, operation plan creation circuit 314, and transmission data generation circuit 315 in CEMS 31. Distributed power supply management unit control circuit 316 also generates control parameters for virtual synchronous generator control units (corresponding to virtual synchronous generator control circuit 433 in controller 43) and the voltage control unit (corresponding to inverter voltage control circuit 4095 in power distribution grid storage battery power conversion device 44) in each of power distribution grid storage battery systems 41*a*, 41*b*, and 41*c*.

Although the details of the virtual synchronous generator control unit (virtual synchronous generator control circuit 433) and the voltage control unit (inverter voltage control circuit 4095) will be described later, in the first embodiment, the control parameters for the virtual synchronous generator control unit (virtual synchronous generator control circuit 433) and the voltage control unit (inverter voltage control circuit 4095) in power distribution grid storage battery system 41 implementing virtual synchronous generator control are controlled to be set at different values between: the case of an interconnection grid, i.e., in the case where power distribution grid storage battery power conversion device 44 operates as a voltage source to interconnect with power distribution grid 24 connected to the grid power supply; and the case of a standalone grid, i.e., in the case where power distribution grid storage battery power conversion device 44 operates as a voltage source for power distribution grid 24 disconnected from the grid power supply. In addition, also in the standalone grid, the control parameters for the virtual synchronous generator control unit (virtual synchronous generator control circuit 433) and the voltage control unit (inverter voltage control circuit 4095) are changed depending on the presence or absence of the synchronous generator and also on the number of power distribution grid storage battery systems 41 implementing virtual synchronous generator control.

FIG. 4 is a block diagram illustrating a configuration of operation plan creation circuit 314 in CEMS 31 shown in FIG. 3. Referring to FIG. 4, operation plan creation circuit 314 includes a storage battery operation plan generation circuit 3141, a power generation amount prediction circuit 3142, a power consumption prediction circuit 3143, a distributed power supply operation plan creation management circuit 3145, and an operation plan creation unit management circuit 3146.

Power generation amount prediction circuit 3142 acquires weather forecast information for 24 hours from a weather forecast server (not shown) via communication circuit 311, and predicts the power generation amount of mega solar 26 based on the acquired weather forecast information and the database information (not shown) prepared for prediction of the power generation amount.

Power consumption prediction circuit 3143 predicts the total power consumption by each customer based on the clock information (year, month, date, day of week, time) inside CEMS 31 and the database information (not shown) prepared for prediction of the power consumption.

Storage battery operation plan generation circuit 3141 generates an operation plan (a plan in each 30 minutes for 24 hours) for each of power distribution grid storage battery power conversion devices 44*a*, 44*b*, and 44*c*, i.e., power target values for the respective distributed power supplies, based on the control command information notified from DSO 21, the prediction result about the power generation amount of mega solar 26 predicted by power generation amount prediction circuit 3142, and the prediction information about the power consumption by each consumer predicted by power consumption prediction circuit 3143. Note that the control command information notified from DSO 21 includes a plan value of electric power (supply power) consumed in substation 20 and its subsequent components (a plan in each 30 minutes for 24 hours).

Distributed power supply operation plan creation management circuit 3145 stores the power target value for each distributed power supply that is generated by storage battery operation plan generation circuit 3141, and outputs the stored power target value to transmission data generation circuit 315 based on the control signal output from operation plan creation unit management circuit 3146.

Operation plan creation unit management circuit 3146 manages the operations of storage battery operation plan generation circuit 3141, power generation amount prediction circuit 3142, power consumption prediction circuit 3143, and distributed power supply operation plan creation management circuit 3145.

Figure 5:
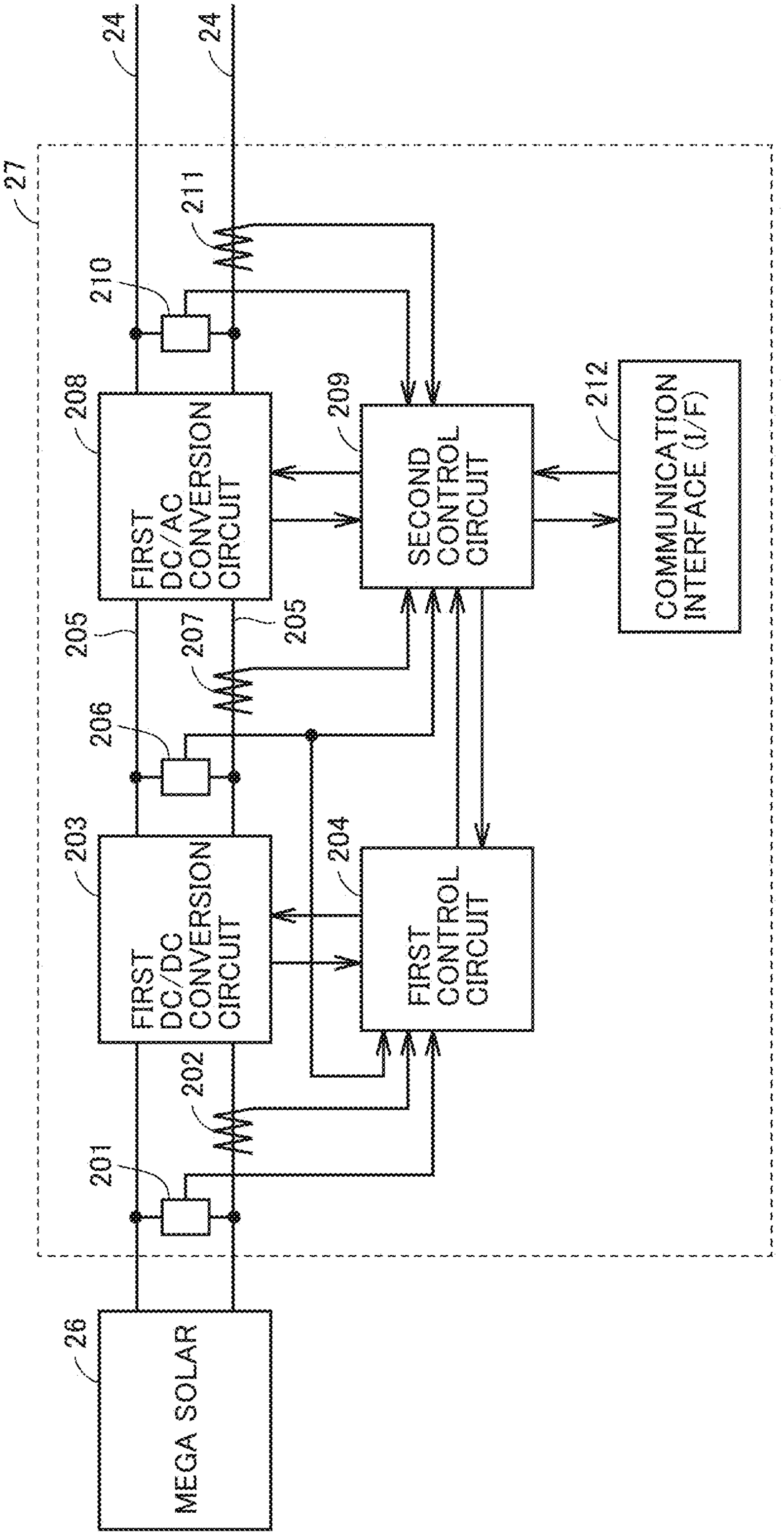
FIG. 5 is a block diagram illustrating a configuration of a mega-solar power conversion device shown in FIG. 1.

FIG. 5 is a block diagram illustrating a configuration of mega-solar power conversion device 27 shown in FIG. 1. Referring to FIG. 5, mega-solar power conversion device 27 includes a voltmeter 201, an ammeter 202, a first direct-current (DC)/DC conversion circuit 203, a first control circuit 204, a DC bus 205, a voltmeter 206, an ammeter 207, a first DC/AC conversion circuit 208, a second control circuit 209, a voltmeter 210, an ammeter 211, and a communication interface 212.

Voltmeter 201 measures a voltage (DC) output from mega solar 26. Ammeter 202 measures a current (DC) output from mega solar 26. First DC/DC conversion circuit 203 converts the DC power of the first DC voltage output from mega solar 26 into DC power of the second DC voltage.

First control circuit 204 controls first DC/DC conversion circuit 203. Through DC bus 205, the second DC voltage output from first DC/DC conversion circuit 203 is supplied to first DC/AC conversion circuit 208. Voltmeter 206 measures the voltage on DC bus 205. Ammeter 207 measures a current (DC) output from first DC/DC conversion circuit 203.

First DC/AC conversion circuit 208 converts the DC power output from first DC/DC conversion circuit 203 into AC power. Second control circuit 209 controls first DC/AC conversion circuit 208. Voltmeter 210 measures a voltage (AC) output from first DC/AC conversion circuit 208. Ammeter 211 measures a current (AC) output from first DC/AC conversion circuit 208. Communication interface 212 establishes communication between mega-solar power conversion device 27 and CEMS 31.

Figure 6:
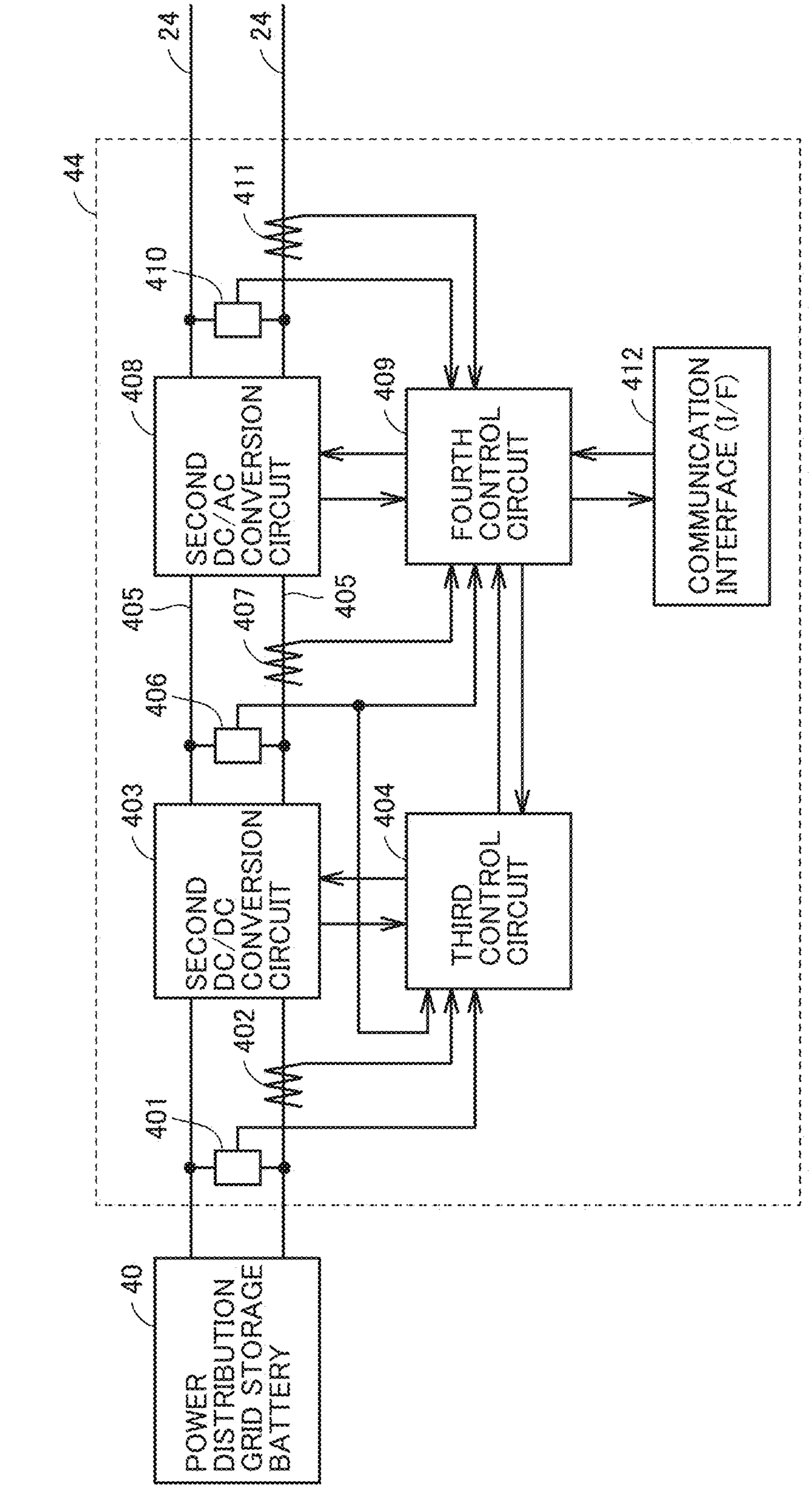
FIG. 6 is a block diagram illustrating a configuration of a power distribution grid storage battery power conversion device shown in FIG. 2.

FIG. 6 is a block diagram illustrating a configuration of power distribution grid storage battery power conversion device 44 shown in FIG. 2. Referring to FIG. 6, power distribution grid storage battery power conversion device 44 includes a voltmeter 401, an ammeter 402, a second DC/DC conversion circuit 403, a third control circuit 404, a DC bus 405, a voltmeter 406, an ammeter 407, a second DC/AC conversion circuit 408, a fourth control circuit 409, a voltmeter 410, an ammeter 411, and a communication interface 412.

Voltmeter 401 measures a voltage (DC) output from power distribution grid storage battery 40. Ammeter 402 measures a current (DC) output from power distribution grid storage battery 40. Second DC/DC conversion circuit 403 converts the DC power of the third DC voltage output from power distribution grid storage battery 40 into DC power of the fourth DC voltage.

Third control circuit 404 controls second DC/DC conversion circuit 403. Through DC bus 405, the fourth DC voltage output from second DC/DC conversion circuit 403 is supplied to second DC/AC conversion circuit 408.

Voltmeter 406 measures the voltage on DC bus 405. Ammeter 407 measures a direct current output from second DC/DC conversion circuit 403. Second DC/AC conversion circuit 408 converts the DC power output from second DC/DC conversion circuit 403 into AC power. Fourth control circuit 409 controls second DC/AC conversion circuit 408.

Voltmeter 410 measures the voltage (AC) output from second DC/AC conversion circuit 408. Ammeter 411 measures the current (AC) output from second DC/AC conversion circuit 408. Communication interface 412 establishes communication between power distribution grid storage battery power conversion device 44 and controller 43.

Note that the configurations of a well-known DC/DC converter and a well-known inverter may be employed appropriately as the configurations of first DC/DC conversion circuit 203 (FIG. 5), second DC/DC conversion circuit 403 (FIG. 6), first DC/AC conversion circuit 208 (FIG. 5), and second DC/AC conversion circuit 408 (FIG. 6).

FIG. 7 is a block diagram illustrating a configuration of first control circuit 204 for controlling first DC/DC conversion circuit 203 of mega-solar power conversion device 27 shown in FIG. 5.

Referring to FIG. 7, first control circuit 204 includes a maximum power point tracking (MPPT) control circuit 2041, a voltage control circuit 2042, a first switching circuit 2043, and a fifth control circuit 2044.

MPPT control circuit 2041 performs what is called maximum power point tracking control based on the values measured by voltmeter 201 and ammeter 202. In the maximum power point tracking control, the maximum power point of mega solar 26 is searched in order to allow the electric power generated by mega solar 26 to be extracted as much as possible. Specifically, MPPT control circuit 2041 generates a control command value for first DC/DC conversion circuit 203 for controlling the DC voltage measured by voltmeter 201 to be set at a voltage corresponding to the above-mentioned maximum power point.

Voltage control circuit 2042 generates a control command value for first DC/DC conversion circuit 203 for maintaining the DC voltage (the second DC voltage) on DC bus 205 at a predetermined target voltage, based on the value measured by voltmeter 206. Fifth control circuit 2044 outputs control parameters, control target values, and the like to each of MPPT control circuit 2041 and voltage control circuit 2042, and manages the power generation state and the like of mega solar 26. Fifth control circuit 2044 further outputs a control signal for first switching circuit 2043.

First switching circuit 2043 selectively outputs one of the outputs of MPPT control circuit 2041 and voltage control circuit 2042 as a control command value for first DC/DC conversion circuit 203 in accordance with a control signal from fifth control circuit 2044. First DC/DC conversion circuit 203 is controlled in an MPPT mode or a voltage control mode. First switching circuit 2043 is controlled to output the control command value generated by MPPT control circuit 2041 in the MPPT mode, and to output the control command value generated by voltage control circuit 2042 in the voltage control mode.

Figure 8:
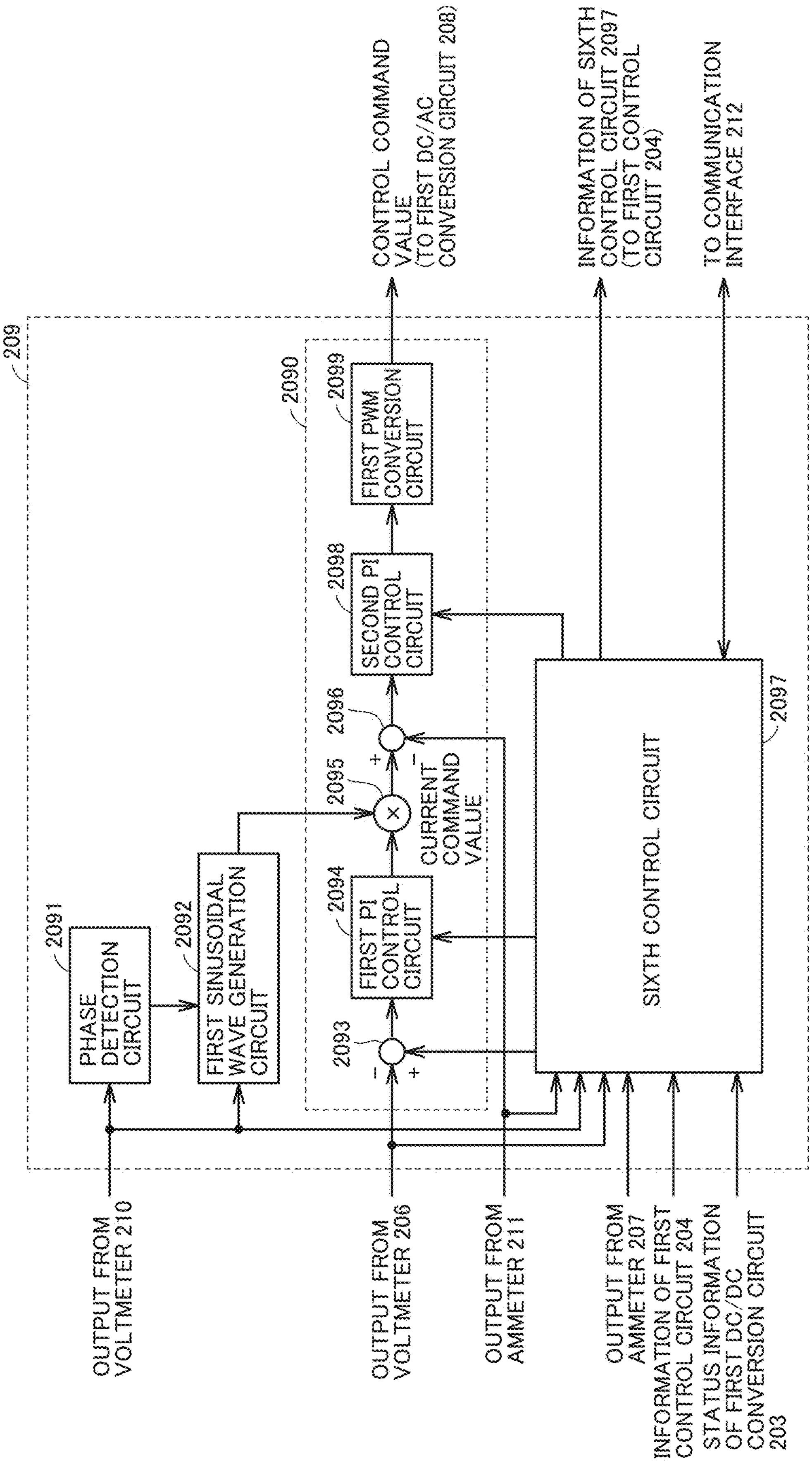
FIG. 8 is a block diagram illustrating a configuration of a second control circuit shown in FIG. 5.

FIG. 8 is a block diagram illustrating a configuration of second control circuit 209 that controls first DC/AC conversion circuit 208 in mega-solar power conversion device 27 shown in FIG. 5.

Referring to FIG. 8, second control circuit 209 includes a phase detection circuit 2091, a first sinusoidal wave generation circuit 2092, a current control circuit 2090, and a sixth control circuit 2097. Current control circuit 2090 includes a subtractor 2093, a first proportional-integral (PI) control circuit 2094, a multiplier 2095, a subtractor 2096, a second PI control circuit 2098, and a first pulse width modulation (PWM) conversion circuit 2099. Note that the function of current control circuit 2090 corresponds to a control function of a commonly-used photovoltaic power generation-type power conversion device installed in a household in a control mode in which electric power is output in synchronization with a grid AC voltage.

Phase detection circuit 2091 detects phase information from the AC voltage waveform measured by voltmeter 210. First sinusoidal wave generation circuit 2092 generates a sinusoidal wave synchronized with the AC voltage waveform based on the amplitude of the grid AC voltage measured by voltmeter 210 and the phase information detected by phase detection circuit 2091.

In the first embodiment, phase detection circuit 2091 detects a zero cross point from the AC voltage waveform, detects the frequency of the grid AC voltage from the zero cross point detection result, and outputs the detected result to first sinusoidal wave generation circuit 2092 together with the zero cross point information. Details of the zero cross point detection will be described later.

Current control circuit 2090 generates a control command value for first DC/AC conversion circuit 208 based on the DC voltage on DC bus 205 output from voltmeter 206. By subtractor 2093, the DC voltage on DC bus 205 output from voltmeter 206 is subtracted from the target value of the DC bus voltage output from sixth control circuit 2097.

The subtraction value obtained by subtractor 2093 is input to first PI control circuit 2094. First PI control circuit 2094 generates a command value for controlling the DC voltage on DC bus 205 to be set at a prescribed value by control computation using the control parameters (a proportional gain and integration time) output from sixth control circuit 2097.

The command value generated by first PI control circuit 2094 is output to multiplier 2095 and multiplied by the sinusoidal wave synchronized with the AC voltage waveform output from first sinusoidal wave generation circuit 2092. Thereby, a current command value is output from multiplier 2095.

The current command value output from multiplier 2095 is input to subtractor 2096. Subtractor 2096 subtracts the current value in the AC grid measured by ammeter 211 from the current command value to calculate a current deviation. The current deviation calculated by subtractor 2096 is input to second PI control circuit 2098.

Second PI control circuit 2098 performs control computation using the control parameters (a proportional gain and integration time) output from sixth control circuit 2097 to generate a control command value for compensating for the current deviation by subtractor 2096, i.e., for controlling the current deviation to be zero. The generated control command value is input to first PWM conversion circuit 2099.

First PWM conversion circuit 2099 performs PWM modulation on the control command value from second PI control circuit 2098 to generate a control command value for first DC/AC conversion circuit 208. The generated control command value is output to first DC/AC conversion circuit 208. As described above, the control parameters for first PI control circuit 2094 and second PI control circuit 2098 are also notified from sixth control circuit 2097.

Further, sixth control circuit 2097 notifies CEMS 31 through communication interface 212 (FIG. 5) also about the effective voltage in the AC grid measured by an effective voltage measurement unit (not shown) in the AC grid or about the active power and reactive power information measured by an active power/reactive power measurement unit (not shown) in the AC grid. Further, sixth control circuit 2097 also notifies fifth control circuit 2044 (FIG. 7) about the measurement results of the effective voltage, the active power, and the like in the AC grid. Thus, for example, when the effective value of the grid AC voltage exceeds a prescribed reference value, fifth control circuit 2044 switches the control mode of mega solar 26 from the MPPT control to the voltage control, and thereby can suppress a rise in the grid AC voltage.

Figure 9:
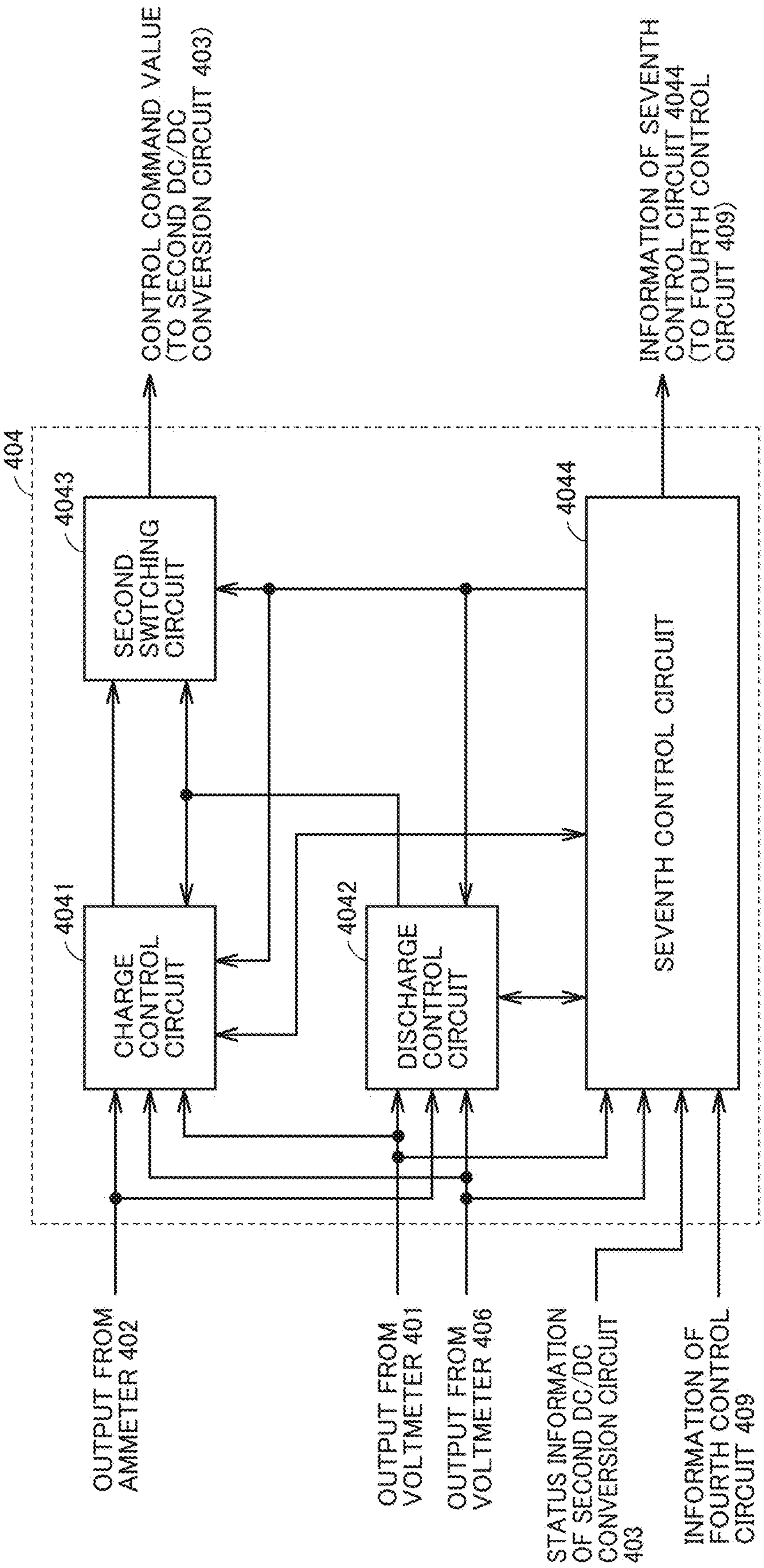
FIG. 9 is a block diagram illustrating a configuration of a third control circuit shown in FIG. 6.

FIG. 9 is a block diagram illustrating a configuration of third control circuit 404 that controls second DC/DC conversion circuit 403 of power distribution grid storage battery power conversion device 44 shown in FIG. 6.

Referring to FIG. 9, third control circuit 404 includes a charge control circuit 4041, a discharge control circuit 4042, a second switching circuit 4043, and a seventh control circuit 4044.

Charge control circuit 4041 generates a control command value for second DC/DC conversion circuit 403 that is applied when charging control for power distribution grid storage battery 40 is performed. Discharge control circuit 4042 generates a control command value for second DC/DC conversion circuit 403 that is applied when discharging control for power distribution grid storage battery 40 is performed. Seventh control circuit 4044 outputs control parameters, control target values, and the like to charge control circuit 4041 and discharge control circuit 4042, and also manages the state of charge (SOC), the charge/discharge current, the charge/discharge power amount, and the like of power distribution grid storage battery 40. Seventh control circuit 4044 further outputs a control signal for second switching circuit 4043.

In accordance with a control signal from seventh control circuit 4044, second switching circuit 4043 selectively outputs one of the outputs from charge control circuit 4041 and discharge control circuit 4042 as a control command value for second DC/DC conversion circuit 403.

Second switching circuit 4043 is controlled to output the control command value generated by charge control circuit 4041 when it is instructed to perform charging of power distribution grid storage battery 40 and to output the control command value generated by discharge control circuit 4042 when it is instructed to perform discharging of power distribution grid storage battery 40.

FIG. 10 is a block diagram illustrating a configuration of fourth control circuit 409 that controls second DC/AC conversion circuit 408 in power distribution grid storage battery power conversion device 44 shown in FIG. 6.

Referring to FIG. 10, fourth control circuit 409 includes an AC frequency detection circuit 4091, an effective power calculation circuit 4092, an inverter current control circuit 4094, an inverter voltage control circuit 4095, a third switching circuit 4096, and an eighth control circuit 4097.

AC frequency detection circuit 4091 detects a phase from the AC voltage waveform measured by voltmeter 410. In the first embodiment, the zero cross point is detected from the AC voltage waveform by a method described later, and the frequency is detected from the time interval between the detected zero cross points. It is disclosed for the sake of confirmation that the method of detecting the frequency of the grid AC voltage is not limited to the method using detection of the zero cross point.

Effective power calculation circuit 4092 calculates the effective power from the grid AC voltage information and the AC current information measured by voltmeter 410 and ammeter 411. For example, in the first embodiment, the effective power is calculated by integrating the electric power for one period of the grid AC voltage waveform based on the zero cross point detection information and the AC frequency information that are output from AC frequency detection circuit 4091. However, the effective power can be calculated also by a method other than the above. For example, in a case of a three-phase alternating current in the AC grid, the effective power can be calculated using d-q conversion values of the three-phase AC voltage and current.

Inverter current control circuit 4094 generates a control command value applied when second DC/AC conversion circuit 408 is operated by current control. Note that inverter current control circuit 4094 can be configured in the same circuit configuration and the same operation as those in current control circuit 2090 shown in FIG. 8 except for the control parameters. Thus, the detailed explanation of inverter current control circuit 4094 will not be repeated.

Inverter voltage control circuit 4095 generates a control command value for operating second DC/AC conversion circuit 408 by voltage control, i.e., by control to output a grid AC voltage from second DC/AC conversion circuit 408.

Third switching circuit 4096 selects one of the control command value (for current control) generated by inverter current control circuit 4094 and the control command value (for voltage control) generated by inverter voltage control circuit 4095 in accordance with the output of eighth control circuit 4097, and then, outputs the selected control command value to second DC/AC conversion circuit 408. In other words, second DC/AC conversion circuit 408 in power distribution grid storage battery power conversion device 44 can be operated by either voltage control or current control, and thus, is operated by either voltage control or current control applied in accordance with the output of eighth control circuit 4097.

Eighth control circuit 4097 collects the measurement results about DC bus 405 that are output from voltmeter 406 and ammeter 407, the measurement results about the AC grid that are output from voltmeter 410 and ammeter 411, the status information about second DC/DC conversion circuit 403 that is output from third control circuit 404, and the like. The measurement results, the status information and the like collected by eighth control circuit 4097 are notified to controller 43 or the like through communication interface 412.

The above-mentioned various control parameters for inverter current control circuit 4094 and inverter voltage control circuit 4095 are notified from eighth control circuit 4097. In the first embodiment, as described with reference to FIG. 2, the control parameters for inverter voltage control circuit 4095 that have been notified from CEMS 31 are notified through eighth control circuit 4097 due to the following reason.

As described in the first embodiment, in the case where a virtual synchronous generator control function is provided in controller 43 external to power distribution grid storage battery power conversion device 44, although details will be described later, a measurement delay, a processing delay, a communication delay, and the like occur before the frequency command value is transmitted to power distribution grid storage battery power conversion device 44, and thus, a delay occurs before the frequency command value is reflected in the AC grid frequency output from power distribution grid storage battery power conversion device 44. On the other hand, excessive or insufficient electric power with respect to the load fluctuation or the change in power generation amount is processed by power distribution grid storage battery power conversion device 44 itself, and thereby, can be addressed with almost no delay time. Depending on whether the delay time occurs or not, the relation between the grid frequency and the grid voltage may vary from that presumed by the frequency command value, and thereby, the behavior of power distribution grid 24 may become unstable. In the present specification, a configuration in which the controller is "external" to the power conversion device is assumed to be equivalent to a configuration that requires intervention of a communication interface for transmission and reception of information between the power conversion device and the controller.

In the case where a single power distribution grid storage battery system 41 implementing a virtual synchronous generator control function exists in a standalone microgrid, this single power distribution grid storage battery system 41 itself determines and outputs the frequency of the grid AC voltage, and thus, the influence of the processing delay does not become significant. On the other hand, in the case where two or more power distribution grid storage battery systems 41 cooperate with each other to construct a standalone microgrid, the delay time may influence the stable operation of the standalone microgrid as the number of power distribution grid storage battery systems 41 increases.

The following describes, by way of example, a situation in which two power distribution grid storage battery systems 41 are connected. When the load or the power generation amount abruptly changes in the standalone microgrid, the frequency of the grid AC voltage output from power distribution grid storage battery system 41 changes, due to the influence of the delay time, with a delay from the change in electric power output from power distribution grid storage battery system 41.

Thereby, when the phases of the grid AC voltages output from two power distribution grid storage battery systems 41 deviate from the optimum control point, a cross current occurs between these two power distribution grid storage battery systems 41. At this time, if the response speed of the voltage control unit (inverter voltage control circuit 4095) in each power distribution grid storage battery system 41 is high, the cross current disperses to produce a high current, which leads to a concern that the standalone microgrid may stop for protection.

Thus, in the present first embodiment, the control parameters for voltage control (inverter voltage control circuit 4095) sent to respective power distribution grid storage battery systems 41 by CEMS 31 are set to be variable according to the number of power distribution grid storage battery systems 41 each implementing a virtual synchronous generator control function carried out in the microgrid. Specifically, the control parameters in inverter voltage control circuit 4095 in each power distribution grid storage battery power conversion device 44 are set such that the response time of the voltage control becomes longer as the number of power distribution grid storage battery power conversion devices 44 becomes larger. Thereby, the response time of the control for the AC voltage output from power distribution grid storage battery power conversion device 44 is optimally set to make it possible to ensure the stability of the standalone microgrid. As a result, when a plurality of power distribution grid storage battery systems 41 each implementing a virtual synchronous generator control function are operated in parallel as a voltage source to thereby configure a standalone microgrid, the control parameters notified to the respective power distribution grid storage battery power conversion devices 44 are set such that the response time of the control for the AC voltage output from each power distribution grid storage battery power conversion device 44 is longer than that in the case where only a single power distribution grid storage battery power conversion device 44 constitutes a standalone microgrid.

Similarly, it is preferable that the control parameters for inverter voltage control circuit 4095 for determining the control response speed of power distribution grid storage battery power conversion device 44 are set differently between the case of constituting a standalone microgrid and the case of operating to be interconnected to a grid. Specifically, in the case of the interconnection grid, the synchronous generator supporting the grid quickly responds. Thus, from the viewpoint of ensuring the stability of the power grid, it is preferable to suppress the control response on the power distribution grid storage battery power conversion device 44 side. Accordingly, in the case where power distribution grid storage battery power conversion device 44 implements an interconnection grid, CEMS 31 sets the control parameters for inverter voltage control circuit 4095 such that the response time for the output voltage control of power distribution grid storage battery power conversion device 44 becomes longer as compared with the case where power distribution grid storage battery power conversion device 44 implements a standalone microgrid. More specifically, the control parameters for inverter voltage control circuit 4095 are set such that the response time for the output voltage control of power distribution grid storage battery power conversion device 44 is longer in the case of an interconnection grid than in the case where one power distribution grid storage battery power conversion device 44 supports a standalone microgrid. Thereby, also in the case where power distribution grid storage battery systems 41 each implementing a virtual synchronous generator control function constitute an interconnection grid, inertial force can be applied to the grid without causing unnecessary disturbance.

Similarly, the control parameters for virtual synchronous generator control circuit 433 in controller 43 are also notified from CEMS 31 in the present first embodiment due to the following reason.

As described above, when a virtual synchronous generator control function is provided in controller 43 external to power distribution grid storage battery power conversion device 44, a measurement delay, a processing delay, a communication delay, and the like occur when a frequency command value is transmitted to power distribution grid storage battery power conversion device 44. Thus, a delay occurs before the frequency command value is reflected in the AC grid frequency output from power distribution grid storage battery power conversion device 44.

On the other hand, when a load fluctuation or a change in power generation amount occurs in the standalone microgrid, a plurality of power distribution grid storage battery systems 41 each implementing a virtual synchronous generator control function can change the power output from power distribution grid storage battery power conversion device 44 in response to the load fluctuation or the change in power generation amount. However, since the frequency command value is generated in external controller 43, the change in the power output from power distribution grid storage battery power conversion device 44 that corresponds to the above-mentioned load fluctuation or change in power generation amount is not immediately reflected in the frequency command value.

Therefore, when the control gain (specifically a braking coefficient Dg and a speed adjustment rate Kgd) (described later) of virtual synchronous generator control circuit 433 in controller 43 is high, the frequency of the grid AC voltage output from each power distribution grid storage battery system 41 significantly changes. Thereby, when the electric power is exchanged between power distribution grid storage battery systems 41 to cause oscillation of the frequency of the grid AC voltage output from each power distribution grid storage battery system 41, each power distribution grid storage battery system 41 may ultimately stop.

Thus, in the present first embodiment, when a plurality of power distribution grid storage battery systems 41 (power distribution grid storage battery power conversion devices 44) each implementing virtual synchronous generator control are connected to a standalone grid (a standalone microgrid) and operate as a voltage source, CEMS 31 is configured such that a control gain (at least braking coefficient Dg) in the virtual synchronous generator control (described later) is set to be variable according to the number of power distribution grid storage battery systems 41 each implementing virtual synchronous generator control. Details of braking coefficient Dg will be described later. Thus, also when a plurality of power distribution grid storage battery systems 41 each implementing virtual synchronous generator control are connected in parallel to a standalone grid and operate as a voltage source, inertial force can be applied to power distribution grid 24 without causing unnecessary disturbance in power distribution grid 24.

Similarly, the control gain of virtual synchronous generator control circuit 433 in controller 43 is preferably set at a value different between the cases of a standalone microgrid and an interconnection grid each of which is constituted of power distribution grid storage battery system(s) 41 (power distribution grid storage battery power conversion device(s) 44). Specifically, in the case of the interconnection grid, the synchronous generator supporting the grid responds quickly. Thus, the control parameters (specifically, braking coefficient Dg and speed adjustment rate Kgd) in virtual synchronous generator control circuit 433 are set so as to decrease the control response speed of the grid AC voltage with respect to the load fluctuation or the change in power generation amount, to thereby make it possible to ensure the stability of the power grid. Specifically, the control gain of virtual synchronous generator control circuit 433 is also set by CEMS 31 such that the control response speed of the grid AC voltage with respect to the load fluctuation or the change in power generation amount is slower in the case where power distribution grid storage battery power conversion devices 44 constitute an interconnection grid than in the case where only one power distribution grid storage battery power conversion device 44 supports a standalone microgrid. Thereby, also when power distribution grid storage battery systems 41 each implementing a virtual synchronous generator control function constitute an interconnection grid, inertial force can be applied to the grid without causing unnecessary disturbance.

Figure 11:
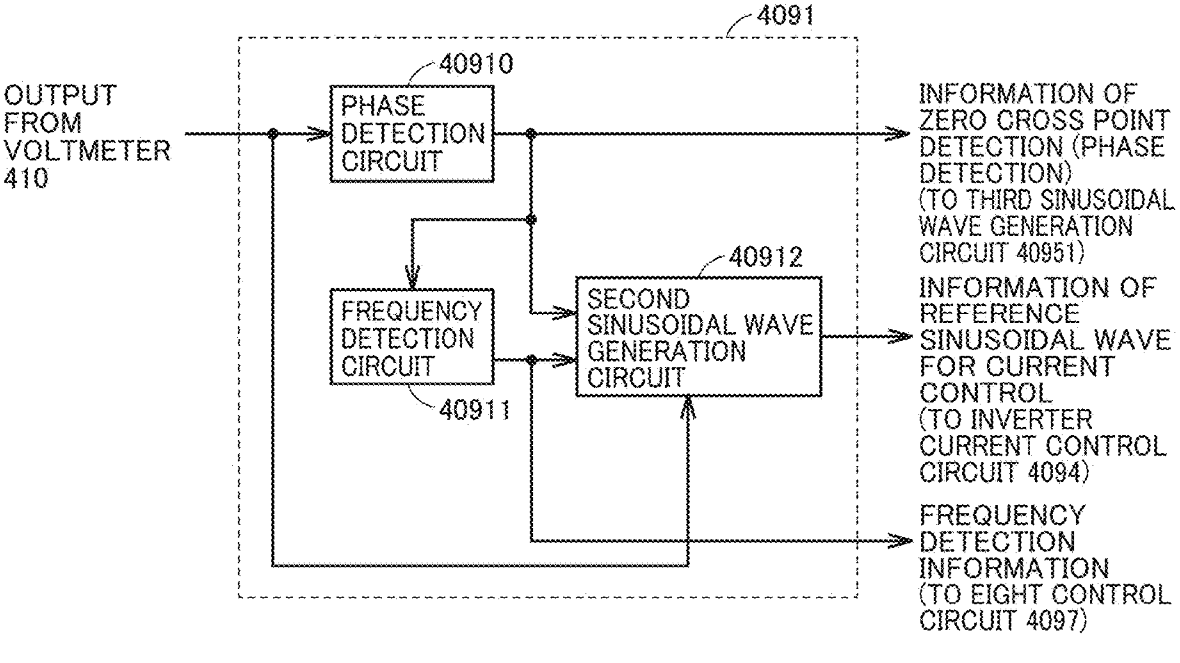
FIG. 11 is a block diagram illustrating a configuration of an AC frequency detection circuit shown in FIG. 10.

FIG. 11 is a block diagram illustrating a configuration of AC frequency detection circuit 4091 shown in FIG. 10.

Referring to FIG. 11, AC frequency detection circuit 4091 includes a phase detection circuit 40910, a frequency detection circuit 40911, and a second sinusoidal wave generation circuit 40912. For example, phase detection circuit 40910 detects a zero cross point from the voltage waveform in the AC grid that is output from voltmeter 410. As a matter of course, the method of phase detection by phase detection circuit 40910 is not limited to zero cross point detection.

Frequency detection circuit 40911 detects the frequency of the grid AC voltage from the period of the zero cross point output from phase detection circuit 40910.

Second sinusoidal wave generation circuit 40912 generates a sinusoidal wave synchronized with the grid AC voltage based on the zero cross point detection result in phase detection circuit 40910, the frequency detection result in frequency detection circuit 40911, and the grid AC voltage amplitude output from CEMS 31.

In the present first embodiment, the sinusoidal wave generated by second sinusoidal wave generation circuit 40912 is used when inverter current control circuit 4094 controls power distribution grid storage battery power conversion device 44 as a current source. AC frequency detection circuit 4091 outputs zero cross point detection information (for example, zero cross point detection time), frequency detection information, and sinusoidal wave information.

Figure 12:
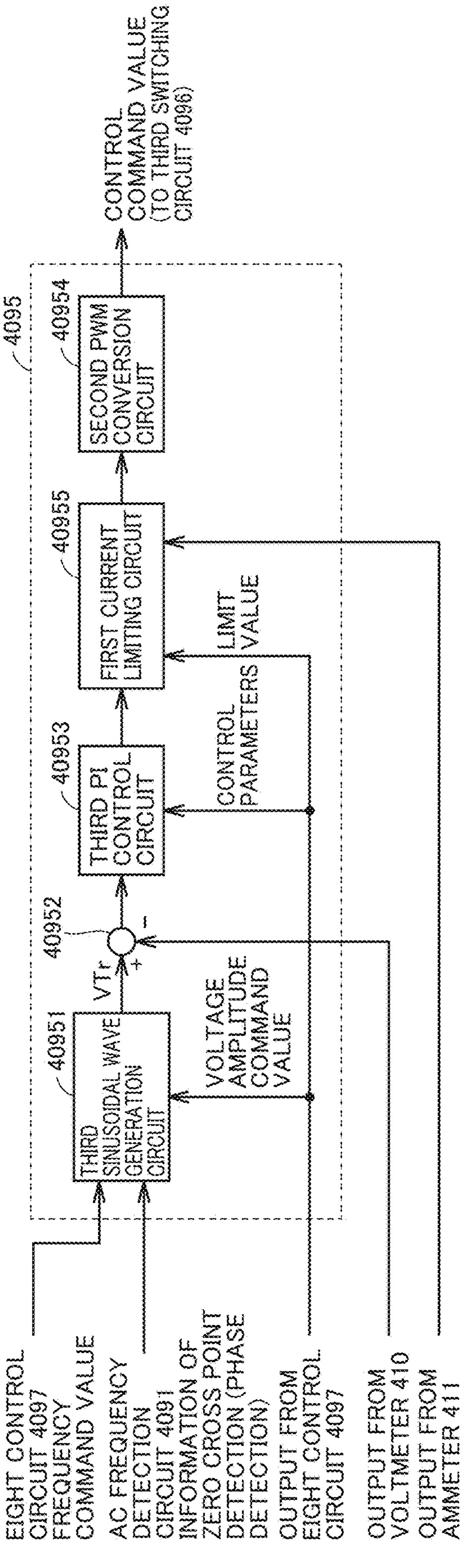
FIG. 12 is a block diagram illustrating a configuration of an inverter voltage control circuit shown in FIG. 10.

FIG. 12 is a block diagram illustrating a configuration of inverter voltage control circuit 4095 shown in FIG. 10.

Referring to FIG. 12, inverter voltage control circuit 4095 includes a third sinusoidal wave generation circuit 40951, a subtractor 40952, a third PI control circuit 40953, a second PWM conversion circuit 40954, and a first current limiting circuit 40955.

Inverter voltage control circuit 4095 generates a control command value used for controlling second DC/AC conversion circuit 408 based on the frequency information (a frequency command value) output from virtual synchronous generator control circuit 433 (described later in detail) in controller 43 and the amplitude information (a voltage amplitude command value) of the grid AC voltage generated by CEMS 31. In the present first embodiment, the frequency information and the amplitude information of the grid AC voltage that are output from controller 43 are input to inverter voltage control circuit 4095 via eighth control circuit 4097 through a path passing through communication interface 412 shown in FIG. 10.

The sinusoidal wave information (phase detection information) from AC frequency detection circuit 4091 is input to third sinusoidal wave generation circuit 40951. Third sinusoidal wave generation circuit 40951 generates a target value of the grid AC voltage output from second DC/AC conversion circuit 408, based on the input frequency information (the frequency command value), the phase information (the zero cross point detection information in the first embodiment), and the amplitude information of the grid AC voltage.

Subtractor 40952 subtracts the voltage measured by voltmeter 410 from the output value of third sinusoidal wave generation circuit 40951 (the target value of the grid AC voltage), and then outputs a voltage deviation. The calculated voltage deviation is output to third PI control circuit 40953. Third PI control circuit 40953 generates a control command value according to the PI control computation so as to compensate for the input voltage deviation, i.e., so as to set the voltage deviation at zero. Third PI control circuit 40953 outputs a control command value to first current limiting circuit 40955.

First current limiting circuit 40955 limits the control command value output from third PI control circuit 40953 based on the result of measurement by ammeter 411 that is input via eighth control circuit 4097. Specifically, when a current exceeding the current capacity of second DC/AC conversion circuit 408 flows, the control command value is reduced such that the current flowing through second DC/AC conversion circuit 408 becomes equal to or lower than a predetermined current value (for example, the current capacity of second DC/AC conversion circuit 408).

The output of first current limiting circuit 40955 is input to second PWM conversion circuit 40954. The control parameters (a control gain, an integration time, and a current limit value) for third PI control circuit 40953 and first current limiting circuit 40955 are generated by CEMS 31 and input to inverter voltage control circuit 4095 via controller 43 and eighth control circuit 4097. As described above, when the response speed of the voltage control unit (inverter voltage control circuit 4095) is decreased according to the number of inverters operating as a voltage source, the control parameters are configured by performing at least one of an operation to decrease the control gain of third PI control circuit 40953 and an operation to increase the integration time as the number of inverters increases.

Second PWM conversion circuit 40954 performs PWM modulation on the command value output from first current limiting circuit 40955 to generate a control command value for second DC/AC conversion circuit 408. The generated control command value is output to second DC/AC conversion circuit 408.

Eighth control circuit 4097 also notifies controller 43 (CEMS 31) through communication interface 412 about the information of the effective voltage, the active power, and the reactive power in the AC grid that have been measured by the effective voltage measurement unit (not shown) or the active/reactive power measurement unit (not shown) in the AC grid as mentioned above. The measurement results of the effective voltage, the active power, the reactive power, and the like in the AC grid are also notified from eighth control circuit 4097 to seventh control circuit 4044.

In the configuration in FIG. 12, in inverter voltage control circuit 4095, third sinusoidal wave generation circuit 40951 corresponds to one example of the "target AC voltage generation unit", and subtractor 40952, third PI control circuit 40953, second PWM conversion circuit 40954, and first current limiting circuit 40955 correspond to one example of the "voltage control unit". Further, communication interface 412 and voltmeter 410 in FIG. 6 correspond to examples of the "communication unit" and the "voltage measurement unit", respectively, and the AC frequency detection circuit in FIG. 10 (more specifically, phase detection circuit 40910 in FIG. 11) corresponds to one example of the "phase detection unit".

Figure 13:
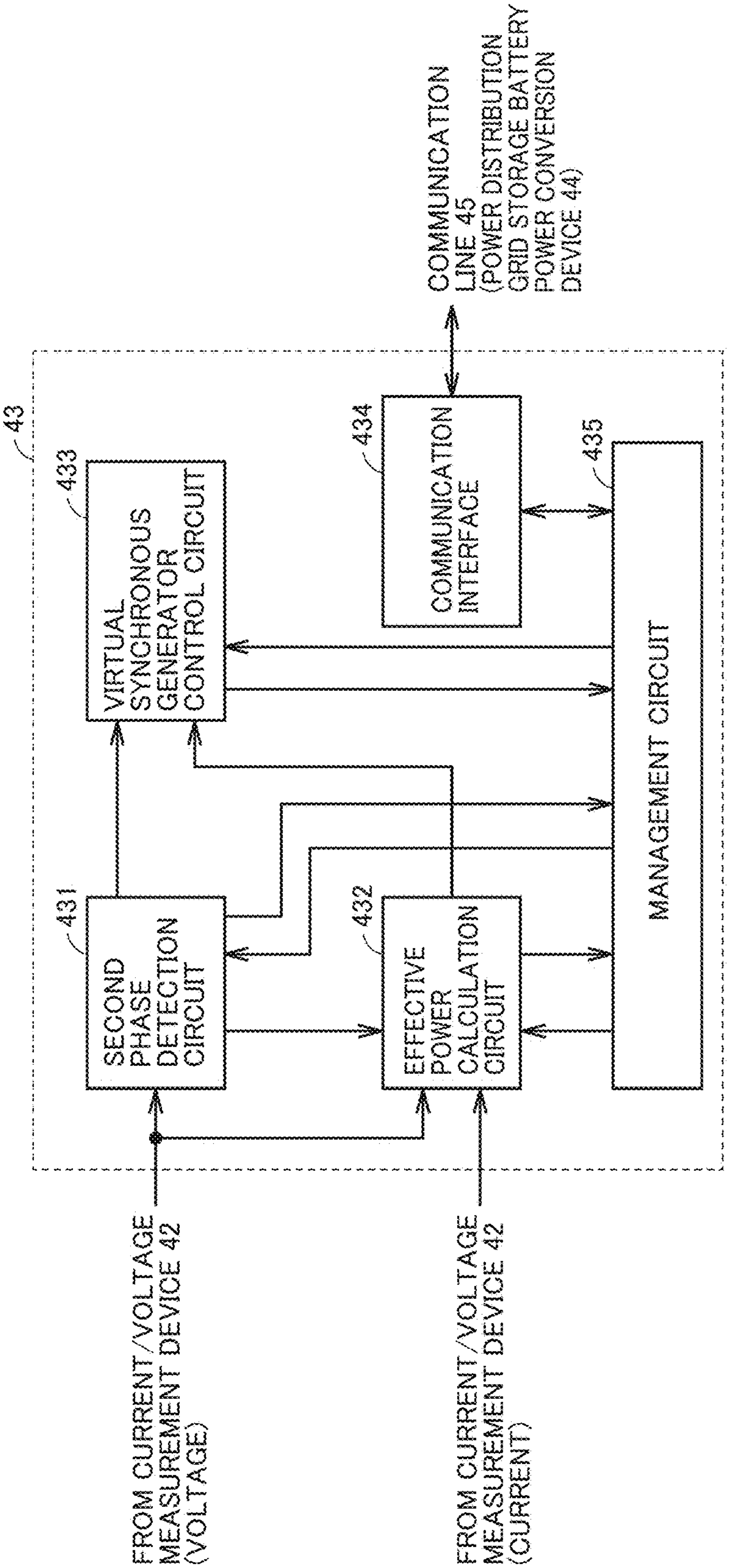
FIG. 13 is a block diagram illustrating a configuration of a controller 43 shown in FIG. 2.

FIG. 13 is a block diagram illustrating the configuration of controller 43 shown in FIG. 2.

Referring to FIG. 13, controller 43 includes a second phase detection circuit 431, an effective power calculation circuit 432, a virtual synchronous generator control circuit 433, a communication interface (I/F) 434, and a management circuit 435. Management circuit 435 can communicate with power distribution grid storage battery power conversion device 44 through communication interface 434 and communication line 45. As shown in FIG. 2, management circuit 435 can communicate also with CEMS 31.

Second phase detection circuit 431 detects a zero cross point from the voltage waveform in the AC grid that is output from current/voltage measurement device 42. For example, in the present first embodiment, specifically, the zero cross point time and the zero cross point detection timing are detected. Second phase detection circuit 431 calculates the frequency of the grid AC voltage from the previously detected zero cross point time information and the currently detected zero cross point time information. As described with regard to phase detection circuit 40910, the phase detection in second phase detection circuit 431 is not limited to zero cross point detection, and the method of calculating the frequency is not limited to the above-described method.

Effective power calculation circuit 432 calculates the effective power for one period of the grid AC voltage based on the current and voltage information of the AC grid that is output from current/voltage measurement device 42 and the zero cross point detection information output from second phase detection circuit 431. At this time, the effective voltage and the effective current are also calculated.

Based on the zero cross point information and the frequency information of the grid AC voltage that are output from second phase detection circuit 431 and the AC effective power information output from effective power calculation circuit 432, virtual synchronous generator control circuit 433 executes virtual synchronous generator control for allowing second DC/AC conversion circuit 408 (a static inverter) to have inertial force, synchronization force, and braking force that the synchronous generator has.

The following briefly describes the virtual synchronous generator control technique. Examples of the functions of a synchronous generator typified by thermal power generation include: a function of adjusting electric power output according to a frequency (a governor function): a function of maintaining an angular velocity (inertial force): a function of synchronizing with a grid AC voltage (synchronization force): a voltage adjustment function of a basic grid (an automatic voltage regulator (AVR): a function of continuing an operation even when the grid AC voltage instantaneously drops during a grid failure; and the like. In the virtual synchronous generator control technique, the transient response of the static inverter is controlled so as to simulate the transient function of the synchronous generator. Specifically, the output voltage of the static inverter is controlled so as to simulate three functions including: a governor function: a function simulating a mass point-system model (dynamic characteristics of a rotating machine) based on the swing equation; and an AVR function. The present first embodiment will be described particularly with regard to the case where a function simulating a mass point-system model based on the governor function and the swing equation is implemented.

Figure 34:
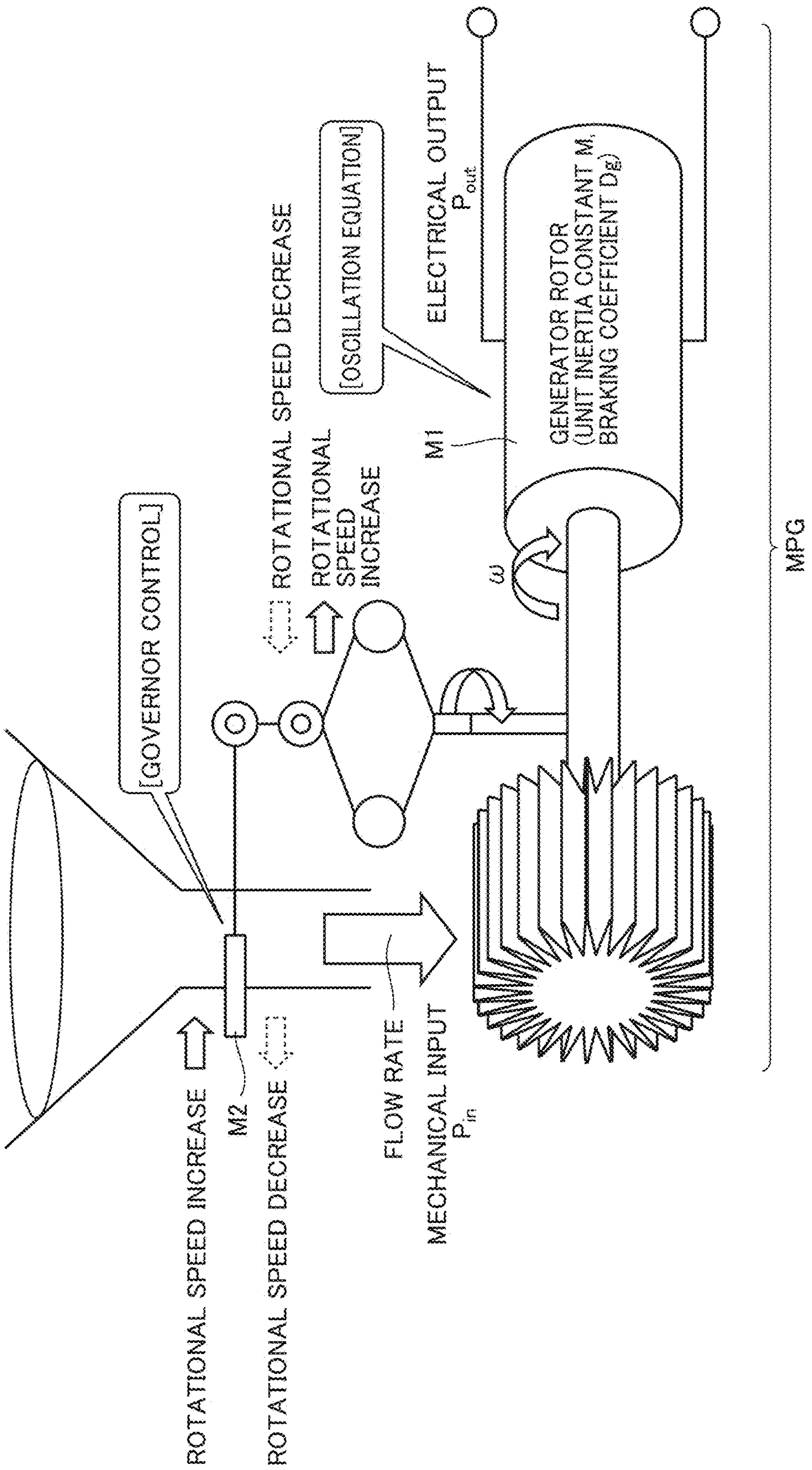
FIG. 34 is a conceptual diagram for illustrating a virtual synchronous generator control technique.

FIG. 34 shows a conceptual diagram for illustrating the virtual synchronous generator control technique. The AVR function of the synchronous generator is controlled mainly based on the output voltage command or the reactive power command value notified from a host system (CEMS 31 in the first embodiment). Thus, the first embodiment is described with reference to an example in which the AVR function is not implemented in virtual synchronous generator control circuit 433. In other words, the voltage amplitude command of the grid AC voltage is not generated in virtual synchronous generator control circuit 433, but is notified from CEMS 31 to power distribution grid storage battery power conversion device 44 through management circuit 435 and communication interface 434 in controller 43.

The following specifically describes a function simulating a mass point-system model based on the governor function and the swing equation.

First, the governor function will be described. A governor in a power plant has a function of controlling the power output from a generator by controlling the output from a gas turbine or a steam turbine of thermal power generation or nuclear power generation, a guide vane of a hydraulic turbine of hydraulic power generation, or the like.

In the AC power grid, when the demand power exceeds the supply power, the frequency of the grid AC voltage decreases. A thermal power generator and a hydraulic power generator capable of controlling output are configured to provide the governor with a drooping characteristic and thereby controlled to increase power generation as the frequency decreases. In contrast, when the supply power exceeds the demand power, the frequency of the grid AC voltage rises. Also in this case, the thermal power generator and the hydraulic power generator capable of controlling output are configured to provide the governor with a drooping characteristic and thereby controlled to decrease power generation as the frequency rises.

FIG. 34 schematically shows a governor function. In a synchronous generator model MPG shown in FIG. 34, a mechanical input Pin for rotating a rotor M1 of the synchronous generator is adjusted by the flow rate controlled by a regulation valve M2.

When an angular velocity ω of rotor M1 in the synchronous generator increases, regulation valve M2 for regulating the inflow of energy is controlled to move to the right side in the figure, to thereby reduce mechanical input Pin to the synchronous generator. On the other hand, when angular velocity ω of rotor M1 in the synchronous generator decreases, regulation valve M2 is controlled to move to the left side in the figure, to thereby increase mechanical input Pin to the synchronous generator.

Through the operation as described above, an electrical output Pout that is output from the synchronous generator can be independently controlled in accordance with the frequency of the grid AC voltage at its own terminal end that corresponds to angular velocity ω of the synchronous generator. Even when the above-described operation is performed individually by the synchronous generators, this operation is managed by the frequency of the grid AC voltage, and thus, the load can be shared among these generators. Regarding the governor, a model or the like configured in a shape of a first-order lag as a standard model is provided by the Institute of Electrical Engineers of Japan.

In the present first embodiment, an operation in the case where the governor is approximated by the above-mentioned first-order lag model will be described. The following equation (1) shows a transfer function G(s) of the first-order lag. In the equation (1), (−1/Kgd) represents a proportional gain (Kgd: a speed adjustment rate) of the governor, and Tg represents a time constant (Tg: a governor time constant) of the first-order lag.

$$G(s) = -1/(Kgd \times (1 + s \times Tg)) \tag{1}$$

Then, the function simulating a mass point-system model based on a swing equation will be described.

The synchronous generator includes rotor M1 having a unit inertia constant M as shown in FIG. 34. For example, in the case where the power generation by mega solar 26 abruptly decreases due to an abrupt change of solar radiation, the governor control cannot instantly cover a shortage of electric power.

The synchronous generator converts the rotational energy stored in rotor M1 into electric power and outputs the converted electric power to the grid. At this time, angular velocity ω (rotational speed) of the generator rotor decreases. When the angular velocity of rotor M1 decreases, mechanical input Pin supplied by the governor control increases to thereby cover a shortage of supply power relative to the demand power.

The equation (2) shows the swing equation simulating the mass point-system model of rotor M1 of the synchronous generator. In the equation (2), mechanical input Pin and electrical output Pout are divided by angular velocity ω and thereby converted into an input torque Tin and an output torque Tout. Further, in the equation (2), Dg represents a braking coefficient, and M represents a unit inertia constant as described above.

$$Tin - Tout = M \times (d\omega/dt) + Dg \times \omega \tag{2}$$

In the present first embodiment, the above-mentioned equations (1) and (2) are incorporated in controller 43 (virtual synchronous generator control circuit 433) external to power distribution grid storage battery power conversion device 44 to control the frequency of the static inverter (second DC/AC conversion circuit 408) inside power distribution grid storage battery power conversion device 44. Thereby, the static inverter (second DC/AC conversion circuit 408) operates as a voltage source so as to simulate the inertial force, the synchronization force, and the braking force of the synchronous generator.

Figure 14:
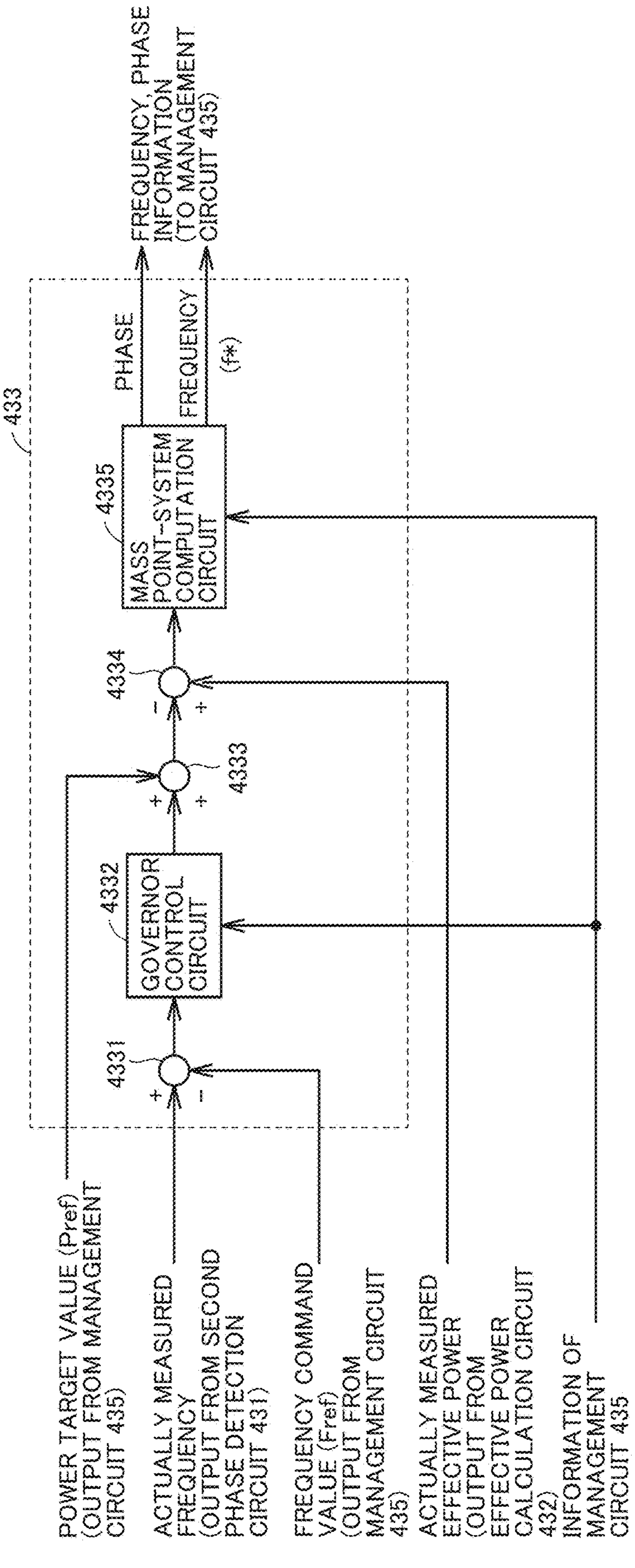
FIG. 14 is a block diagram illustrating a configuration of a virtual synchronous generator control circuit shown in FIG. 13.

FIG. 14 is a block diagram illustrating the configuration of virtual synchronous generator control circuit 433 shown in FIG. 13.

Referring to FIG. 14, virtual synchronous generator control circuit 433 includes a subtractor 4331, a governor control circuit 4332, an adder 4333, a subtractor 4334, and a mass point-system computation circuit 4335.

From the actually measured result of the frequency output from second phase detection circuit 431, subtractor 4331 subtracts a target frequency Fref (for example, 60 [Hz]) notified from CEMS 31 and output from management circuit 435 to thereby calculate a frequency deviation. The frequency deviation output from subtractor 4331 is input to governor control circuit 4332.

Figure 15:
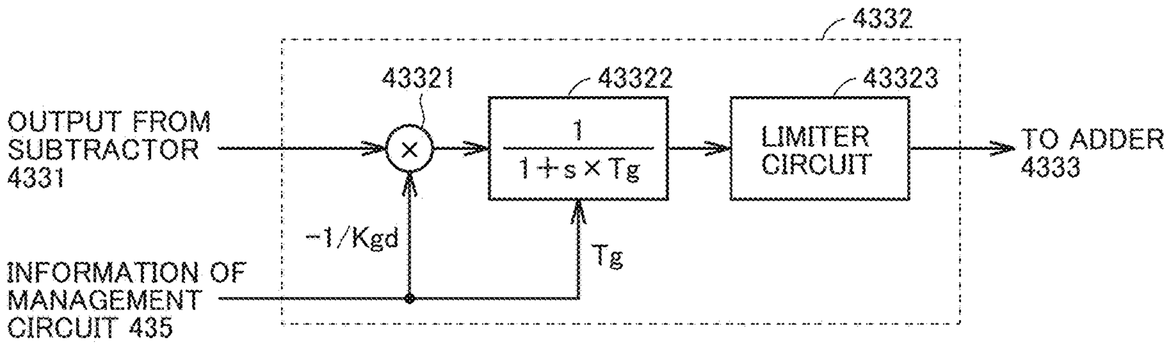
FIG. 15 is a block diagram illustrating a configuration of a governor control circuit shown in FIG. 14.

FIG. 15 is a block diagram illustrating a configuration of governor control circuit 4332.

Referring to FIG. 15, governor control circuit 4332 includes a multiplier 43321, a first-order lag model 43322, and a limiter circuit 43323. First-order lag model 43322 is expressed by a transfer function "1/(1+s×Tg)" in the above-mentioned equation (1).

Multiplier 43321 multiplies the output (frequency deviation) from subtractor 4331 by a proportional gain (−1/Kgd) notified from CEMS 31 and output from management circuit 435. The output value from multiplier 43321 is output to first-order lag model 43322. As described above, the present first embodiment illustrates the case where the standard model of the first-order lag type presented by the Institute of Electrical Engineers of Japan is used for governor control, and thus, first-order lag model 43322 is configured to implement the transfer function in the equation (1). The output of first-order lag model 43322 is subjected to limiter processing by limiter circuit 43323 and thereafter output to adder 4333 in FIG. 14.

Referring again to FIG. 14, adder 4333 adds the output of governor control circuit 4332 as an offset value (offset power) to a power target value Pref notified from CEMS 31 and output from management circuit 435. The output value from adder 4333 is set as a control power target value of mass point-system computation circuit 4335.

From the effective power output from effective power calculation circuit 432, subtractor 4334 subtracts the control power target value output from adder 4333 to calculate a power deviation. The power deviation calculated by subtractor 4334 is input to mass point-system computation circuit 4335.

Mass point-system computation circuit 4335 calculates the frequency and the phase of the grid AC voltage output from power distribution grid storage battery power conversion device 44 so as to compensate for the power deviation from subtractor 4334, i.e., to eliminate the power deviation to zero. As the control parameters (speed adjustment rate Kgd, governor time constant Tg, unit inertia constant M, and braking coefficient Dg) for governor control circuit 4332 and mass point-system computation circuit 4335, in the present first embodiment, the control parameters for virtual synchronous generator control that are notified from CEMS 31 are assumed to be used.

FIG. 16 is a block diagram illustrating a configuration of mass point-system computation circuit 4335 shown in FIG. 14.

Referring to FIG. 16, mass point-system computation circuit 4335 includes a subtractor 43351, an integrator 43352, a multiplier 43353, a divider 43354, an adder 43355, and a phase calculation circuit 43356.

Subtractor 43351 outputs a value obtained by subtracting the output value of multiplier 43353 from the power deviation output from subtractor 4334. The output value of subtractor 43351 is input to integrator 43352.

Integrator 43352 divides the output value of subtractor 43351 by unit inertia constant M (i.e., multiplied by (1/M)) and integrates the result to thereby generate a difference value (Δω) between a target angular velocity ωref of rotor M1 and angular velocity ω of rotor M1 in the synchronous generator shown in FIG. 34. For example, assuming that the frequency target value of the grid is defined at 60 [Hz], ωref=2×π×60 [rad/s].

The output value (Δω) of integrator 43352 is input to multiplier 43353 and multiplied by braking coefficient Dg notified from CEMS 31 and output from management circuit 435.

Subtractor 43351 subtracts the output of multiplier 43353 from the power deviation output from subtractor 4334. Thereby, mass point-system computation circuit 4335 can simulate the braking force of the synchronous generator under the control of second DC/AC conversion circuit 408.

The output (Δω) of integrator 43352 is divided by (2×π) in divider 43354 and thereby converted into frequency difference information (Δf). This frequency difference information (Δf) is added to the target frequency (60 Hz) in adder 43355 and thereby converted into the frequency (rotation frequency) of rotor M1 in the synchronous generator. The output of adder 43355 is input to management circuit 435 as a frequency command value f* for voltage control.

The output (rotation frequency) from adder 43355 is further input also to phase calculation circuit 43356. Phase calculation circuit 43356 integrates the frequency of rotor M1 to calculate the phase of rotor M1. The phase information obtained by phase calculation circuit 43356 is input to management circuit 435. In the commonly-used virtual synchronous generator control, the phase information can be handled as a voltage control phase target value, but is not directly used for voltage control in the present embodiment as described later.

In the present first embodiment, as described above, the control parameters for virtual synchronous generator control circuit 433 and inverter voltage control circuit 4095 in power distribution grid storage battery system 41 implementing virtual synchronous generator control are set differently between the case of an interconnection grid and the case of a standalone grid. Also in the standalone grid, the control parameters for virtual synchronous generator control circuit 433 and current control circuit 2090 (FIG. 8) are switched according to the presence or absence of the synchronous generator and the number of power distribution grid storage battery systems 41 each implementing virtual synchronous generator control and operating as a voltage source. More specifically, when the response speed of virtual synchronous generator control circuit 433 is slowed down, at least one of adjustments is performed, including an adjustment to increase the governor time constant (Tg), an adjustment to reduce speed adjustment rate Kgd (i.e., increase 1/Kgd), an adjustment to increase unit inertia constant M, and an adjustment to increase braking coefficient Dg. At this time, (some or all of) the targets of the control parameters to be adjusted are optional. Since the time constant of the mass point-system model can be represented by (M/Dg), both M and Dg can also be adjusted such that the time constant of the mass point-system model (M/Dg) is kept constant.

Then, the operation outline of the present first embodiment will be described with reference to FIGS. 1 to 27C.

FIG. 17 is a conceptual diagram illustrating a region covered by the virtual synchronous generator control implemented in power distribution grid storage battery system 41. In FIG. 17, the horizontal axis represents a time axis while the vertical axis represents a demand variation width.

Referring to FIG. 17, the virtual synchronous generator control for controlling the static inverter covers minute variations and short period variations in a range from several tens of [ms] to several minutes. In general, variations of several minutes or more are addressed by load frequency control (LFC) or economic load-dispatching control (EDC) in place of virtual synchronous generator control. Therefore, in the following description, the response performance of the virtual synchronous generator control unit (virtual synchronous generator control circuit 433) is assumed to be several seconds or less.

FIG. 18 is a timing chart for illustrating a problem in virtual synchronous generator control implemented in power distribution grid storage battery system 41 according to the first embodiment.

In FIG. 18, the waveform on the first stage shows the grid AC voltage output from power distribution grid storage battery system 41 (power distribution grid storage battery power conversion device 44). The second stage shows the timing of output of the results of effective power calculation from power distribution grid storage battery system 41 (power distribution grid storage battery power conversion device 44) that are calculated by effective power calculation circuit 432.

Further, the third stage shows the frequency calculation results calculated by virtual synchronous generator control circuit 433, i.e., the timing of calculation of the frequency command value. The fourth stage shows the timing of output of the frequency command value from communication interface 434.

As shown in FIG. 18, a delay time Td1 occurs before power distribution grid storage battery power conversion device 44 is notified of the frequency command value calculated to correspond to the grid AC voltage. Delay time Td1 includes a measurement delay (processing time taken when calculating the effective power and detecting the AC frequency) in controller 43, a processing delay (processing time for calculating the frequency command value based on the measurement results), and a communication delay (a delay time occurring when power distribution grid storage battery power conversion device 44 is notified of the calculated frequency command value). Due to the following reasons, delay time Td1 is not constant as indicated by an arrow in the figure.

In general, the internal process in controller 43 is executed by a central processing unit (CPU) (not shown), but the CPU processes various tasks including, for example, management of power distribution grid storage battery system 41, communication with CEMS 31, management of measurement data, and the like in addition to the virtual synchronous generator control. Therefore, even when the effective power calculation process and the zero cross point detection process are completed, a waiting time and the like for switching the processing task may occur, and thus, the delay time occurring in controller 43 is not constant.

Further, with regard to the communication delay, for example, the delay time varies depending on various cases such as the case where controller 43 communicates with other devices such as CEMS 31, the case where power distribution grid storage battery power conversion device 44 communicates with other devices, the case where the communication band is used for another communication, and the case where the transmitted data is retransmitted due to poor status of the communication path.

Figure 19:
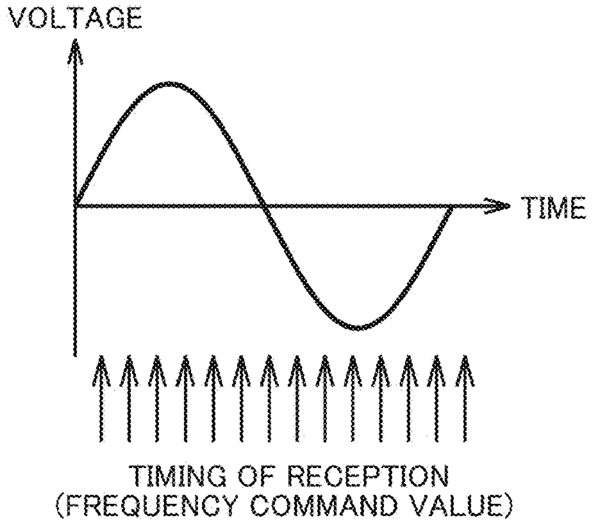
FIG. 19 is a conceptual waveform diagram for illustrating a timing of reception of a frequency command value of the power distribution grid storage battery system.

FIG. 19 is a conceptual waveform diagram for illustrating the timing of reception of the frequency command value and for illustrating the control operation of power distribution grid storage battery system 41. FIG. 19 shows the relation between the phase of the grid AC voltage output from power distribution grid storage battery power conversion device 44 and the timing at which the frequency command value is received.

FIG. 19 shows arrows indicating the timing at which third sinusoidal wave generation circuit 40951 (FIG. 12) in inverter voltage control circuit 4095 of power distribution grid storage battery power conversion device 44 is notified of the frequency command value and the voltage amplitude command value generated by controller 43 with respect to the waveform of the sinusoidal wave of the grid AC voltage output from power distribution grid storage battery power conversion device 44.

As described above, since delay time Td1 varies, the frequency command value is received at various voltage phases of the grid AC voltage output from power distribution grid storage battery power conversion device 44. Therefore, when the frequency of the grid AC voltage is changed unconditionally in the state in which the frequency command value is received, the target value (voltage value) of the grid AC voltage applied as a reference for voltage control becomes discontinuous at the timing at which the frequency is changed, with the result that grid disturbance may occur.

In this case, a target value Vtr of the grid AC voltage output from third sinusoidal wave generation circuit 40951 can be represented by the following equation (3) based on time t, a frequency command value f* generated by controller 43, a voltage amplitude command value V* notified from CEMS 31 via controller 43, and the current phase of Vtr defined as θ.

$$Vtr = V* \times \sin(2\times\pi\times f*\times t+\theta) \tag{3}$$

Figure 21:
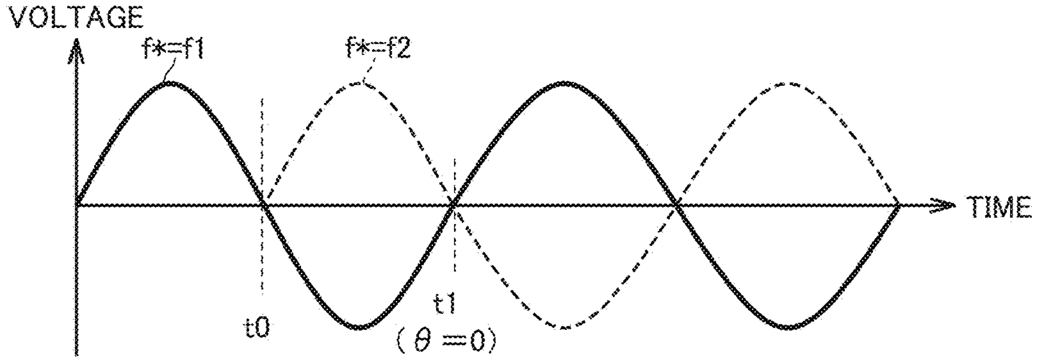
FIG. 21 is a conceptual waveform diagram for illustrating a timing at which the frequency command value output from the controller is reflected.

FIG. 21 is a conceptual waveform diagram for illustrating the timing at which the frequency command value output from the controller is reflected.

FIG. 21 shows an operation performed when frequency command value f*=f2 is received at time to in the state in which the grid AC voltage is controlled at frequency command value f*=f1. In FIG. 21, a solid line indicates a target voltage waveform in accordance with f*=f1. When the change of frequency command value f* is reflected to change target value Vtr immediately at the timing of reception of the changed frequency command value f*, the following problem may occur.

The target value of the grid AC voltage at time to is defined as V*×sin (2×π×f1×t0+θ) under the condition of f*=f1, but is defined as V*×sin (2×π×f2×t0+θ) under the different condition of f*=f2. Thereby, if significant discontinuity occurs when the phase angle of sin changes from (2×π×f1×t0+θ) to (2×π×f2×t0+θ), the continuity of the voltage value (instantaneous value) of target value Vtr cannot be ensured.

For example, when the difference between the phase angle (2×π×f1×t0+θ) and the phase angle (2×π×f2×t0+θ) is π (180 [deg]), the waveform of target value Vtr at and after time to appears as shown by a broken line. Thus, it is understood that target value Vtr (voltage value) of the grid AC voltage may deviate in phase by up to T (180 [deg]) at a boundary of time t0.

Thus, in the present first embodiment, power distribution grid storage battery power conversion device 44 detects the phase of the grid AC voltage that is currently being output, and calculates target value Vtr of the grid AC voltage (hereinafter also referred to as a target AC voltage Vtr) based on the detected phase information. More specifically, in the present first embodiment, target AC voltage Vtr is calculated according to the equation (4) using the zero cross point of the grid AC voltage detected from the AC voltage information measured by voltmeter 410. In the equation (4), tn represents the current time, and tzc represents the time at which the zero cross point is detected.

$$Vtr = V* \times \sin(2\pi \times f* \times (tn - tzc)) \quad (4)$$

By defining the zero cross point detection time as t=0 and representing the above-mentioned current time tn, the equation (4) can be modified to the following equation (5). According to the equations (4) and (5), target AC voltage Vtr is generated using the phase angle of the sinusoidal wave calculated based on the angular velocity (2π×f*) corresponding to frequency command value f* using the phase angle at the zero cross point as a reference (0 [deg]).

$$Vtr = V* \times \sin(2\pi \times f* \times tn) \quad (5)$$

Figure 20:
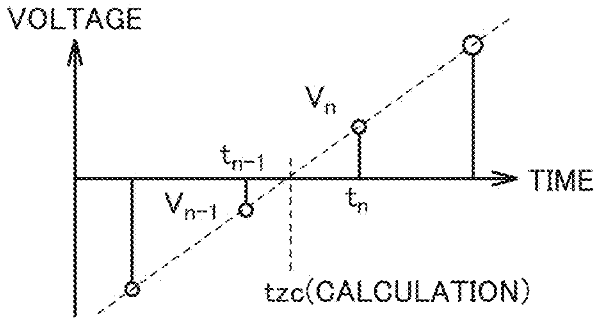
FIG. 20 is a conceptual diagram illustrating an example of a method of detecting a zero cross point.

The following describes an example of a method of detecting the zero cross point detection time with reference to FIG. 20.

In the present first embodiment, the grid AC voltage measured by voltmeter 410 is converted into digital data with the use of an A/D converter (not shown). The sampling frequency at this time can be tuned, for example, to the carrier frequency in second PWM conversion circuit 40954.

The digitally converted grid AC voltage (digital value) is subjected to a filtering process using a finite impulse response (FIR) filter or the like, so that a noise component is suppressed. FIG. 20 shows an enlarged view of the vicinity of the zero cross point (a rising portion, i.e., around phase θ=0 [deg]) of the grid AC voltage (digital value) after the filtering process.

Referring to FIG. 20, signs (positive/negative) are inverted between two grid AC voltages (digital values) sandwiching the zero cross point. In order to detect the zero cross point, two sampling times $t_{n-1}$ and $t_n$ are extracted at which the sign of the grid AC voltage changes from negative to positive. By linear interpolation of voltage value $V_{n-1}$ ($V_{n-1}<0$) at time $t_{n-1}$ and voltage value $V_n$ ($V_n>0$) at time tn, detection time tzc at the zero cross point can be obtained by the following equation (6).

$$tzc = (t_{n-1}) + (t_n - t_{n-1}) \times -V_{n-1}/(V_n - V_{n-1}) \quad (6)$$

There are two types of zero cross point of the AC waveform, including: θ=0 [deg] at which the sign is changed from negative to positive to thereby allow detection; and θ=180 [deg] at which the sign is changed from positive to negative to thereby allow detection. In the following description of the present embodiment, the zero cross point of θ=0 [deg] is defined as a target and simply referred to as a zero cross point.

Referring again to FIG. 21, in the present first embodiment, the frequency of the target value (voltage value) of the grid AC voltage output from third sinusoidal wave generation circuit 40951 is switched based on the grid AC voltage measured by voltmeter 410, i.e., the zero cross point of the grid AC voltage output from power distribution grid storage battery power conversion device 44.

In other words, in the example in FIG. 21, even when frequency command value f*=f2 is received at time t0, target AC voltage Vtr is set as f*=f1 until time t1 corresponding to the zero cross point. Then, calculation of target AC voltage Vtr defined as f*=f2 is started from time t1. Thereby, when the voltage value of target AC voltage Vtr is in the vicinity of zero, frequency command value f* and/or voltage amplitude command value V* are/is switched, so that the continuity of the voltage value can be ensured.

In other words, as shown in FIG. 19, even if the frequency command value is received at various phases of the grid AC voltage output by power distribution grid storage battery power conversion device 44 due to the processing delay, the communication delay, and the like of controller 43, but when the frequency command value is switched at the timing of the zero cross point, the grid AC voltage can be output from power distribution grid storage battery power conversion device 44 without causing unnecessary disturbance in the grid.

Then, the operation of the power conversion device according to the present first embodiment will be described with reference to FIGS. 1 to 27C.

Referring again to FIG. 1, the following describes a power distribution grid to which the power conversion device according to the first embodiment is connected. In the first embodiment, three SVRs 23 are connected in series to power distribution grid 24 between substation 20 and mega-solar power conversion device 27 (or power distribution grid storage battery system 41*a* or town D 100*d*) in order to control the power distribution grid voltage from substation 20 to fall within a prescribed voltage.

Further, power distribution grid storage battery system 41*a* is installed in the vicinity of mega-solar power conversion device 27 that operates as a current source. In the present first embodiment, power distribution grid storage battery system 41*a* operates as a voltage source, and the electric power generated by mega solar 26 is also averaged by operating virtual synchronous generator control circuit 433 of power distribution grid storage battery system 41*a*.

Further, examples of the load include town A 100*a*, town B 100*b*, town C 100*c*, town D 100*d*, factory 101, building 102, and apartment 103. These loads receive electric power supplied from substation 20, electric power generated by mega solar 26, and electric power from power distribution grid storage batteries 40*a* to 40*c*. Further, for emergency, synchronous generator 30*a* is placed in factory 101 and synchronous generator 30*b* is placed in building 102.

The following describes the operation of the grid in which the power distribution grid is supported by the electric power supplied from substation 20, the electric power generated by mega solar 26, and the electric power discharged from power distribution grid storage batteries 40*a* to 40*c*.

Figure 22:
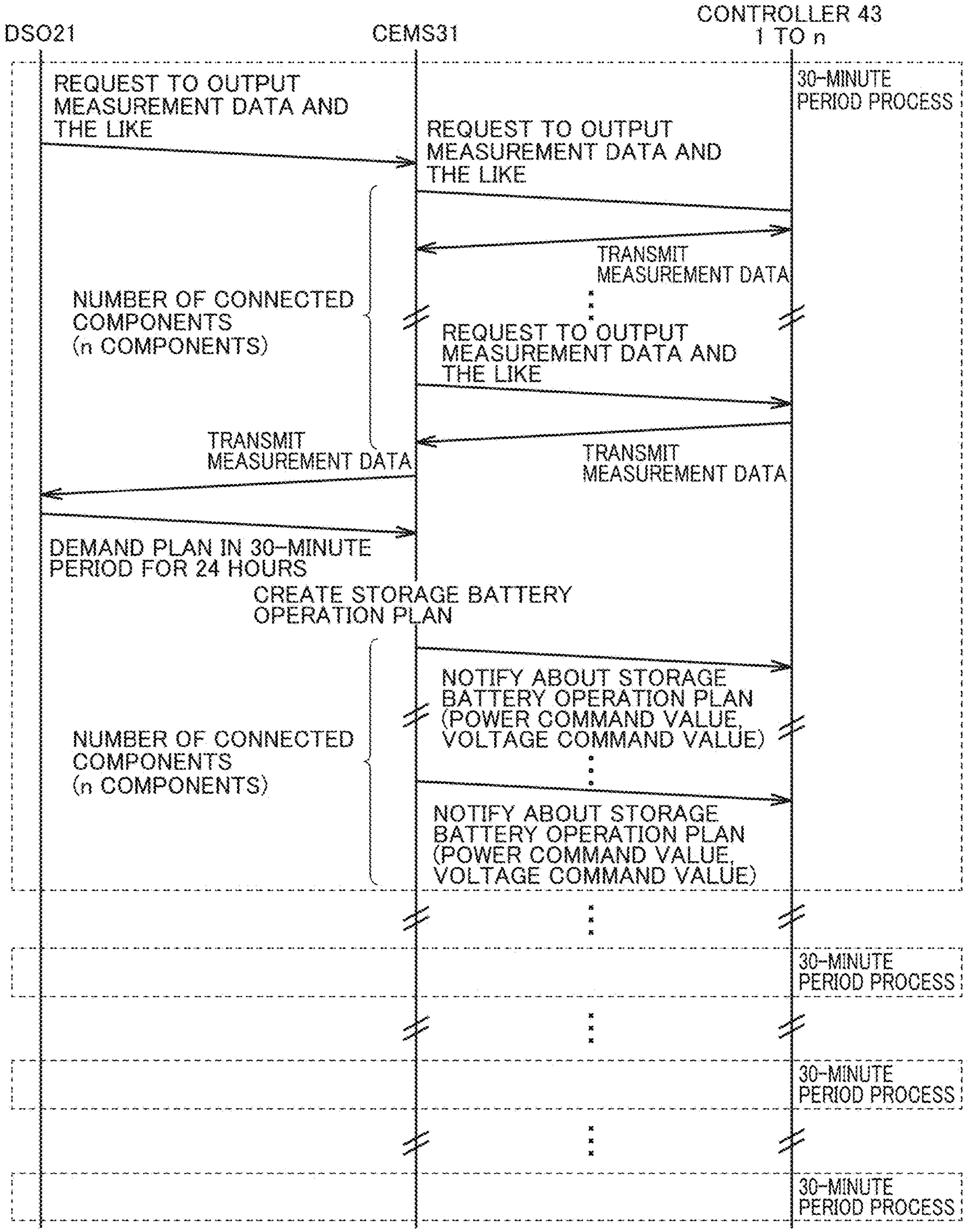
FIG. 22 is a sequence diagram of a distributed power supply system centered on the CEMS shown in FIG. 1.

FIG. 22 is a sequence diagram of a distributed power supply system centered on CEMS 31 shown in FIG. 1. FIG. 22 shows a process sequence in a 30-minute period that is executed centered on CEMS 31. CEMS 31 creates an operation plan while collectively controlling n (n is an integer) controllers 43.

In FIG. 22, when the 30-minute period process is started, DSO 21 outputs a request through communication line 25 to CEMS 31 to output the collected measurement data. When CEMS 31 receives the request from DSO 21, it requests power distribution grid storage battery system 41 to transmit the measurement data (the charge/discharge power amount for 30 minutes, the SOC information, and the like). When controller 43 in power distribution grid storage battery system 41 receives the request to transmit the measurement data from CEMS 31, it notifies CEMS 31 about the measurement data.

When collection of the measurement data from all of power distribution grid storage battery systems 41 is completed, CEMS 31 transmits the measurement data to DSO 21. This measurement data has been collected for use in creating the operation plan of power distribution grid storage battery 40 and includes the data related to the consumers and collected in the 30-minute period process by CEMS 31. The collected measurement data to be transmitted includes, for example, the measurement results such as the amount of electric power consumed by each consumer, the amount of electric power generated by mega solar 26, the amount of electric power for charging/discharging of power distribution grid storage battery 40, and the SOC.

When DSO 21 receives the measurement results, it creates a supply and demand plan of a 30-minute period for 24 hours that is required for creating the operation plan of power distribution grid storage battery 40, and notifies CEMS 31 about the created operation plan. The supply and demand plan defines the total amount of electric power supplied to power distribution grid 24 via substation 20 in every 30 minutes.

When CEMS 31 receives the above-mentioned information to be used for creating the operation plan of power distribution grid storage battery 40, CEMS 31 generates the operation plan and the control parameters for power distribution grid storage battery 40. Note that specific methods of creating an operation plan and generating control parameters will be described later. When creation of the operation plan and generation of the control parameters for power distribution grid storage battery 40 are completed, CEMS 31 transmits the operation plan and the control parameters to controller 43 in each power distribution grid storage battery system 41, and ends the 30-minute period process.

Then, a sequence of power distribution grid storage battery system 41 centered on controller 43 will be described with reference to FIG. 23.

Figure 23:
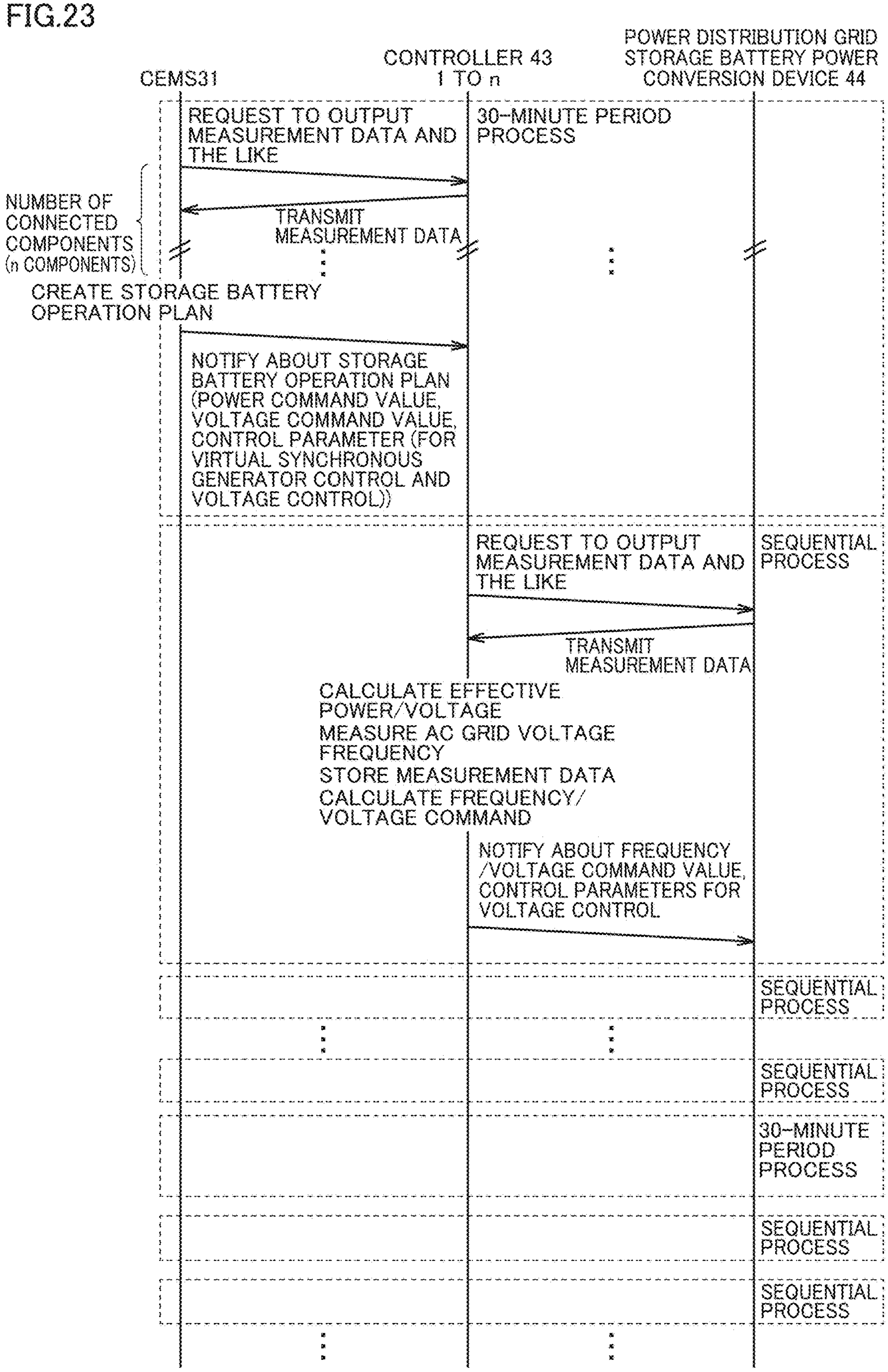
FIG. 23 is a sequence diagram of the power distribution grid storage battery system centered on the controller shown in FIG. 2.

Referring to FIG. 23, when the above-described 30-minute period process ends and reception of the storage battery operation plan completes, controller 43 starts a sequential process. In the present first embodiment, the storage battery operation plan is a plan for 30 minutes and includes a power command value for power distribution grid storage battery 40, a voltage amplitude command value for the grid AC voltage, and various control parameters. The control parameters include parameters for the control units in virtual synchronous generator control circuit 433 and inverter voltage control circuit 4095.

In the sequential process, controller 43 transmits a request to power distribution grid storage battery power conversion device 44 to output the measurement data such as charge/discharge power. Upon receipt of the request to output the measurement data, power distribution grid storage battery power conversion device 44 outputs the measurement data (measurement results) to controller 43. Controller 43 temporarily stores the received measurement results in a memory (not shown).

Further, controller 43 samples the AC current and the AC voltage of power distribution grid 24 output from current/voltage measurement device 42 at a predetermined time interval (in a sampling period). Based on the sampling values, controller 43 causes second phase detection circuit 431 (FIG. 13) to detect the zero cross point time of the grid AC voltage and causes effective power calculation circuit 432 (FIG. 13) to calculate the effective active power and the effective reactive power. Further, effective power calculation circuit 432 further calculate an effective voltage and an effective current based on the measured grid AC voltage and AC grid current.

When controller 43 completes the reception of the measurement data from power distribution grid storage battery power conversion device 44, then, based on the output of current/voltage measurement device 42 and the power command value received from CEMS 31, controller 43 causes virtual synchronous generator control circuit 433 (FIG. 13) to calculate a frequency command value to be notified to power distribution grid storage battery power conversion device 44.

When the calculation of the frequency command value ends, controller 43 notifies power distribution grid storage battery power conversion device 44 about the calculated frequency command value, and about the voltage amplitude command value and the control parameters for voltage control that have been received from CEMS 31. Thus, the sequential process of controller 43 ends. In the present first embodiment, it is assumed that the sequential process of controller 43 is executed every one period (1/60 [sec]) of the grid AC voltage as illustrated in FIG. 18. However, the period of the sequential process is not limited to one period of the grid AC voltage, but the above-mentioned sequential process may be performed in each of multiple periods or each half period of the grid AC voltage.

Figure 24:
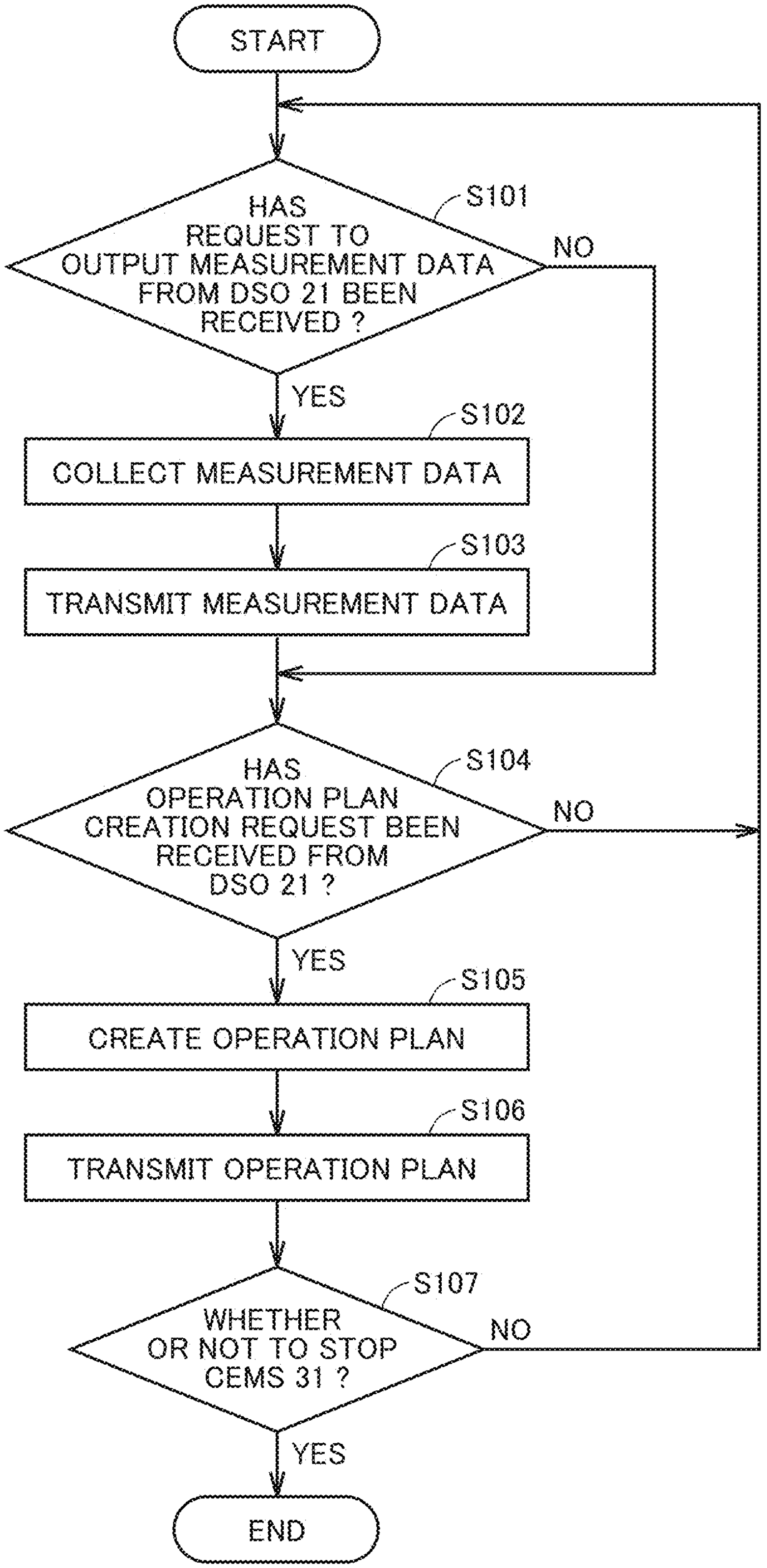
FIG. 24 is a flowchart illustrating a control process in the CEMS shown in FIG. 1.

Then, the detailed operation of CEMS 31 will be described with reference to FIG. 24. FIG. 24 is a flowchart illustrating a control process of CEMS 31 shown in FIG. 1.

Referring to FIG. 24, when the process is started, CEMS 31 checks in S101 whether or not a request to output the measurement data has been received from DSO 21. When the output request has been received (determined as YES in S101), then in S102, CEMS 31 collects the measurement data from n controllers 43 through communication circuit 311 and temporarily stores the measurement data in storage circuit 312. Further, in S103, CEM 31 transmits the measurement data stored in storage circuit 312 to DSO 21.

After transmission of the measurement data in S103 and when it is determined as NO in S101 (the output request has not been received from DSO 21), CEMS 31 checks in S104 whether or not the operation plan creation request has been received from DSO 21. If the request has not been received (determined as NO in S104), the process is returned to S101. On the other hand, when the request has been received (determined as YES in S104), CEMS 31 advances the process to S105 to execute the process of creating the operation plan.

Figure 25:
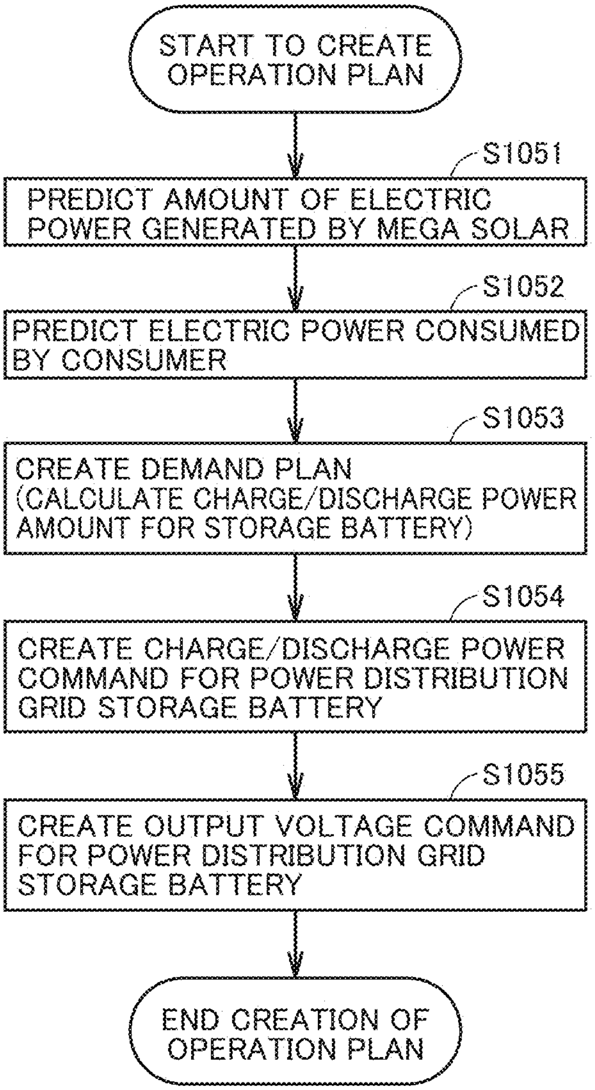
FIG. 25 is a flowchart illustrating details of a step of creating an operation plan shown in FIG. 24.

FIG. 25 is a flowchart illustrating the details of the operation plan creation process in S105 in FIG. 24.

Referring to FIG. 25, when creation of the operation plan is started, CEMS 31 predicts the amount of electric power generated by mega solar 26 in S1051.

Referring back to FIGS. 3 and 4, in S1051, when distributed power supply management unit control circuit 316 receives a notification about the storage battery operation plan from DSO 21 via communication circuit 311, it outputs an instruction to create an operation plan to operation plan creation unit management circuit 3146 (FIG. 4) in operation plan creation circuit 314. Upon receipt of the creation instruction, operation plan creation unit management circuit 3146 (FIG. 4) outputs an instruction to power generation amount prediction circuit 3142 (FIG. 4) via storage battery operation plan generation circuit 3141 (FIG. 4) to predict power generation by mega solar 26.

Upon receipt of the prediction instruction, power generation amount prediction circuit 3142 acquires the weather forecasts for 24 hours from a weather forecast server (not shown) disposed on the Internet. Further, power generation amount prediction circuit 3142 predicts the power generation amount for 24 hours with the use of the acquired weather forecasts and the data in a database (not shown) for power generation amount prediction that is managed by power generation amount prediction circuit 3142. Thereby, the process in S1051 in FIG. 25 is executed. Note that the database for power generation amount prediction can be constructed of the information about the actual results of weather and the actual results of power generation amount of mega solar 26 that are collected in a 30-minute period. Although the method of constructing such a database will not be specifically described, any optional method can be adopted.

Referring again to FIG. 25, when the power generation amount prediction in S1051 ends, CEMS 31 predicts the electric power consumed by a consumer in S1052.

Referring back to FIG. 4, in S1052, upon receipt of the result of prediction about the power generation amount of mega solar 26 from power generation amount prediction circuit 3142, operation plan creation unit management circuit 3146 outputs an instruction to power consumption prediction circuit 3143 via storage battery operation plan generation circuit 3141 to predict the electric power consumed by the consumer. Upon receipt of the instruction for prediction, power consumption prediction circuit 3143 predicts the electric power consumed by the consumer for 24 hours with the use of the data (not shown) in the database for power consumption prediction that is managed by power consumption prediction circuit 3143. Note that the database for power consumption prediction can be constructed by compiling data of the electric power consumed by consumers collected in a 30-minute period by layers of information including year, month, date, day of the week, time information, and weather information. Although the method of constructing the database will also not be described, any optional method can be adopted.

Referring back to FIG. 25, when the prediction of the electric power consumed by the consumer in S1052 ends, CEM 31 starts to create a demand plan in S1053.

Referring back to FIG. 4, in S1053, upon receipt of the prediction result of the power consumption by the consumer from power consumption prediction circuit 3143, storage battery operation plan generation circuit 3141 in operation plan creation circuit 314 creates a charge/discharge plan for each 30 minutes for power distribution grid storage batteries 40*a* to 40*c* based on the prediction result of the power generation amount of mega solar 26 by power generation amount prediction circuit 3142, the prediction result of the power consumption by the consumer by power consumption prediction circuit 3143, and the power demand plan notified from DSO 21. The charge/discharge plan shows a plan of a total value of the amounts of electric power for charging and discharging of power distribution grid storage battery 40 connected to power distribution grid 24 in each 30 minutes. Further, as described above, the power supply and demand plan shows a power supply plan (total supply power amount per 30 minutes) for 24 hours planned for power distribution grid 24 subsequent to substation 20.

Referring again to FIG. 25, when creation of the demand plan in S1053 ends, CEMS 31 creates a plan for the charge/discharge power of each of power distribution grid storage batteries 40*a* to 40*c* in S1054.

Referring back to FIGS. 3 and 4, in S1054, based on the SOC information about power distribution grid storage batteries 40*a* to 40*c* and the storage battery capacities of power distribution grid storage batteries 40*a* to 40*c* that have been collected in storage circuit 312 via communication circuit 311, storage battery operation plan generation circuit 3141 allocates the charge/discharge power of the above-described charge/discharge plan (the total value of the entire power distribution grid storage battery 40) among power distribution grid storage batteries 40*a* to 40*c* to determine the charge/discharge power for each of power distribution grid storage batteries 40*a* to 40 for each 30 minutes.

In the first embodiment, in the case where the charge power amount is small when the storage battery operation plan for 24 hours is created, the operation plan is created such that the SOCs of power distribution grid storage batteries 40*a* to 40*c* substantially simultaneously become zero. Alternatively, when the charge power amount is sufficient, the operation plan is created such that power distribution grid storage batteries 40*a* to 40*c* are substantially simultaneously fully charged, which is due to the following reason.

For example, it is assumed that power generation decreases, for example, from 10 [MW] to 4 [MW] due to a cloud passing over mega solar 26 that is generating 10 [MW] of electric power (for example, for about 5 minutes). Also, the static inverter capacities of power distribution grid storage battery systems 41*a*, 41*b*, and 41*c* are assumed to be 8 [MW], 4 [MW], and 2 [MW], respectively.

In this case, it is assumed that in the state in which power distribution grid storage battery 40*a* is stopped while the SOC becomes zero, the storage battery operation plan has been notified to discharge electric power of 1 [MW] and 0.5 [MW] from power distribution grid storage batteries 40*b* and 40*c*, respectively. In this case, due to an abrupt change of solar radiation, even if the discharge power from each of power distribution grid storage batteries 40*b* and 40*c* is increased by virtual synchronous generator control, it can be increased only up to the static inverter capacity, i.e., electric power of only 3 [MW] and 1.5 [MW] can be increased. In other words, the shortage of 6 [MW] cannot be entirely covered due to the influence that power distribution grid storage battery 40*a* cannot be used.

On the other hand, when power distribution grid storage batteries 40*a* to 40*c* are operating, electric power up to 14 [MW] that is the total value of the static inverter capacities of power distribution grid storage battery systems 41*a* to 41*c* can be discharged, and therefore, the range of electric power that can be covered by the virtual synchronous generator control is widened. Thus, in order to increase the number of power distribution grid storage battery systems 41 that can be operated in parallel, CEMS 31 preferably creates an operation plan for power distribution grid storage battery 40 such that power distribution grid storage batteries 40*a* to 40*c* substantially simultaneously attain a zero SOC or are fully charged.

Referring again to FIG. 25, when planning of the charge/discharge power for power distribution grid storage batteries 40*a* to 40*c* in S1054 ends, CEMS 31 generates an output voltage command value for power distribution grid storage battery 40 in S1055. In the present first embodiment, as described above, the output voltage command value of the AC grid voltage notified from CEMS 31 is used as the voltage amplitude (the voltage command value) for power distribution grid storage battery 40. When S1055 ends, CEMS 31 ends the operation plan creation process in S105.

Referring back to FIG. 24, when CEMS 31 ends creation of the operation plan (S105), it transmits the created operation plan in S106.

Referring back to FIG. 4, in S106, storage battery operation plan generation circuit 3141 notifies distributed power supply operation plan creation management circuit 3145 about the created operation plan (the power target value). Upon receipt of the operation plan, distributed power supply operation plan creation management circuit 3145 stores the received operation plan in a memory (not shown) and notifies transmission data generation circuit 315 about the operation plan (FIG. 3).

Upon receipt of the operation plan (the power target value), transmission data generation circuit 315 processes the received operation plan into a transmission format and outputs the same to communication circuit 311. Upon receipt of the transmission data from transmission data generation circuit 315, communication circuit 311 transmits the received transmission data to controller 43 in the corresponding power distribution grid storage battery system 41 through communication line 25.

Referring again to FIG. 24, when transmission of the operation plans to all of power distribution grid storage battery systems 41 is completed in S106, CEMS 24 advances the process to S107 to check whether or not to stop CEMS 31. When CEMS 31 is to be stopped (determined as YES in S107), the process of CEMS 31 ends. On the other hand, if CEMS 31 is not stopped (determined as NO in S107), the process is returned to S101, and then, CEM 31 continues the operation.

Then, the operations of mega-solar power conversion device 27 and power distribution grid storage battery system 41 will be described with reference to FIGS. 5 to 27C. First, the operation of mega-solar power conversion device 27 will be described with reference to FIG. 5.

Referring to FIG. 5, when mega solar 26 starts power generation, the generated electric power output from mega solar 26 is input to first DC/DC conversion circuit 203 in mega-solar power conversion device 27. Thereby, the first DC voltage output from mega solar 26 rises. First control circuit 204 causes voltmeter 201 to monitor the first DC voltage. When the first DC voltage exceeds a prescribed voltage value, first control circuit 204 causes mega-solar power conversion device 27 to shift from the standby operation to the normal operation. When mega-solar power conversion device 27 is shifted to operate in the normal operation, second control circuit 209 controls first DC/AC conversion circuit 208 in mega-solar power conversion device 27.

The following describes the operation of mega-solar power conversion device 27 in the normal operation. In FIG. 5, first control circuit 204 checks whether or not electric power is generated by mega solar 26. Specifically, based on the output voltage (the first DC voltage) of mega solar 26 monitored by voltmeter 201 as described above, it is checked whether or not power generation is possible. When the first DC voltage exceeds a prescribed voltage value, first control circuit 204 notifies second control circuit 209 that mega solar 26 can generate electric power.

Upon receipt of the above-mentioned notification, second control circuit 209 monitors the grid AC voltage of power distribution grid 24 with voltmeter 210 to thereby check whether or not a power failure occurs in power distribution grid 24 of AC power, i.e., whether or not the grid AC voltage is supplied.

When second control circuit 209 confirms based on the detection value of voltmeter 210 that a prescribed grid AC voltage is supplied and a power failure does not occur in power distribution grid 24, second control circuit 209 starts up DC/AC conversion circuit 208 and outputs an instruction to first control circuit 204 to start power generation by mega solar 26.

In the description of the present first embodiment, in the normal operation, the DC bus voltage on DC bus 205 is managed by first DC/AC conversion circuit 208.

Further, in the present first embodiment, the electric power regenerated in power distribution grid 24 is managed by current control of first DC/AC conversion circuit 208 so as to operate the entire distributed power supply system.

Referring to FIG. 7, when fifth control circuit 2044 in first control circuit 204 receives a notification of an instruction from second control circuit 209 (FIG. 5) to start power generation by mega solar 26, it outputs an instruction to MPPT control circuit 2041 to start the maximum power point tracking control for mega solar 26.

The following briefly describes the maximum power point tracking control method. In the maximum power point tracking control, it is sequentially managed whether the previous output voltage command value has increased or decreased as compared with the second previous output voltage command value. Then, the currently measured electric power generated by mega solar 26 is compared with the previously measured electric power generated by mega solar 26. When the amount of the currently measured electric power has increased, the output voltage command value is changed in the same direction as the previous direction. Specifically, when the result of the currently measured power generation amount shows that the amount of electric power generated by mega solar 26 has increased, the current (present) output voltage command value is controlled to increase if the previous command value has increased with respect to the second previous output voltage command value. On the other hand, when the previous output voltage command value has decreased with respect to the second previous output voltage command value, the current output voltage command value is controlled to decrease.

In contrast, when the currently measured electric power generated by mega solar 26 has decreased with respect to the previously measured electric power generated by mega solar 26, the current output voltage command value is controlled to decrease if the previous output voltage command value has increased with respect to the second previous output voltage command value. On the other hand, when the previous output voltage command value has decreased with respect to the second previous output voltage command value, the current output voltage command value is controlled to increase.

By controlling the output voltage command value as described above, mega solar 26 is controlled to search for an operating point such that the output power becomes maximum. First DC/DC conversion circuit 203 controls a step-up ratio in a built-in step-up circuit (not shown) based on the output voltage command value output from first control circuit 204. Thereby, first DC/DC conversion circuit 203 controls the first DC voltage output from mega solar 26 in accordance with the output voltage command value, converts the first DC voltage into a second DC voltage (a DC bus voltage), and outputs the converted second DC voltage to DC bus 205.

Then, the operation of second control circuit 209 for controlling first DC/AC conversion circuit 208 (FIG. 5) will be described again with reference to FIG. 8.

Phase detection circuit 2091 detects a zero cross point of the grid AC voltage waveform of power distribution grid 24 that is measured by voltmeter 210. From the zero cross point information detected by phase detection circuit 2091 and the grid AC voltage waveform output from voltmeter 210, first sinusoidal wave generation circuit 2092 generates a reference sinusoidal wave to be used for current control. The reference sinusoidal wave is in synchronization with the grid AC voltage waveform of power distribution grid 24, and is output from first sinusoidal wave generation circuit 2092 to multiplier 2095.

The result of measurement by voltmeter 206 that measures the voltage on DC bus 205 is input to subtractor 2093 and sixth control circuit 2097 in current control circuit 2090. Current control circuit 2090 performs control (current control) to output electric power in synchronization with the grid AC voltage. The current control is a control method executed in a commonly-used photovoltaic power generation-type power conversion device installed in a household.

The target voltage on DC bus 205 is stored in sixth control circuit 2097. The target voltage is output from sixth control circuit 2097 to subtractor 2093. Subtractor 2093 outputs a value obtained by subtracting the measurement value of the DC bus voltage measured by voltmeter 206 from the target voltage on DC bus 205. Current control circuit 2090 controls the AC current output from first DC/AC conversion circuit 208 such that the DC bus voltage output from voltmeter 206 attains the target voltage.

When first DC/DC conversion circuit 203 (FIG. 5) starts to supply the generated electric power from mega solar 26, second control circuit 209 controls first DC/AC conversion circuit 208 such that the electric power generated by mega solar 26 is regenerated in power distribution grid 24. Specifically, when the DC bus voltage on DC bus 205 that is monitored by voltmeter 206 exceeds the control target value, second control circuit 209 controls first DC/AC conversion circuit 208 to output the electric power synchronized with the grid AC voltage waveform of power distribution grid 24 to power distribution grid 24.

In FIG. 8, the output of subtractor 2093 is input to first PI control circuit 2094. First PI control circuit 2094 performs PI control such that the output of subtractor 2093 becomes zero. The output of first PI control circuit 2094 is input to multiplier 2095. In multiplier 2095, first PI control circuit 2094 is multiplied by the output of first sinusoidal wave generation circuit 2092 and converted into a current command value. The output (the current command value) of multiplier 2095 is input to subtractor 2096. Subtractor 2096 outputs the value obtained by subtracting, from the current command value, the measurement value of the AC current in power distribution grid 24 that is measured by ammeter 211. The output of subtractor 2096 is input to second PI control circuit 2098.

Second PI control circuit 2098 performs PI control such that the output of subtractor 2096 becomes zero. The output of second PI control circuit 2098 is PWM-modulated in first PWM conversion circuit 2099 and converted into a control command value for first DC/AC conversion circuit 208. First DC/AC conversion circuit 208 outputs an AC current based on the control command value output from first PWM conversion circuit 2099.

Further, when the grid AC voltage (the AC effective voltage) measured by voltmeter 210 exceeds a prescribed voltage value, or when CEMS 31 issues a request to suppress the power generation by mega solar 26, fifth control circuit 2044 in first control circuit 204 switches the control mode of mega solar 26 from the MPPT control to the voltage control. Specifically, fifth control circuit 2044 controls the output voltage of mega solar 26 such that the grid AC voltage (the AC effective voltage) measured by voltmeter 210 becomes a prescribed voltage value, or such that the electric power generated by mega solar 26 becomes equal to or lower than the power value notified from CEMS 31. Note that the switching between the MPPT control and the voltage control is achieved when fifth control circuit 2044 sets a switching control signal for first switching circuit 2043 that selectively outputs one of the outputs from MPPT control circuit 2041 and voltage control circuit 2042 in the configuration in FIG. 7.

As described above, sixth control circuit 2097 in FIG. 8 collects: the measurement results related to DC bus 205 and output from voltmeter 206 and ammeter 207; the measurement results related to the AC grid and output from voltmeter 210 and ammeter 211; the status information of first DC/DC conversion circuit 203 that is output from first control circuit 204; and the like. Various pieces of information that has been collected is notified to CEMS 31 and the like through communication interface 212.

Further, also regarding the voltage effective value of power distribution grid 24, the voltage effective value measured by the effective voltage measurement unit (not shown) can be notified from sixth control circuit 2097 to CEMS 31. Further, the information about the active power and the reactive power measured by the active/reactive power measurement unit (not shown) in the AC grid can also be notified from sixth control circuit 2097 to CEMS 31 through communication interface 212. Note that the measurement results about the effective voltage, the active power and the like in the AC grid can be notified also to fifth control circuit 2044 (FIG. 7). As described above, for example, when the effective value of the grid AC voltage exceeds a prescribed voltage value, fifth control circuit 2044 switches the control mode of mega solar 26 from the MPPT control to the voltage control to suppress an increase in the grid AC voltage.

Then, the operation of power distribution grid storage battery system 41 will be described with reference to FIGS. 6 to 27C.

Figure 26A:
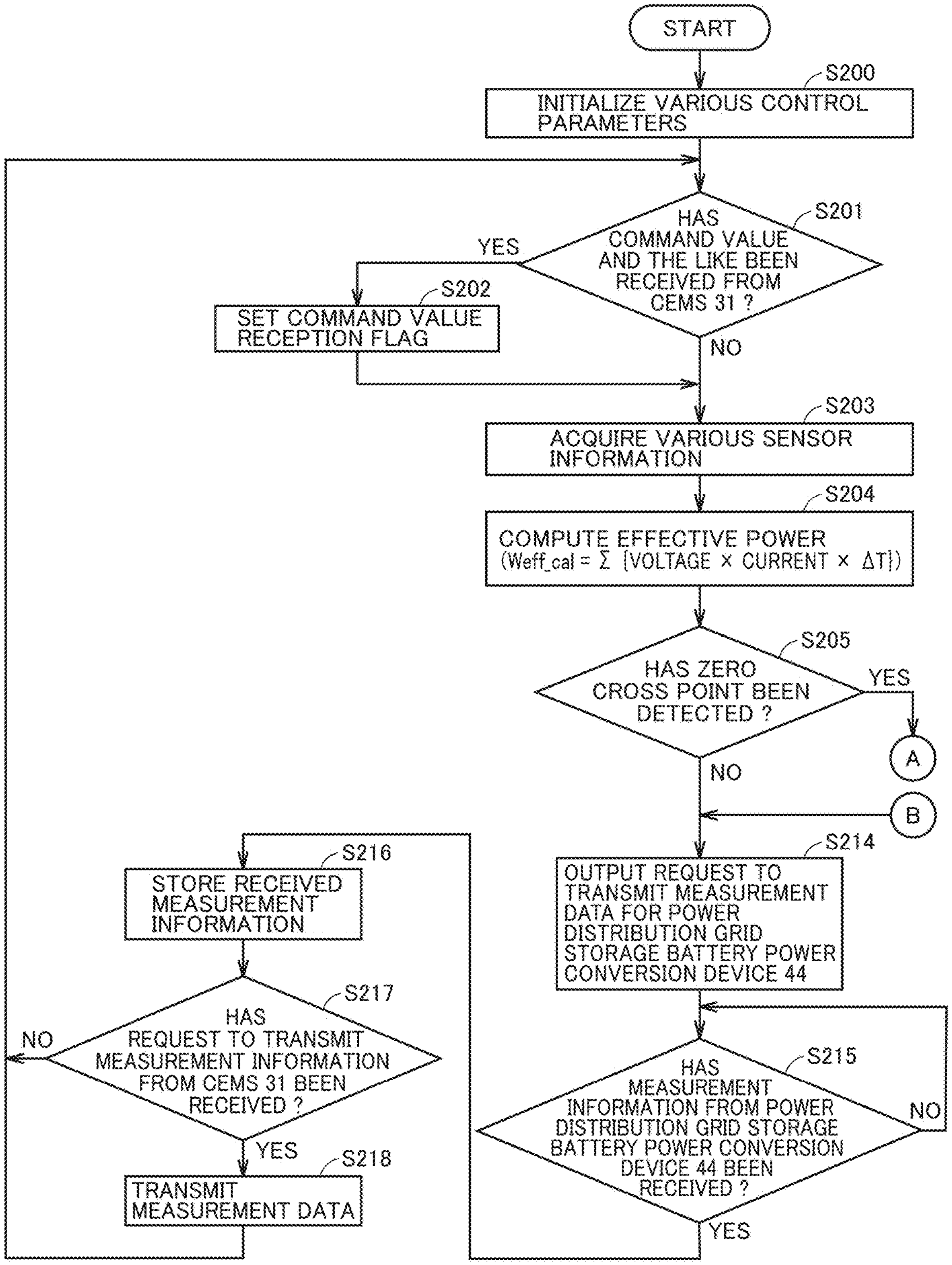
FIG. 26A is a first flowchart illustrating a control process in the controller shown in FIG. 2.
Figure 26B:
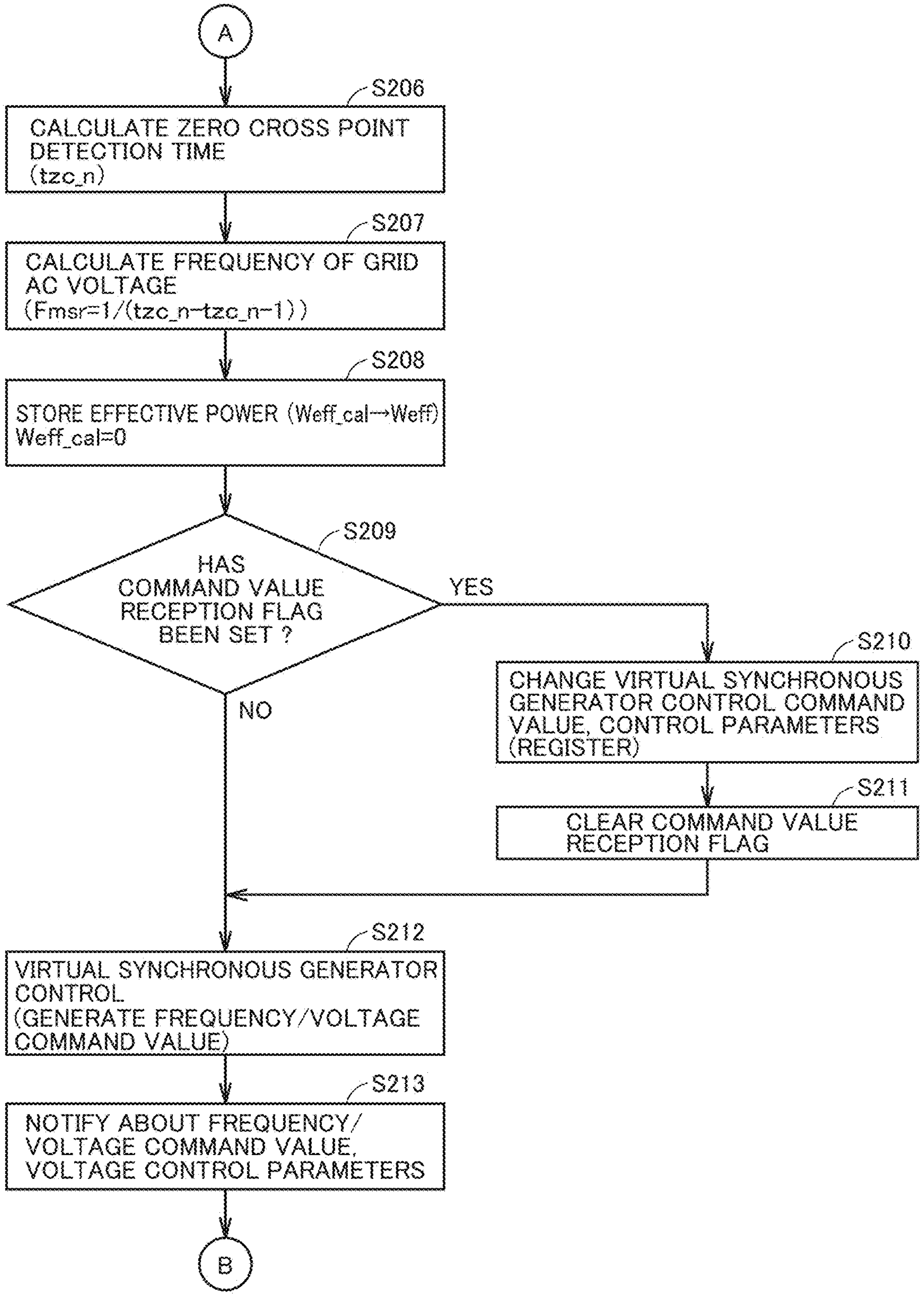
FIG. 26B is a second flowchart illustrating the control process in the controller shown in FIG. 2.

First, the operation of controller 43 will be described with reference to FIG. 13 and FIGS. 26A and 26B. FIGS. 26A and 26B are flowcharts for illustrating the operation of controller 43 by the process of management circuit 435.

Referring to FIG. 26A, when the operation of controller 43 is started, then in S200, management circuit 435 initializes various control parameters to predetermined initial values. When management circuit 435 completes the initialization of each of various control parameters, then in S201, it checks communication interface 434 whether or not the frequency command value and the like have been received from CEMS 31. When the frequency command value and the like have been received (determined as YES in S210), management circuit 435 sets a command value reception flag in S202, and then advances the process to S203 to acquire the voltage measurement value and the current measurement value of the grid AC voltage output from current/voltage measurement device 42. When the frequency command value and the like have not been received (determined as NO in S210), S202 is skipped and the process proceeds to S203.

When the voltage measurement value and the current measurement value of the grid AC voltage have been acquired (S203), then in S204, management circuit 435 instructs effective power calculation circuit 432 (FIG. 13) to perform a computing process for the effective voltage. Thereby, effective power calculation circuit 432 performs the integration process for the current and voltage measurement values and the multiplication value of a sampling period (interval) ΔT. In other words, the multiplication value is sequentially added to a Weff_cal in each sampling period.

When the computation of the effective power (S204) ends, management circuit 435 checks in S205 whether or not second phase detection circuit 431 (FIG. 13) has detected the zero cross point. In the present first embodiment, second phase detection circuit 431 detects the zero cross point of the grid AC voltage measured by voltmeter 210 in the same manner as that in which phase detection circuit 40910 detects the zero cross point of the grid AC voltage measured by voltmeter 410.

When the zero cross point is detected, it is determined as YES in S205, and the process proceeds to S206 in FIG. 26B. In S206, second phase detection circuit 431 can calculate current zero cross point detection time tzc_n using the equation (6) by the method described with reference to FIG. 20.

Further, when the current zero cross point detection time (tzc_n) is calculated (S206), management circuit 435 instructs second phase detection circuit 431 to perform a process of calculating the frequency of the grid AC voltage. For example, from the time difference between the previous zero cross point detection time (tzc_n−1) and the current zero cross point detection time (tzc_n), a frequency detection value Fmsr can be calculated by the following equation (7).

$$Fmsr = 1/(\mathrm{tzc\_n} - \mathrm{tzc\_n} - 1) \tag{7}$$

Further, at the timing of detection of the zero cross point, in S208, a management circuit 345 substitutes integration value Weff_cal (S204) between the zero cross points (tzc_n−1 to tzc_n) into an effective power value Weff. Then, Weff_cal is cleared (Weff_cal=0).

When management circuit 435 completes the process in S208, it checks in S209 whether or not the command value reception flag has been set. When the command value reception flag has been set (determined as YES in S209), then in S210, management circuit 435 sets the virtual synchronous generator control command value and the control parameters notified from CEMS 31 in a register (not shown).

Thereby, the control command value and the control parameters set in the register are changed to the latest values notified from CEMS 31.

On the other hand, when the command value reception flag has not been set (determined as NO in S209), S210 and S211 are skipped, and the process proceeds to S212.

In S212, management circuit 435 performs virtual synchronous generator control by virtual synchronous generator control circuit 433 shown in FIG. 14. In other words, the control period of the virtual synchronous generator control is equivalent to the period of detection of the zero cross point by second phase detection circuit 431.

In S212, management circuit 435 inputs, to virtual synchronous generator control circuit 433 (FIG. 14), a frequency detection value Fmsr (S207) calculated as an actually measured frequency according to the equation (7).

In FIG. 14, target frequency Fref of the reference grid AC voltage output from management circuit 435 is subtracted by subtractor 4331 from the actually measured frequency of the grid AC voltage by second phase detection circuit 431. The output of subtractor 4331, i.e., the frequency deviation, is input to governor control circuit 4332 shown in FIG. 15.

In governor control circuit 4332 shown in FIG. 15, the output of subtractor 4331 and the control parameters (−1/Kgd) notified from management circuit 435 are multiplied by multiplier 43321. The output of multiplier 43321 is input to first-order lag model 43322. Speed adjustment rate Kgd and governor time constant Tg used in governor control circuit 4332 are set at the values of the control parameters set in the above-mentioned register (S210). Through the computing process described with reference to FIG. 15, the output of first-order lag model 43322 is subjected to limiter processing by limiter circuit 43323 and thereafter output to adder 4333 in FIG. 14. In FIG. 14, adder 4333 adds the output of governor control circuit 4332 to the power target value (Pref) output from management circuit 435. As described above, power target value Pref notified from CEMS 31 is output from management circuit 435. The output of adder 4333 is subtracted by subtractor 4334 from the actually measured effective power output from effective power calculation circuit 432. In other words, the output value of adder 4333 is defined as the control power target value of mass point-system computation circuit 4335, and the output of governor control circuit 4332 is added as an offset value for implementing governor control with respect to power target value Pref notified from CEMS 31.

In FIG. 16, the outputs of subtractor 4334, i.e., the deviation of the effective power and the control parameters notified from CEMS 31 and set in the register (S210) in management circuit 435, are input. Thereby, the control computation described with reference to FIG. 16 is executed using the latest unit inertia constant M and braking coefficient Dg notified from CEMS 31 and set in the register. Thus, as described above, adder 43355 outputs frequency command value f* applied when inverter voltage control circuit 4095 in power distribution grid storage battery power conversion device 44 performs voltage control.

Further, phase calculation circuit 43356 integrates the frequency information (frequency command value f*) output from adder 43355 to output phase information indicating the phase of rotor M1 of the synchronous generator model (FIG. 23). As described above, in the present first embodiment, unlike frequency command value f*, the phase information is not used for voltage control in inverter voltage control circuit 4095. Thus, the phase information calculated by phase calculation circuit 43356 is used as the information to be notified to DSO 21. The frequency information (frequency command value f*) and the phase information generated by the virtual synchronous generator control in S212 in this way are output to communication interface 434 via management circuit 435.

Referring again to FIG. 26B, when the frequency information (frequency command value f*) is calculated in S212, management circuit 435 converts the calculated frequency information into a prescribed format together with the voltage amplitude command value information received from CEMS 31 and the control parameters also received from CEMS 31 and used in inverter voltage control circuit 4095, and then in S213, notifies power distribution grid storage battery power conversion device 44 about the converted results. In this way, at the timing of detection of the zero cross point, i.e., when it is determined as YES in S205 (FIG. 26A), management circuit 345 proceeds the process to S206 to S213 shown in FIG. 26B, and thereafter, advances the process to S214 in FIG. 26A. In contrast, other than the timing of detection of the zero cross point (determined as NO in S205), management circuit 345 skips S206 to S213 shown in FIG. 26B and advances the process to S214.

In S214, management circuit 435 outputs, to communication interface 434, a measurement data transmission request for power distribution grid storage battery power conversion device 44. When communication interface 434 receives the measurement data transmission request from management circuit 435, it outputs the data transmission request to power distribution grid storage battery power conversion device 44. After management circuit 435 outputs the transmission request, then in S215, management circuit 435 waits for reception of the measurement information from power distribution grid storage battery power conversion device 44.

When management circuit 435 receives the measurement data from power distribution grid storage battery power conversion device 44 (determined as YES in S215), it advances the process to S216 and stores the received measurement information in a memory (not shown).

When the measurement information is stored (S216), then in S217, management circuit 435 checks whether or not the measurement information transmission request from CEMS 31 has been received. When the transmission request has been received (determined as YES in S217), then in S218, management circuit 435 transmits the measurement information received from power distribution grid storage battery power conversion device 44 and stored in the memory to CEMS 31, and thereafter, the process is returned to S201. On the other hand, when the transmission request has not been received (determined as NO in S217), S218 is skipped, and the process is returned to S201. In this way, in controller 43, the control process shown in FIGS. 26A and 26B is continuously repeated.

Figure 27B:
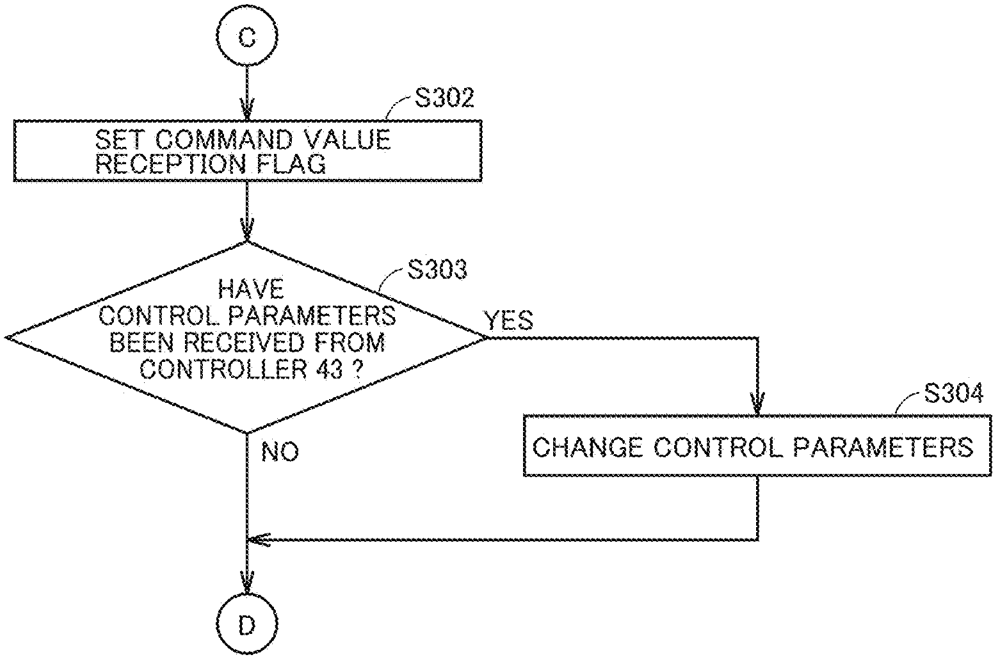
FIG. 27B is a second flowchart illustrating the operation of the power distribution grid storage battery power conversion device shown in FIG. 2.
Figure 27C:
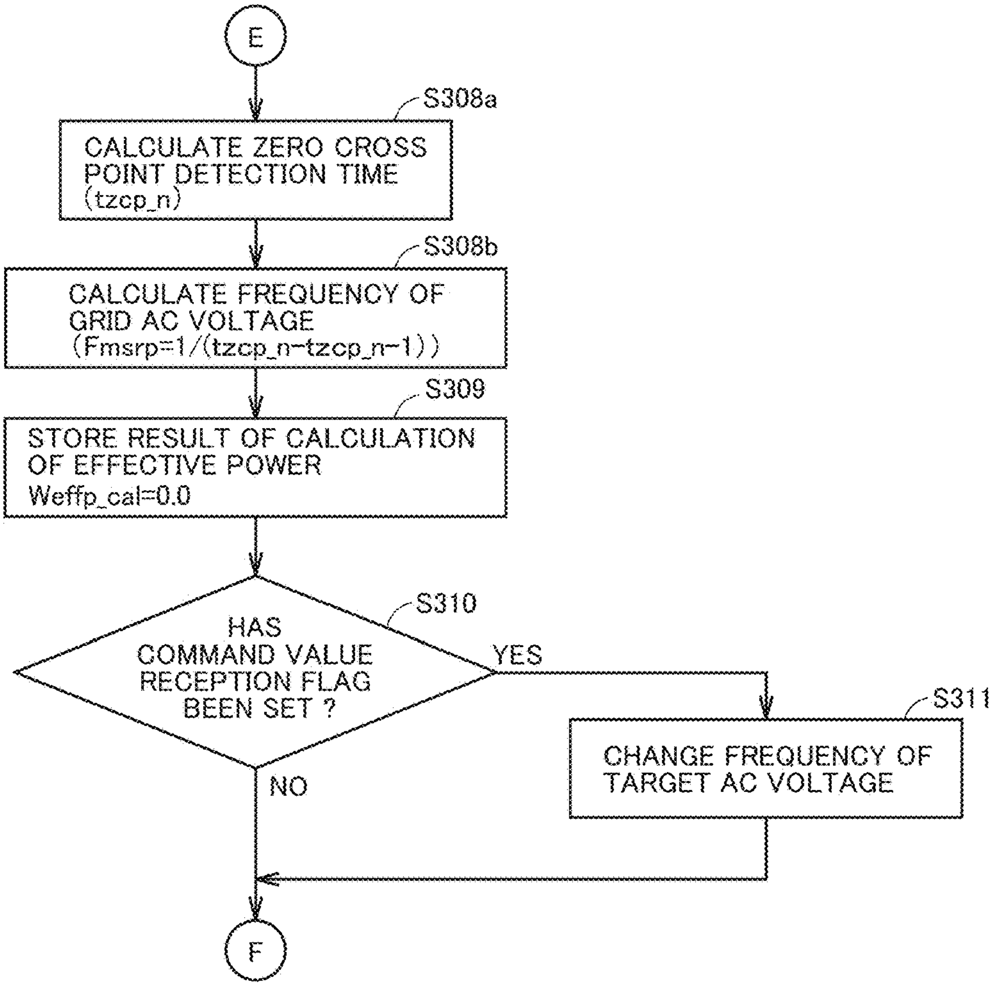
FIG. 27C is a third flowchart illustrating the operation of the power distribution grid storage battery power conversion device shown in FIG. 2.

Then, with reference to FIGS. 27A to 27C, the operation in power distribution grid storage battery power conversion device 44 will be described. FIGS. 27A to 27C are flowcharts for illustrating the operation of power distribution grid storage battery power conversion device 44 by the processes in fourth control circuit 409 and third control circuit 404.

Referring to FIG. 27A, when power distribution grid storage battery power conversion device 44 starts to operate, then in S300, fourth control circuit 409 initializes various control parameters in power distribution grid storage battery power conversion device 44. In the present first embodiment, at the time of initialization in S300, among the control parameters at least for inverter voltage control circuit 4095, the parameters used when one power distribution grid storage battery power conversion device 44 starts a standalone grid (standalone microgrid) by voltage control are assumed to be set in advance.

When fourth control circuit 409 completes the initialization of various control parameters (S300), then in S301, it checks whether or not eighth control circuit 4097 (FIG. 10) included in fourth control circuit 409 has received a command value and the like from controller 43. When eighth control circuit 4097 has received the command value (determine as YES in S301), the process proceeds to S302 in FIG. 27B.

Referring to FIG. 27B, fourth control circuit 409 sets a command value reception flag in S302, and then checks in S303 whether or not the control parameters in power distribution grid storage battery power conversion device 44 have been received from controller 43. In other words, it is checked whether or not the control parameters are included in the information such as the command value received from controller 43 (S301).

When the control parameters have been received from controller 43 (determined as YES in S303), the control parameters are changed in S304. Specifically, the latest values received from controller 43 are set in a register (not shown) that holds the control parameters. When the control parameters have not been received from controller 43 (determined as NO in S303), S304 is skipped, and the control parameters are maintained at the current values. After S302 to S304, fourth control circuit 409 advances the process to S305 in FIG. 27A.

Referring again to FIG. 27A, in S305, fourth control circuit 409 acquires: the AC current value measured by ammeter 411 (FIG. 6) and output from power distribution grid storage battery power conversion device 44; the voltage value on DC bus 405 measured by voltmeter 406; and the AC voltage value measured by voltmeter 410 and output from power distribution grid storage battery power conversion device 44.

In S306, fourth control circuit 409 calculates the effective power by effective power calculation circuit 4092 (FIG. 10) using the AC current value and the AC voltage value in power distribution grid 24 that are acquired in S305. In S306, the same process as that in S204 (effective power calculation circuit 432) is executed using the values measured by ammeter 411 and voltmeter 410. Thereby, the process of integrating the current and voltage measurement values and the multiplication value in sampling period (interval) AT is executed by effective power calculation circuit 4092. In other words, the multiplication value is sequentially added to an integration value Weffp_cal in each sampling period.

As shown in FIG. 10, the measurement value of the grid AC voltage measured by voltmeter 410 is input to AC frequency detection circuit 4091 and also input to phase detection circuit 40910 and second sinusoidal wave generation circuit 40912 shown in FIG. 11. Phase detection circuit 40910 detects a zero cross point of the grid AC voltage waveform measured by voltmeter 410.

Referring again to FIG. 27A, when the process in S306 ends, then in S307, fourth control circuit 409 checks whether or not phase detection circuit 40910 (FIG. 11) has detected a zero cross point.

When the zero cross point is detected, it is determined as YES in S307, and the process proceeds to S308*a* in FIG. 27C. In S308*a*, phase detection circuit 40910 can calculate current zero cross point detection time tzcp_n using the equation (6) by the method described with reference to FIG. 20 as in S206.

Further, when the current zero cross point detection time (tzpc_n) is calculated (S308*a*), fourth control circuit 409 instructs frequency detection circuit 40911 (FIG. 11) to perform a frequency calculation process based on the zero cross point detection time. For example, by the following equation (8), a frequency detection value Fmsrp can be calculated from the time difference between the previous zero cross point detection time (tzcp_n−1) and the current zero cross point detection time (tzcp_n).

$$Fmsrp = 1/(\mathrm{tzcp\_n} - \mathrm{tzcp\_n} - 1) \quad (8)$$

Further, at the timing of detection of the zero cross point, in S309, fourth control circuit 409 substitutes integration value Weffp_cal (S306) between the zero cross points (tzcp_n−1 to tzcp_n) into an effective power value Weffp. Then, Weffp_cal is cleared (Weffp_cal=0).

When the process in S309 is completed, then in S310, fourth control circuit 409 checks whether or not the command value reception flag has been set. When the command value reception flag has been set (determined as YES in S310), then in S311, the frequency of the target AC voltage generated by third sinusoidal wave generation circuit 40951

(i.e., frequency command value f*) is changed at the timing of detection of the zero cross point. On the other hand, when the command value reception flag has not been set (determined as NO in S310), S311 is skipped and the frequency of the target AC voltage (frequency command value f*) is maintained. Then, the process proceeds to S312 in FIG. 27A.

As described above, in the present first embodiment, the timing at which frequency command value f* is changed is limited to the zero cross point detection timing (θ=0 [deg]) described with reference to FIG. 20, and after frequency command value f* is changed in S311, target AC voltage Vtr at time tn is calculated by the following equation (9).

$$Vtr = V* \times \sin(2\pi \times f* \times (tn - \text{tzcp\_n})) \quad (9)$$

As described with reference to FIG. 19, this makes it possible to prevent such a situation that the voltage value (instantaneous value) of target AC voltage Vtr becomes discontinuous (FIG. 21), though the timing at which frequency command value f* by the virtual synchronous generator control from controller 43 is received by power distribution grid storage battery power conversion device 44 is not constant on the phase of the grid AC voltage. Thus, the grid AC voltage can be output from power distribution grid storage battery power conversion device 44 without causing unnecessarily disturbance in power distribution grid 24.

As shown in FIG. 12, according to the equation (9), third sinusoidal wave generation circuit 40951 outputs target AC voltage Vtr that is a target value of the grid AC voltage based on the zero cross point detection result. The value (voltage deviation) obtained by subtractor 40952 subtracting the measurement value of the grid AC voltage measured by voltmeter 410 from target AC voltage Vtr is input to third PI control circuit 40953. Third PI control circuit 40953 performs control computation such that the voltage deviation output from subtractor 40952 becomes zero. Note that the control parameters used in third PI control circuit 40953 are input from eighth control circuit 4097. Also as to the control parameters for third PI control circuit 40953, if the changed control parameters have been notified from CEMS 31 similarly to the frequency command value, these control parameters are changed to the latest values upon detection of the zero cross point.

The control computation result of third PI control circuit 40953 is subjected to the above-described limiting process in first current limiting circuit 40955 and thereafter input to second PWM conversion circuit 40954. Second PWM conversion circuit 40954 generates a control command value for second DC/AC conversion circuit 408 by PWM modulation for the input values.

Referring again to FIG. 27A, in S312, fourth control circuit 409 uses third sinusoidal wave generation circuit 40951 to generate target AC voltage Vtr according to the above-mentioned equation (9). Further, in S313, second DC/AC conversion circuit 408 is controlled by the above-mentioned configuration in FIG. 12 to supply electric power to power distribution grid 24.

Third control circuit 404 acquires the measurement value of the DC bus voltage measured by voltmeter 406 in S314, and controls second DC/DC conversion circuit 403 (FIG. 6) in S315.

As described with reference to FIG. 6, based on the voltage value of the DC bus voltage measured by voltmeter 406, third control circuit 404 determines the electric power for charging or discharging of power distribution grid storage battery 40. Specifically, seventh control circuit 4044 (FIG. 9) in third control circuit 404 controls the charge/discharge power from power distribution grid storage battery 40 such that the voltage on DC bus 405 is maintained at a predetermined value.

As described above, in the present first embodiment, the virtual synchronous generator control is implemented in power distribution grid storage battery system 41, and thus, second DC/AC conversion circuit 408 operates as a voltage source (voltage control). Accordingly, third control circuit 404 controls second DC/DC conversion circuit 403 (FIG. 6) such that the voltage on DC bus 405 has a constant value.

As described with reference to FIG. 9, the measurement value of the DC bus voltage on DC bus 405 measured by voltmeter 406 is input to charge control circuit 4041, discharge control circuit 4042, and seventh control circuit 4044. When the DC bus voltage is higher than the target voltage output from seventh control circuit 4044, charge control circuit 4041 controls the charge power for power distribution grid storage battery 40 such that the DC bus voltage attains the target voltage. On the other hand, when the DC bus voltage is lower than the target voltage, discharge control circuit 4042 controls the discharge power of power distribution grid storage battery 40. Note that the output of charge control circuit 4041 and the output of discharge control circuit 4042 are input to second switching circuit 4043. In response to a switching control signal from seventh control circuit 4044, second switching circuit 4043 outputs one of the output of charge control circuit 4041 and the output of discharge control circuit 4042 as a control command value to be transmitted to second DC/DC conversion circuit 403. Seventh control circuit 4044 compares the measurement value of the DC bus voltage measured by voltmeter 406 with the above-mentioned target voltage to generate a switching control signal for second switching circuit 4043.

In this way, when second DC/AC conversion circuit 408 is executed in S315, then in S316, third control circuit 404 calculates the charge/discharge power for power distribution grid storage battery 40 based on the measurement values of the DC voltage and the DC current measured by voltmeter 401 and ammeter 402 (FIG. 6). The calculated charge/discharge power is notified from seventh control circuit 4044 (FIG. 9) in third control circuit 404 to eighth control circuit 4097 (FIG. 10), and the notification result is stored in a memory (not shown) in eighth control circuit 4097 in fourth control circuit 409.

Further, when fourth control circuit 409 stores the calculated value of the charge/discharge power and ends the process in S316, it returns the process to S301 and continues to control power distribution grid storage battery power conversion device 44.

As described above, according to the present first embodiment, in the configuration in which controller 43 external to power distribution grid storage battery power conversion device 44 notifies about the frequency command value (f*) of the AC voltage output from power distribution grid storage battery power conversion device 44, even in the case where there is variability in delay time caused by: the measurement delay and the processing delay in controller 43; and the communication delay between controller 43 and power distribution grid storage battery power conversion device 44, control is performed to change the frequency command value based on the phase of the grid AC voltage detected by power distribution grid storage battery power conversion device 44.

Specifically, the time information used when calculating the target value of the grid AC voltage (target AC voltage Vtr) output from power distribution grid storage battery power conversion device 44 is set based on the time of detection of the phase information detected by power distribution grid storage battery power conversion device 44. Thereby, even when jitter (variations) occurs at the timing of arrival (timing of reception) of the frequency command value and the voltage amplitude command value from controller 43, the continuity of the target value (voltage value) of the grid AC voltage can be ensured. As a result, virtual synchronous power generation control can be implemented by controller 43 external to power distribution grid storage battery power conversion device 44 without causing unnecessary disturbance.

In the configuration as described above, even in the conventional storage battery power conversion device not implementing a virtual synchronous generator control function, the frequency of the grid AC voltage output from the storage battery power conversion device is controlled using an external controller, and thereby, the virtual synchronous generator control function can be implemented. Thus, a virtual synchronous generator control function can be implemented in the existing conventional storage battery power conversion device, for example, by a small-scale modification of changing the process (a functional portion of third sinusoidal wave generation circuit 40951) of generating the target value of the grid AC voltage (target AC voltage Vtr) output from power distribution grid storage battery power conversion device 44 in eighth control circuit 4097. Since the process of generating target AC voltage Vtr is often implemented by software, a virtual synchronous generator control function can be expected to be added to the existing storage battery power conversion device by a modification of the software. Further, as described above, even if an external controller notifies about a command value and a control parameter for virtual synchronous generator control, the grid AC voltage can be stably controlled so as to accommodate jitter (variations) mainly caused by communication.

In the present first embodiment, as a method of calculating the target value of the grid AC voltage (target AC voltage Vtr) using the phase information about the grid AC voltage output from power distribution grid storage battery power conversion device 44, an example has been described with regard to a method of detecting the zero cross point of the grid AC voltage from the AC voltage information measured by voltmeter 410 to calculate target AC voltage Vtr according to the equation (9).

However, this method is merely an example, and another method may be employed to reflect, in target AC voltage Vtr, the phase information of the grid AC voltage output from power distribution grid storage battery power conversion device 44. For example, in the case of a three-phase AC grid, the three-phase AC voltage is subjected to d-q conversion, the phase information about the grid AC voltage is calculated from the d-axis voltage and the q-axis voltage. Then, based on this phase information, the timing of switching of frequency command value f* with respect to target AC voltage Vtr and the time information used when calculating target AC voltage Vtr can also be determined.

Further, as described with reference to FIG. 20, the detection of the zero cross point has also been described with reference to an example in which the zero cross point is detected using a value obtained by filtering the A/D conversion value of the measurement value of the grid AC voltage, but the zero cross point detection time can also be acquired without conducting a filtering process. In addition, the zero cross point detection time can also be calculated by the method other than the exemplified equation (6). Further, the measurement values by voltmeter 410 may include linearity errors, offset errors, and the like. Thus, the data obtained by correcting these errors may be used to detect the zero cross point. In particular, the offset errors may cause disturbance in the grid when target AC voltage Vtr is generated. Thus, it is preferable to appropriately perform the process of correcting the offset errors such that the integrated value of the measurement values of the AC voltage measured by voltmeter 410 becomes zero.

Further, in the configuration in the present first embodiment, as to the control parameters for virtual synchronous generator control circuit 433 in controller 43 and inverter voltage control circuit 4095 in power distribution grid storage battery power conversion device 44, CEMS 31 makes a determination and gives a notification about these control parameters according to the number of static inverter power supplies each implementing virtual synchronous generator control in the case of the standalone grid, or according to the number and type of distributed power supplies operating as a voltage source for synchronous generators and the like.

Specifically, the control parameters for the voltage control unit (inverter voltage control circuit 4095) that are transmitted from CEMS 31 to each power distribution grid storage battery system 41 are changed according to the number of power distribution grid storage battery systems 41 each operating as a voltage source and each implementing a virtual synchronous generator control function acting in the standalone microgrid. Thereby, even in the case where the standalone microgrid is configured of a plurality of power distribution grid storage battery systems 41 each implementing a virtual synchronous generator control function, the control parameters in inverter voltage control circuit 4095 in each power distribution grid storage battery power conversion device 44 can be set to achieve an optimum response time of the voltage control unit (inverter voltage control circuit 4095) according to the number of power distribution grid storage battery power conversion devices 44 operating as a voltage source.

In the first embodiment, in the case where a plurality of power distribution grid storage battery systems 41 each implementing a virtual synchronous generator control function are operated as a voltage source to thereby configure a standalone microgrid, the control parameters notified to each power distribution grid storage battery power conversion device 44 are set so as to reduce the control gain of third PI control circuit 40953 or to lengthen the integration time, or so as to reduce the control gain and lengthen the integration time, as compared with the case where only a single power distribution grid storage battery system 41 configures a standalone microgrid.

Similarly, also in the interconnection grid, the synchronous generator supporting the grid quickly responds, and thus, the control parameters in inverter voltage control circuit 4095 in power distribution grid storage battery power conversion device 44 are controlled in order to ensure the stability of the power grid, and the control parameters are set such that the control response time for the load fluctuation or the change in power generation amount is longer than the control response time in the case where the standalone microgrid is supported by a single power distribution grid storage battery system 41 implementing a virtual synchronous generator control function.

More specifically, in the first embodiment, in the case where the standalone microgrid is configured of a plurality of power distribution grid storage battery systems 41 each implementing a virtual synchronous generator control function, the control parameters notified from CEMS 31 are set so as to reduce the control gain of third PI control circuit 40953 or lengthen the integration time, or so as to reduce the control gain and lengthen the integration time, as compared with the case where the standalone microgrid is configured of a single power distribution grid storage battery system 41. Further, when the response speed of virtual synchronous generator control circuit 433 (FIG. 18) is slowed down, the control parameters are adjusted so as to increase the governor time constant (Tg), reduce speed adjustment rate Kgd (increase 1/Kgd), increase unit inertia constant M, or increase braking coefficient Dg. Thereby, even when power distribution grid storage battery system 41 according to the first embodiment implementing a virtual synchronous generator control function is operated in the interconnection grid, an effect of capable of applying inertial force to the grid without causing unnecessary disturbance is achieved.

Similarly, the control parameters for virtual synchronous generator control circuit 433 in controller 43 are also notified from CEMS 31 in the present first embodiment. Also as described above, in the case where external controller 43 is configured to have a virtual synchronous generator control function, a measurement delay, a processing delay, and a communication delay occur before the frequency command value is transmitted to power distribution grid storage battery power conversion device 44, and a processing delay occurs before the frequency command value is reflected in the AC grid frequency output from power distribution grid storage battery power conversion device 44. Therefore, when a load fluctuation or a change in power generation amount occurs in the standalone microgrid, a plurality of power distribution grid storage battery systems 41 each implementing a virtual synchronous generator control function changes the output power from power distribution grid storage battery power conversion device 44 in response to the load fluctuation or the change in power generation amount. However, since the frequency command value is generated in controller 43, the frequency of the grid AC voltage does not immediately change. Thus, a higher gain (particularly, braking coefficient Dg and speed adjustment rate Kgd) of virtual synchronous generator control circuit 433 in controller 43 leads to a significant change in the frequency of the grid AC voltage output from each power distribution grid storage battery system 41.

Thus, when an unnecessary electric power exchange occurs between power distribution grid storage battery systems 41, the frequency of the grid AC voltage output from each power distribution grid storage battery system 41 oscillates, with the result that power distribution grid storage battery system 41 finally stops. Therefore, in the present first embodiment, in the standalone grid, at least braking coefficient Dg in the virtual synchronous generator control is controlled according to the number of power distribution grid storage battery systems 41 each implementing virtual synchronous generator control and operating as a voltage source. Specifically, as the number of power distribution grid storage battery systems 41 is larger, braking coefficient Dg is set to be larger. Thereby, even when a plurality of power distribution grid storage battery systems 41 each implementing virtual synchronous generator control cooperate with each other to operate as a voltage source for the standalone grid, inertial force can be applied to the grid without causing unnecessary disturbance.

Similarly, the synchronous generator supporting the grid responds quickly also in the interconnection grid. Thus, in order to ensure the stability of the power grid, it is preferable to change the control parameters (particularly, braking coefficient Dg and speed adjustment rate Kgd) in virtual synchronous generator control circuit 433 in controller 43 to control the response speed of the grid AC voltage with respect to the load fluctuation or the change in power generation amount. Specifically, in power distribution grid storage battery system 41 implementing a virtual synchronous generator control function, the control parameters are set by CEMS 31 such that the control response becomes slower (the response speed becomes lower) in the case of the interconnection grid than in the case where one power distribution grid storage battery system 41 supports a standalone microgrid. Thereby, also in the interconnection grid, power distribution grid storage battery system 41 implementing a virtual synchronous generator control function can be operated without causing unnecessary disturbance, and inertial force can be applied to the grid.

Second Embodiment

The first embodiment has been described with regard to the method of implementing a virtual synchronous generator control function by controlling the frequency of the grid AC voltage output from the storage battery power conversion device using the external controller also in the conventional storage battery power conversion device (power distribution grid storage battery power conversion device 44) not implementing a virtual synchronous generator control function. The second embodiment will be described with regard to another method of generating a target value of the grid AC voltage (target AC voltage Vtr).

Figure 28:
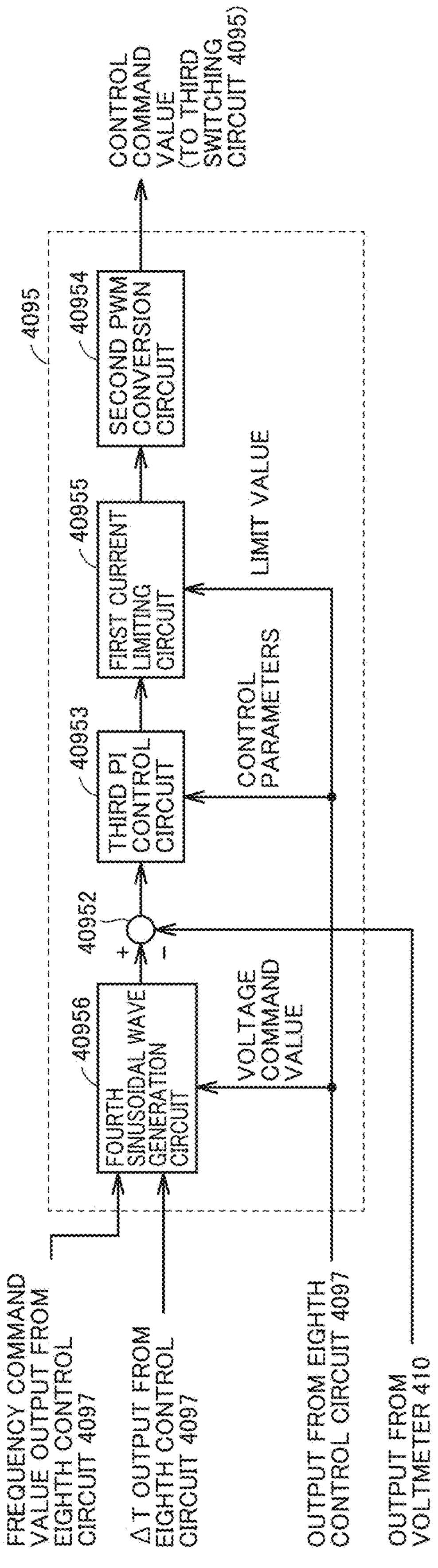
FIG. 28 is a block diagram illustrating a configuration of an inverter voltage control circuit in a power conversion device according to a second embodiment.

Further, the second embodiment is different from the first embodiment in that the AVR function is implemented in virtual synchronous generator control circuit 433 in controller 43. Thus, the second embodiment is different from the first embodiment in some of the configurations and the control operations of virtual synchronous generator control circuit 433 and second DC/AC conversion circuit 408. Since the circuit configuration, the control operation, and the like in other portions are the same as those in the first embodiment, the detailed description thereof will not be repeated. FIG. 28 shows a configuration of inverter voltage control circuit 4095 in power distribution grid storage battery power conversion device 44 as a representative example of the power conversion device according to the second embodiment.

Inverter voltage control circuit 4095 according to the second embodiment is different from inverter voltage control circuit 4095 according to the first embodiment (FIG. 12) in that a fourth sinusoidal wave generation circuit 40956 is disposed in place of third sinusoidal wave generation circuit 40951. In other words, in the second embodiment, fourth sinusoidal wave generation circuit 40956 generates a target value of the grid AC voltage, i.e., target AC voltage Vtr, output from power distribution grid storage battery power conversion device 44.

The frequency command value (f*) is input to fourth sinusoidal wave generation circuit 40956 from eighth control circuit 4097, as in FIG. 12. Further, in place of the zero cross point detection information shown in FIG. 12, sampling period ΔT is input to fourth sinusoidal wave generation circuit 40956 from eighth control circuit 4097. Sampling period ΔT is given as an inverse of the processing frequency in inverter voltage control circuit 4095. For example, when the processing frequency is 20 [KHz], sampling period ΔT=1/20 [KHz]=50 [μs]. Since other configurations in FIG. 28 are the same as those in FIG. 12, the detailed description thereof will not be repeated.

Figure 29:
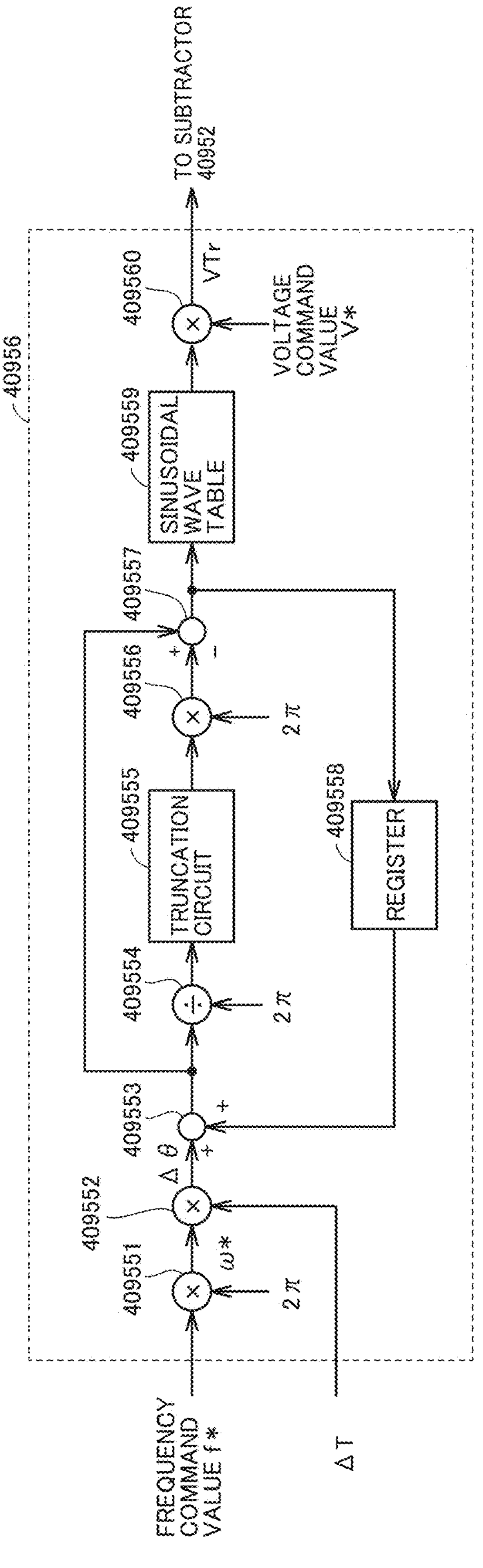
FIG. 29 is a block diagram illustrating a configuration of a fourth sinusoidal wave generation circuit shown in FIG. 28.

FIG. 29 is a block diagram illustrating a configuration of fourth sinusoidal wave generation circuit 40956 shown in FIG. 28.

Referring to FIG. 29, fourth sinusoidal wave generation circuit 40956 includes multipliers 409551, 409552, 409556, 409560, an adder 409553, a divider 409554, a truncation circuit 409555, a subtractor 409557, a register 409558, and a sinusoidal wave table 409559.

Multiplier 409551 multiplies frequency command value f* transmitted from controller 43 by 2π and converts the resultant into an angular velocity command value ω*. Multiplier 409551 multiplies angular velocity command value ω* output from multiplier 409552 by sampling period ΔT from eighth control circuit 4097.

Multiplier 409552 outputs a phase change amount Δθ, in sampling period ΔT, of target AC voltage Vtr generated in fourth sinusoidal wave generation circuit 40956. Adder 409553 adds the phase information of target AC voltage Vtr that has been previously calculated and delayed by one clock by register 509558 and phase change amount Δθ output from multiplier 409552, and then, outputs the phase information of target AC voltage Vtr.

Divider 409554 divides the output of adder 409553 by 2π. The result of division by divider 409554 is processed by truncation circuit 409555 such that digits after a decimal point are truncated, and thereby, converted into an integer.

Multiplier 409556 multiplies the output of truncation circuit 409555 by 2π. The result of multiplication by multiplier 409556 is input to subtractor 409557. Subtractor 409557 subtracts the output of multiplier 409556 from the phase information of target AC voltage Vtr output from adder 409553. Thereby, the phase information of target AC voltage Vtr output from subtractor 409557 is limited to 0 or more and less than 21.

The output of subtractor 409557 is input to register 409558 and delayed by one clock. Similarly, the output (the phase information) of subtractor 409557 is converted into amplitude information in sinusoidal wave table 409559. Sinusoidal wave table 409559 contains a sinusoidal wave table used when converting the input phase information (0 to 2π) into amplitude information (−1 to 1). When the phase information not stored in the table is input, amplitude information is generated by an interpolation using the both adjacent data stored in the table.

The amplitude information output from sinusoidal wave table 409559 is multiplied in multiplier 409560 by a voltage amplitude command value (V*) output from controller 43. The output of multiplier 409560 is output to subtractor 40952 (FIG. 28) as target AC voltage Vtr as a target value of the grid AC voltage. Thereby, the control process performed in FIG. 28 is similar to that in FIG. 12 for controlling the actually measured value of the grid AC voltage measured by voltmeter 410 to be set at target AC voltage Vtr.

In FIG. 28 (the second embodiment), in inverter voltage control circuit 4095, fourth sinusoidal wave generation circuit 40956 corresponds to one example of the "target AC voltage generation unit", and subtractor 40952, third PI control circuit 40953, second PWM conversion circuit 40954, and first current limiting circuit 40955 correspond to one example of the "voltage control unit".

Then, the configuration of controller 43 according to the second embodiment will be described with reference to FIG. 30.

Figure 30:
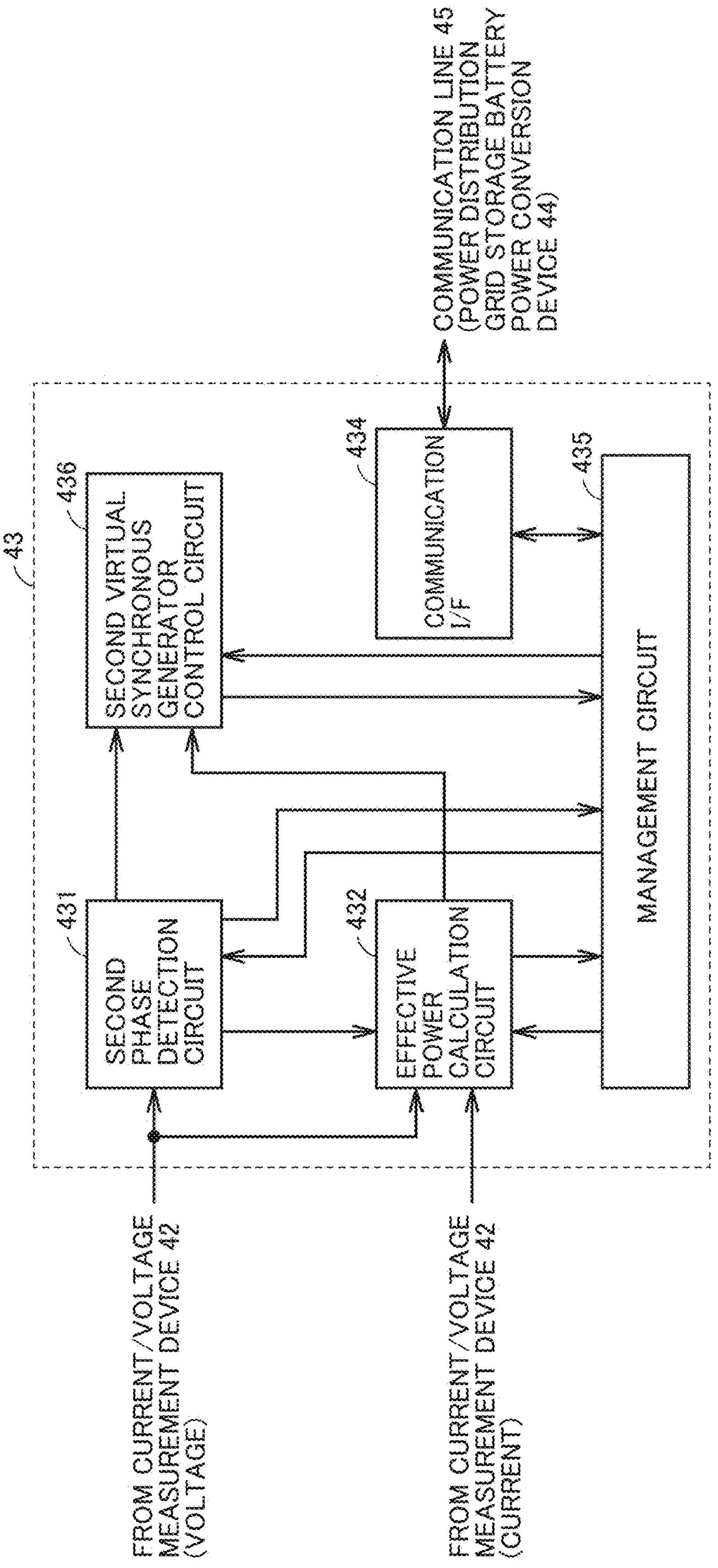
FIG. 30 is a block diagram illustrating a configuration of the controller shown in FIG. 2 according to the second embodiment.

Referring to FIG. 30, controller 43 according to the second embodiment is different from the configuration in the first embodiment (FIG. 13) in that it includes a second virtual synchronous generator control circuit 436 in place of virtual synchronous generator control circuit 433. Since the configurations of other portions in FIG. 30 are the same as those in FIG. 13, the detailed description thereof will not be repeated. In other words, in the second embodiment, second virtual synchronous generator control circuit 436 calculates frequency command value f* reflected in target AC voltage Vtr.

FIG. 31 is a block diagram illustrating the configuration of second virtual synchronous generator control circuit 436 shown in FIG. 30.

Referring to FIG. 31, second virtual synchronous generator control circuit 436 further includes a subtractor 4336, a proportional control circuit 4337, and a limiter circuit 4338 in addition to subtractor 4331, governor control circuit 4332, adder 4333, subtractor 4334, and mass point-system computation circuit 4335 as in virtual synchronous generator control circuit 433 (FIG. 14).

From the effective reactive power command notified from CEMS 31, subtractor 4336 subtracts the actually measured value of the effective reactive power output from effective power calculation circuit 432 (FIG. 13). The result of subtraction by subtractor 4336 is input to proportional control circuit 4337. Proportional control circuit 4337 performs a proportional operation to multiply the output of subtractor 4336 by a proportional gain. Instead of proportional control circuit 4337, a controller that performs PI control or PID control may be disposed.

After execution of the amplitude limitation by limiter circuit 4338, the output of proportional control circuit 4337 is output to management circuit 435 as a voltage amplitude command value. The voltage amplitude command value is used as voltage amplitude command value V* when calculating target AC voltage Vtr.

In the present second embodiment, the control gain (proportional gain) of proportional control circuit 4337 and the amplitude limit value in limiter circuit 4338 are notified from CEMS 31 and transmitted from management circuit 435 to second virtual synchronous generator control circuit 436.

The following describes the operation of power distribution grid storage battery system 41 according to the second embodiment with reference to FIGS. 1 to 16 and 28 to 31. When the same operation as that in the first embodiment is performed, the detailed description thereof will not be repeated.

Also in the second embodiment, as in the first embodiment, when the 30-minute period process (FIG. 22) by CEMS 31 ends and controller 43 completes the reception of the storage battery operation plan, controller 43 executes the sequential process (FIG. 23). The storage battery operation plan is a plan for 30 minutes and includes a power command value for power distribution grid storage battery 40, a reactive power command for the AC grid, and various control parameters (parameters for the control units in second virtual synchronous generator control circuit 436 and inverter voltage control circuit 4095, and the like).

Specifically, in the sequential process, as in the first embodiment, controller 43 collects the measurement data from power distribution grid storage battery power conversion device 44, and samples the AC current and the AC voltage of power distribution grid 24 that are output from current/voltage measurement device 42 in a predetermined sampling period. As in the first embodiment, controller 43 performs the process of detecting the zero cross point time of the grid AC voltage in second phase detection circuit 431, and performs the process of calculating the effective active power and the effective reactive power in effective power calculation circuit 432. Effective power calculation circuit 432 also calculates the effective voltage and the effective current using the grid AC voltage and the grid AC current that have been measured.

Based on the output of current/voltage measurement device 42 and the power command value received from CEMS 31, controller 43 calculates a frequency command value (f*) and a voltage amplitude command value (V*) notified from second virtual synchronous generator control circuit 436 to power distribution grid storage battery power conversion device 44. After completion of the calculation of the frequency command value and the voltage amplitude command value, controller 43 notifies power distribution grid storage battery power conversion device 44 about the calculated frequency command value and voltage amplitude command value and the control parameters for voltage control received from CEMS 31. Thus, the sequential process by controller 43 ends.

Also in the present second embodiment, as in the first embodiment, the sequential process of controller 43 is executed in each one period of the grid AC voltage as shown in FIG. 18. As described in the first embodiment, the sequential process may be performed in each of multiple periods or each half period of the grid AC voltage.

Then, the operation of controller 43 will be described with reference to FIGS. 30 and 31. When controller 43 starts to operate, management circuit 435 initializes various control parameters to predetermined initial values. When management circuit 435 completes the initialization, it checks communication interface 434 whether or not the frequency command value and the like have been received from CEMS 31. When the frequency command value and the like have been received, the received various pieces of information is written into a register (not shown) in management circuit 435.

On the other hand, second phase detection circuit 431 and effective power calculation circuit 432 perform frequency detection of the grid AC voltage and calculation of the effective active power and the effective reactive power, using the voltage measurement value and the current measurement value of the grid AC voltage output from current/voltage measurement device 42.

Also in the second embodiment, second phase detection circuit 431 detects the zero cross point of the grid AC voltage and calculates the frequency based on the detection result, as in the first embodiment. Second phase detection circuit 431 detects the zero cross point of the grid AC voltage. As described above, the zero cross point detection time is calculated in the same manner as described with reference to FIG. 20 and the equation (6), and the frequency detection value can be obtained according to the equation (8). Further, effective power calculation circuit 432 calculates the effective active power and the effective reactive power using the results of measurement of the voltage and the current of the grid AC voltage, in the same manner as described in the first embodiment.

When detecting the zero cross point, management circuit 435 checks whether or not the power command value, the reactive power command value, and the control parameters for second virtual synchronous generator control circuit 436 and the like have been received from CEMS 31. When these values and parameters have been received, the effective power command value, the reactive power command value, and the control parameters to be output to second virtual synchronous generator control circuit 436 that are stored in a register (not shown) in management circuit 435 are rewritten at the timing of detection of the zero cross point.

Also in the second embodiment, one period of the grid AC voltage is assumed to be a control period as in the first embodiment, but the control period can be an integer multiple of the period of the grid AC voltage or can be a predetermined time length as in the first embodiment.

In FIG. 31, each time the control period elapses, management circuit 435 instructs second virtual synchronous generator control circuit 436 to generate a frequency (a frequency command value) and an amplitude (a voltage amplitude command value) of the grid AC voltage to be used in power distribution grid storage battery power conversion device 44.

Also in the second embodiment, as in the first embodiment, each time second phase detection circuit 431 detects the zero cross point of the grid AC voltage, second virtual synchronous generator control circuit 436 calculates the frequency command value of the grid AC voltage. Thus, also in the second embodiment, as in the first embodiment, the control period is equivalent to the period in which the zero cross point shown in FIG. 20 is detected by second phase detection circuit 431.

In FIG. 31, the operations of subtractor 4331, governor control circuit 4332, adder 4333, subtractor 4334, and mass point-system computation circuit 4335 for controlling the actually measured grid AC voltage from second phase detection circuit 431 and the actually measured effective active power from effective power calculation circuit 432 to be set at target frequency Fref (for example, 60 Hz) and the power target value (Pref) are the same as those in the first embodiment, and thus, the detailed description thereof will not be repeated. Thereby, mass point-system computation circuit 4335 outputs the same phase information and frequency command value (f*) as those in the first embodiment. As in the first embodiment, the phase information and the frequency command value output from mass point-system computation circuit 4335 are input to management circuit 435.

In the second embodiment, second virtual synchronous generator control circuit 436 has an AVR function performed by subtractor 4336, proportional control circuit 4337, and limiter circuit 4338 that are additionally disposed. Specifically, in accordance with the effective reactive power command notified from CEMS 31, second virtual synchronous generator control circuit 436 generates a voltage amplitude command value notified to power distribution grid storage battery power conversion device 44. The reactive power command value is notified to management circuit 435 via communication interface 434 and stored in a register (not shown) in management circuit 435. At this time, when CEMS 31 notifies about the information such as the proportional gain of proportional control circuit 4337 and the limit value of limiter circuit 4338 that are used in AVR control, the register values in management circuit 435 are rewritten into the received numerical values.

The AVR function (control) will be described in detail with reference to FIG. 31. The effective reactive power command notified from CEMS 31 is input to subtractor 4336 from a register (not shown) in management circuit 435. Subtractor 4336 subtracts the actually measured effective reactive power value calculated by effective power calculation circuit 432 from the effective reactive power command.

The output of subtractor 4336, i.e., the effective reactive power deviation, is input to proportional control circuit

4337. Proportional control circuit 4337 performs a proportional control computation based on the proportional gain notified from CEMS 31. The output of proportional control circuit 4337 is input to limiter circuit 4338. Limiter circuit 4338 performs a limiting process for setting the input voltage amplitude command value to fall within the amplitude limit value range (for example, 6600 V±330 V) notified from CEMS 31. In this way, the voltage amplitude command value is generated to control the actually measured effective reactive power to be set at the effective reactive power command.

The output of limiter circuit 4338, i.e., the voltage amplitude command value obtained after the limiting process, is input to management circuit 435. When second virtual synchronous generator control circuit 436 completes generation of the frequency command value and the voltage amplitude command value, management circuit 435 converts each of these generated command values, together with the control parameters notified from CEMS 31 and contained in inverter voltage control circuit 4095, into a prescribed format in communication interface 434. The converted various pieces of data are notified to power distribution grid storage battery power conversion device 44.

Then, the operation of inverter voltage control circuit 4095 according to the second embodiment will be described with reference to FIGS. 28 and 29.

When the start-up of the microgrid by the standalone operation is started, fourth control circuit 409 initializes various control parameters in power distribution grid storage battery power conversion device 44, and, upon completion of the initialization, instructs inverter voltage control circuit 4095 to start voltage control.

Upon receipt of the instruction, inverter voltage control circuit 4095 starts voltage control. When voltage control is started, fourth sinusoidal wave generation circuit 40956 in inverter voltage control circuit 4095 generates a target value of the grid AC voltage (target AC voltage Vtr) for voltage control based on the frequency command value and the voltage amplitude command value notified from controller 43 and a sampling interval ΔT that are input from eighth control circuit 4097.

Then, the operation of fourth sinusoidal wave generation circuit 40956 according to the second embodiment will be described with reference to FIG. 29. In the first embodiment, target AC voltage Vtr was controlled to detect the zero cross point (zero cross point time) of the grid AC voltage output from power distribution grid storage battery power conversion device 44, and, based on the zero cross timing, switch the frequency command value and the voltage amplitude command value notified from controller 43 that are used in calculation of target AC voltage Vtr. By such control, the continuity of target AC voltage Vtr was ensured so as to minimize the disturbance occurring in switching of the frequency command value and the voltage amplitude command value.

On the other hand, in the second embodiment, the frequency command value notified from controller 43 is reflected in target AC voltage Vtr without detecting the zero cross point.

In FIG. 29, the frequency command value notified from CEMS 31 is stored in a register (not shown) in eighth control circuit 4097. The frequency command value (f*) output from eighth control circuit 4097 is input to multiplier 409551.

Multiplier 409551 multiplies the frequency command value by 2π to calculate angular velocity ω that is then multiplied in multiplier 409552 by sampling interval ΔT (for example, 50 [μs]) output from eighth control circuit 4097 to thereby calculate phase change amount Δθ. As described above, phase change amount Δ corresponds to the phase change amount in the time period of sampling interval ΔT that occurs when target AC voltage Vtr (sinusoidal wave) is generated with reflection of frequency command value f*.

Phase change amount Δθ output from multiplier 409552 is added by adder 409553 to the phase change amount occurring before one period (ΔT) held in register 409558. Thereby, a phase angle θ0 of the sinusoidal wave corresponding to target AC voltage Vtr is calculated.

The output (the result of addition) of adder 409553 is output to divider 409554 and subtractor 409557. The output of adder 409553 is divided by 2π by divider 409554, and the result of this division is processed by truncation circuit 409555 such that digits after a decimal point are truncated.

By multiplier 409556, the output of truncation circuit 409555 is multiplied by 2. The output of multiplier 409556 is input to subtractor 409557 and subtracted from the output of adder 409553.

The following is a brief description of the above-described series of processes performed by divider 409554, truncation circuit 409555, and multiplier 409556 performed on the output of adder 409553. These processes are performed for setting the phase information of the sinusoidal wave occurring when generating target AC voltage Vtr to fall within a range of 0≤0<2π.

Phase angle θ0 output from adder 409553 can be expressed by the following equation (10) using a natural number n. Note that θ' in the equation (10) satisfies the condition of 0≤θ'<2π.

$$\theta 0 = 2\pi \times n + \theta' \qquad (10)$$

By dividing this θ0 by 2π, divider 409554 outputs θ0/2π=n+(θ'/2π). By processing the output of divider 409554 such that digits after a decimal point are truncated, "n" in the equation (10) is output from truncation circuit 409555.

Multiplier 409556 multiplies the output of truncation circuit 409555 by 2π to output (2π×n) in the equation (10). In subtractor 409557, (2π×n) of multiplier 409556 is subtracted from the output (θ0) of adder 409553. Thus, θ' in the equation (10) is output from subtractor 409557. In this way, θ' is extracted from output θ0 of adder 409553 and input to sinusoidal wave table 409559 as sinusoidal wave phase information θ (0≤θ<2π). Phase information θ is input also to register 409558 so as to be output to adder 409553 with a delay of one period.

Sinusoidal wave table 409559 can be configured by causing a memory such as a read only memory (ROM) to store, in advance, the sinusoidal wave amplitude information (−1 to 1) with respect to the input phase information (the phase angle) θ (0)≤θ<2π). When sinusoidal wave table 409559 receives the phase information (phase angle θ) input from subtractor 409557, it outputs the sinusoidal wave amplitude information (−1 to 1) with respect to the input phase information. When it is desired to reduce the number of pieces of data to be stored in the table in order to reduce the memory size of the ROM or the like, the both adjacent data of the input phase angle (θ) can be read out from the table and interpolated by a method such as linear interpolation, as described above.

By multiplier 409560, the sinusoidal wave amplitude information (−1 to 1) output from sinusoidal wave table 409559 is multiplied by the voltage amplitude command value notified from controller 43 and stored in a register (not shown) of eighth control circuit 4097. As a result, multiplier 409560 outputs target AC voltage Vtr that is a target value for the grid AC grid. In this way, fourth sinusoidal wave generation circuit 40956 calculates target AC voltage Vtr using the sinusoidal wave phase angle calculated by integrating the phase change amount in a predetermined time interval (sampling period ΔT) at the angular velocity (2 π×f*) corresponding to the frequency command value (f*).

Target AC voltage Vtr output from fourth sinusoidal wave generation circuit 40956 generated in this manner is input to subtractor 40952 in FIG. 28. Subtractor 40952 subtracts, from target AC voltage Vtr, the measurement value of the grid AC voltage output from voltmeter 410 to calculate a voltage deviation. The voltage deviation output from subtractor 40952 is input to third PI control circuit 40953, and the control computation result used for compensating for the voltage deviation (i.e., for eliminating the voltage deviation to zero) is output from third PI control circuit 40953. Note that the control parameters used in third PI control circuit 40953 are input from eighth control circuit 4097. The values of the control parameters are controlled to be changed if CEMS 31 has notified about the changed control parameters.

The output of third PI control circuit 40953 is limited by first current limiting circuit 40955 such that the AC current output from power distribution grid storage battery power conversion device 44 does not exceed the capacity of power distribution grid storage battery power conversion device 44. Specifically, based on the results of measurement by ammeter 411, the limiting process of setting an upper limit for the output of third PI control circuit 40953 is performed.

The output of third PI control circuit 40953 that is obtained after the limiting process by first current limiting circuit 40955 is PWM-modulated by second PWM conversion circuit 40954 and converted into a control command value for second DC/AC conversion circuit 408. Second PWM conversion circuit 40954 outputs the control command value to second DC/AC conversion circuit 408. Second DC/AC conversion circuit 408 outputs a grid AC voltage to power distribution grid 24 in accordance with the control command value.

Further, also in the second embodiment, as in the first embodiment, based on the measurement value of the DC bus voltage measured by voltmeter 406, third control circuit 404 determines the electric power for charging or discharging of power distribution grid storage battery 40. Specifically, seventh control circuit 4044 in third control circuit 404 controls the charge/discharge power for power distribution grid storage battery 40 such that the voltage on DC bus 405 (the DC bus voltage) attains a predetermined target voltage. As described above, in the second embodiment, as in the first embodiment, virtual synchronous generator control is implemented in power distribution grid storage battery system 41, and second DC/AC conversion circuit 408 operates as a voltage source (voltage control). Thus, third control circuit 404 controls charging and discharging of power distribution grid storage battery 40 such that the DC bus voltage attains a constant value (a target voltage). Since the operation of third control circuit 404 is the same as that in the first embodiment, the detailed description thereof will not be repeated.

The present second embodiment is configured as described above. Thus, when frequency command value f* is switched, phase change amount Δθ (the output of multiplier 409553 in FIG. 29) changes, but the phase angle (phase information) input to sinusoidal wave table 409559 is managed so as not to be discontinuous. This makes it possible to ensure the continuity of target AC voltage Vtr at the time when frequency command value f* is switched. Thereby, even when the measurement delay and the processing delay in controller 43 as well as the communication delay between controller 43 and power distribution grid storage battery power conversion device 44 lead to variability in delay time that further leads to an uneven timing at which external controller 43 notifies power distribution grid storage battery power conversion device 44 about frequency command value f*, the continuity of the target value of the grid AC voltage (target AC voltage Vtr) can be ensured. As a result, virtual synchronous power generation control can be implemented by external controller 43 without causing unnecessary disturbance in the grid.

In the configuration as described above, as in the first embodiment, also in the conventional storage battery power conversion device (power distribution grid storage battery power conversion device 44) not implementing a virtual synchronous generator control function, the external controller is used to control the frequency of the grid AC voltage output from the storage battery power conversion device, to thereby make it possible to implement the virtual synchronous generator control function. Thereby, the existing conventional storage battery power conversion device can be configured to have a virtual synchronous generator control function by a small-scale modification, for example, by a modification of software, of changing the process (a functional portion of fourth sinusoidal wave generation circuit 40956) of generating a target value of the grid AC voltage (target AC voltage Vtr) output from power distribution grid storage battery power conversion device 44. Also in this case, even if an external controller notifies about the command values and the control parameters for virtual synchronous generator control as described above, the grid AC voltage can be stably controlled so as to accommodate jitter (variations) mainly caused by communication.

In the present second embodiment, the target value of the grid AC voltage (target AC voltage Vtr) targeted when second DC/AC conversion circuit 408 is controlled by voltage control is managed by the sinusoidal wave phase angle generated by reflecting frequency command value f* as described in the case of fourth sinusoidal wave generation circuit 40956, and thereby, frequency command value f* can be switched without waiting for the zero cross point as in the first embodiment. As a result, without providing a waiting time until detection of the zero cross point after the notification from CEMS 31, frequency command value f* can be changed immediately to calculate target AC voltage Vtr. Thus, the effect of the virtual synchronous generator control can be enhanced and thereby the stability of the system can be improved.

Note that the configuration of fourth sinusoidal wave generation circuit 40956 is not limited to that shown in FIG. 29, but the same effect can be achieved if fourth sinusoidal wave generation circuit 40956 is configured to manage the voltage phase of the sinusoidal wave when generating the target value of the grid AC voltage (target AC voltage Vtr) used when second DC/AC conversion circuit 408 in power distribution grid storage battery power conversion device 44 is operated by voltage control.

In the present second embodiment, the description has been given with regard to the case where the AVR function is implemented in controller 43, but the configuration of external controller 43 implementing the AVR function is not limited to the example shown in FIG. 31. For example, the same effect can be achieved by replacing proportional control circuit 4337 with a circuit that executes another control computation, such as a PI control circuit or a PID control circuit. Further, the notification from CEMS 31 is not limited to the effective reactive power command exemplified above, but the AVR function may also be implemented, for example, by direct notification of the voltage amplitude command value of the grid AC voltage output from power distribution grid storage battery power conversion device 44.

As described above, in the second embodiment, even if the command value from external controller 43 is received in various phases of the grid AC voltage when power distribution grid storage battery power conversion device 44 is operated as a voltage source using the command value from external controller 43, the sinusoidal wave phase angle indicating the target value of the grid AC voltage (target AC voltage Vtr) is controlled to be managed. Thereby, the continuity of target AC voltage Vtr at the time of changing of frequency command value f* can be ensured. As a result, the grid AC voltage can be output from power distribution grid storage battery power conversion device 44 so as to provide virtual synchronous generator control without causing unnecessary disturbance in the power distribution grid.

Third Embodiment

In each of the first and second embodiments, description has been given with regard to the method of implementing a virtual synchronous generator control function by controlling the frequency of the grid AC voltage output from the storage battery power conversion device using the external controller also in the conventional storage battery power conversion device (power distribution grid storage battery power conversion device 44) not implementing a virtual synchronous generator control function. In the third embodiment, still another method of generating the target value of the grid AC voltage (target AC voltage Vtr) will be described. Specifically, the AVR function of the grid AC voltage is implemented in the generation unit that generates the target value of the grid AC voltage (target AC voltage Vtr).

Figure 32:
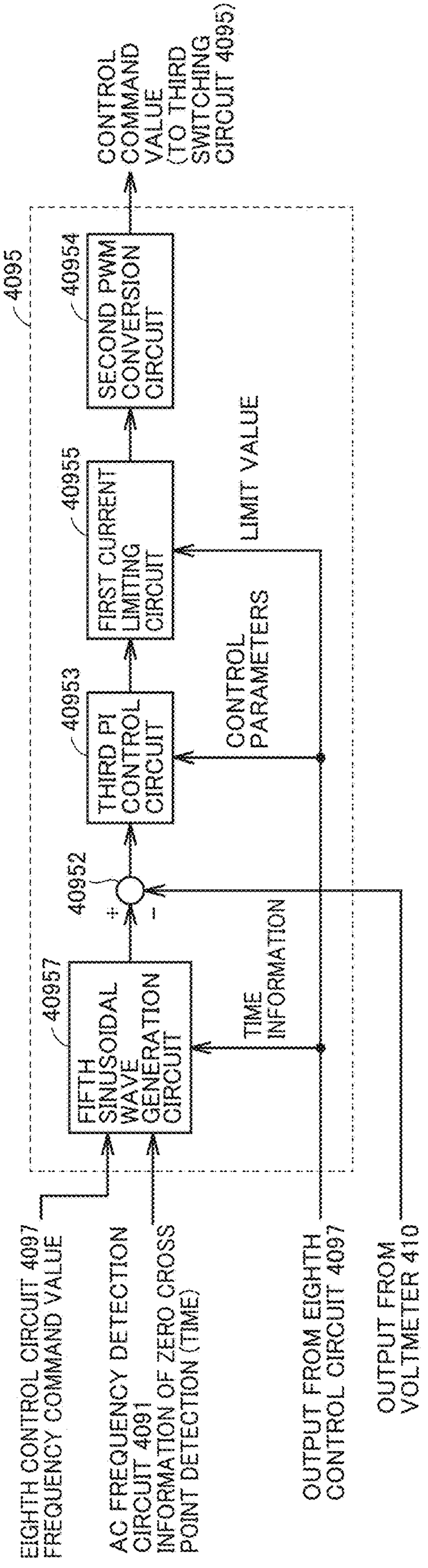
FIG. 32 is a block diagram illustrating a configuration of an inverter voltage control circuit in a power conversion device according to a third embodiment.
Figure 33:
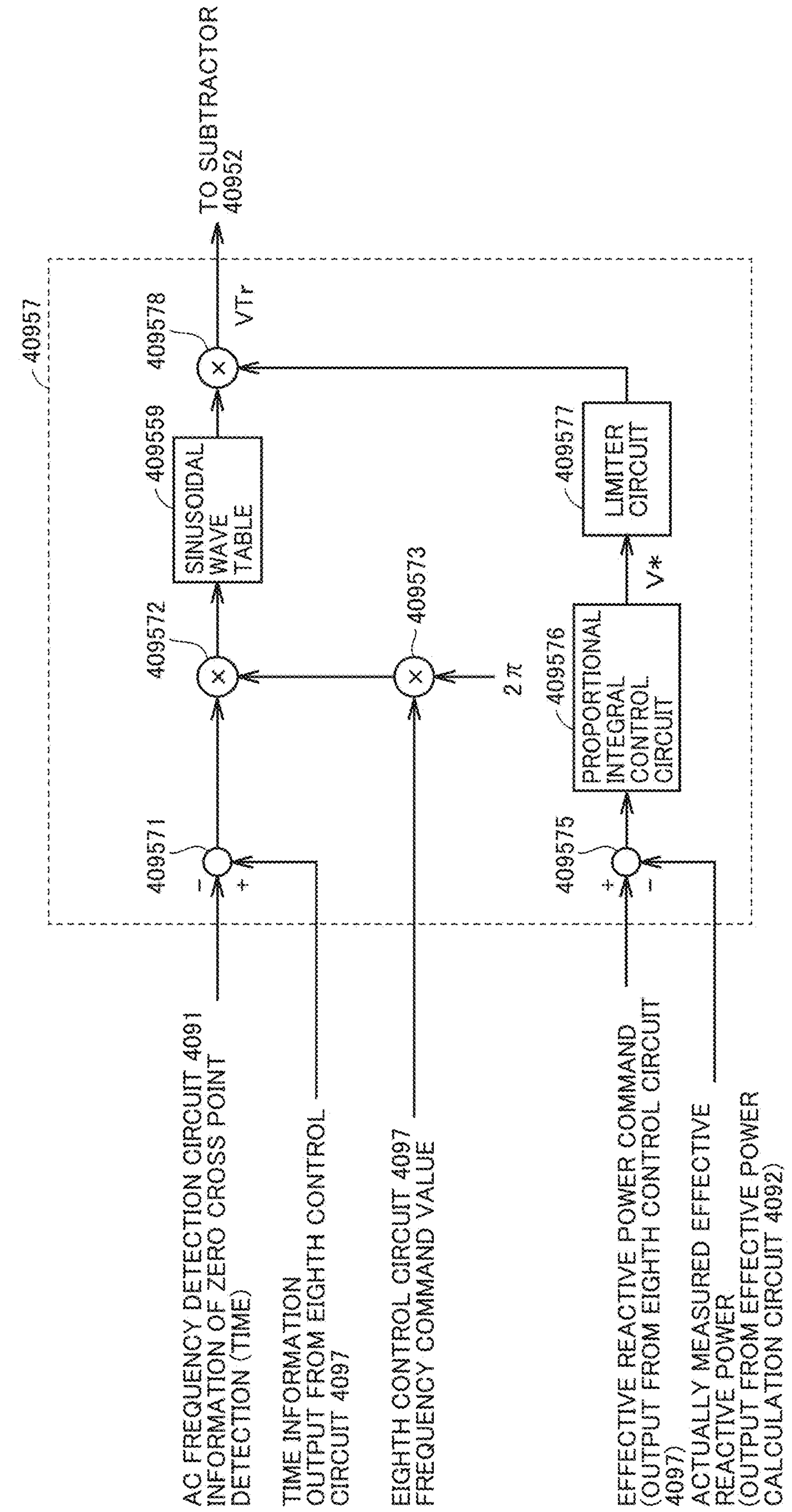
FIG. 33 is a block diagram illustrating a configuration of a fifth sinusoidal wave generation circuit shown in FIG. 32.

The following describes the operation of inverter voltage control circuit 4095 according to the third embodiment with reference to FIGS. 32 and 33. The third embodiment is identical in circuit configuration and the like to the second embodiment except only for a part of the control operation of second DC/AC conversion circuit 408 (specifically, the operation of inverter voltage control circuit 4095). In the third embodiment, the detailed description of the same portions in the first and second embodiments will not be repeated in principle.

FIG. 32 shows the configuration of inverter voltage control circuit 4095 in power distribution grid storage battery power conversion device 44 as a representative example of the power conversion device according to the third embodiment.

Inverter voltage control circuit 4095 according to the third embodiment is different from inverter voltage control circuit 4095 according to the first embodiment (FIG. 12) in that a fifth sinusoidal wave generation circuit 40957 is disposed in place of third sinusoidal wave generation circuit 40951. In other words, in the third embodiment, fifth sinusoidal wave generation circuit 40957 generates the target value of the grid AC voltage, i.e., target AC voltage Vtr, output from power distribution grid storage battery power conversion device 44.

As in FIG. 12, fifth sinusoidal wave generation circuit 40957 receives a frequency command value (f*) input from eighth control circuit 4097, and also receives zero cross point detection information input from AC frequency detection circuit 4091 (FIG. 10).

In FIG. 32 (the third embodiment), in inverter voltage control circuit 4095, fifth sinusoidal wave generation circuit 40957 corresponds to one example of the "target AC voltage generation unit", and subtractor 40952 and its subsequent components constitute one example of the "voltage control unit".

FIG. 33 is a block diagram illustrating the configuration of fifth sinusoidal wave generation circuit 40957 shown in FIG. 32.

Referring to FIG. 33, fifth sinusoidal wave generation circuit 40957 includes subtractors 409571 and 409575, multipliers 409572, 409573, and 409578, a sinusoidal wave table 409559, a proportional integral control circuit 409576, and a limiter circuit 409577.

Subtractor 409571 subtracts the current time (tn) indicated by the time information output from a time generation circuit (not shown) in eighth control circuit 4097 and the zero cross point time (tzcp_n) detected by AC frequency detection circuit 4091.

Multiplier 409573 multiplies frequency command value f* output from eighth control circuit 4097 by 2π and converts the resultant into an angular velocity (ω). Multiplier 409572 multiplies the output of subtractor 409571 by the output (angular velocity ω) of multiplier 409573. Thus, the output of multiplier 409572 corresponds to "$2\times\pi\times f^*\times(tn-tzcp\_n)$" indicating the phase angle of sin in the equation (9) for generating target AC voltage Vtr that has been described in the first embodiment.

It is assumed that the frequency information (frequency command value f*) notified from CEMS 31 is stored in a register (not shown) in eighth control circuit 4097 at the timing of detection of the zero cross point, as in the first embodiment.

Sinusoidal wave table 409559 is configured in the same manner as described in the second embodiment, and converts the phase angle output from multiplier 409572 into sinusoidal wave amplitude information (−1 to 1) and outputs the resultant.

From the effective reactive power command notified from CEMS 31, subtractor 409575 subtracts the actually measured value of the effective reactive power output from effective power calculation circuit 4092 (FIG. 10). It is assumed that the effective reactive power command value notified from CEMS 31 is acquired in a register (not shown) in eighth control circuit 4097 at the timing of detection of the zero cross point. The result of subtraction by subtractor 409575 is input to proportional integral control circuit 409576. Proportional integral control circuit 409576 performs proportional integral control (PI control) computation for eliminating the output of subtractor 409575 to zero. The output from proportional integral control circuit 409576 is input to limiter circuit 409577 as voltage amplitude command value V* of target AC voltage Vtr. Voltage amplitude command value V* that is obtained after the limiting process by limiter circuit 409577 is input to multiplier 409578.

Multiplier 409578 multiplies voltage amplitude command value V* output from limiter circuit 409577 and the amplitude information (−1 to 1) output from sinusoidal wave table 409559 to generate target AC voltage Vtr. As in the first and second embodiments, target AC voltage Vtr is output to subtractor 40952 (FIG. 32) in inverter voltage control circuit 4095. Since the configuration and the operation of inverter voltage control circuit 4095 described below are the same as those in the first or second embodiment, the description thereof will not be repeated.

Then, the operation of power distribution grid storage battery system 41 according to the third embodiment will be described with reference to FIGS. 1 to 16, 32, and 33. The detailed description of the same operations as those in the first and second embodiments will not be repeated.

Also in the third embodiment, as in the first or second embodiment, when the 30-minute period process (FIG. 22) by CEMS 31 ends and controller 43 completes reception of the storage battery operation plan, controller 43 executes the sequential process (FIG. 23). The storage battery operation plan is a plan for 30 minutes and includes a power command value for power distribution grid storage battery 40, a reactive power command for the AC grid, and various control parameters (parameters for the control units in virtual synchronous generator control circuit 433 and inverter voltage control circuit 4095, and the like).

Specifically, in the sequential process, as in the first or second embodiment, controller 43 collects the measurement data from power distribution grid storage battery power conversion device 44 and samples, in a predetermined sampling period, the AC current and the AC voltage of power distribution grid 24 that are output from current/voltage measurement device 42. As in the first or second embodiment, controller 43 performs the process of detecting the zero cross point time of the grid AC voltage in second phase detection circuit 431, and performs the process of calculating the effective active power and the effective reactive power in effective power calculation circuit 432. Effective power calculation circuit 432 also calculates the effective voltage and the effective current using the grid AC voltage and the grid AC current that have been measured.

Controller 43 causes the same virtual synchronous generator control circuit 433 as that in the first embodiment to calculate a frequency command value (f*) that is to be notified to power distribution grid storage battery power conversion device 44, based on the output of current/voltage measurement device 42 and the power command value received from CEMS 31. After completion of the calculation of the frequency command value, controller 43 notifies power distribution grid storage battery power conversion device 44 about the calculated frequency command value, and the effective reactive power command and the control parameters for voltage control that have been received from CEMS 31. Thereby, the sequential process by controller 43 ends.

Also in the present third embodiment, as in the first embodiment, the sequential process of controller 43 is performed in each one period of the grid AC voltage as shown in FIG. 18. As described in the first embodiment, the sequential process may be performed in each of multiple periods or each half period of the grid AC voltage.

Then, the operation of controller 43 will be described with reference to FIGS. 13 and 14. In other words, controller 43 is the same as that in the first embodiment. When controller 43 starts to operate, management circuit 435 initializes various control parameters to predetermined initial values. When management circuit 435 completes the initialization, it checks communication interface 434 whether or not the frequency command value and the like have been received from CEMS 31. When the frequency command value and the like have been received, the received various pieces of information are written in a register (not shown) in management circuit 435. On the other hand, second phase detection circuit 431 and effective power calculation circuit 432 perform frequency detection of the grid AC voltage and calculation of the effective active power and the effective reactive power using the voltage measurement value and the current measurement value of the grid AC voltage output from current/voltage measurement device 42.

Also in the third embodiment, as in the first embodiment, second phase detection circuit 431 detects the zero cross point of the grid AC voltage and calculates the frequency based on the detection result. Second phase detection circuit 431 detects the zero cross point of the grid AC voltage. As described above, the zero cross point detection time can be calculated in the same manner as described with reference to FIG. 20 and the equation (6), and the frequency detection value can be obtained according to the equation (8). With the use of the measurement results of the voltage and the current of the grid AC voltage, effective power calculation circuit 432 calculates the effective active power and the effective reactive power in the same manner as described in the first embodiment.

When detecting the zero cross point, management circuit 435 checks whether or not the power command value, the reactive power command value, the control parameters for virtual synchronous generator control circuit 433, and the like have been received from CEMS 31. When these values and parameters have been received, the active power command value, the reactive power command value, and the control parameters output to virtual synchronous generator control circuit 433 that are stored in a register (not shown) in management circuit 435 are rewritten at the timing of detection of the zero cross point.

Also in the third embodiment, one period of the grid AC voltage is assumed to be a control period as in the first embodiment, but the control period can be an integer multiple of the period of the grid AC voltage or can be a predetermined time length as described in the first embodiment.

Each time the control period elapses, management circuit 435 instructs virtual synchronous generator control circuit 433 to generate the frequency (the frequency command value) and the amplitude (the voltage amplitude command value) of the grid AC voltage to be used in power distribution grid storage battery power conversion device 44. In the third embodiment, each time second phase detection circuit 431 detects the zero cross point of the grid AC voltage, virtual synchronous generator control circuit 433 calculates the frequency command value of the grid AC voltage. Thus, also in the present third embodiment, the control period is equivalent to the period in which the zero cross point shown in FIG. 20 is detected by second phase detection circuit 431, as in the first embodiment.

In FIG. 14, from the actually measured frequency of the grid AC voltage from second phase detection circuit 431, subtractor 4331 subtracts target frequency Fref (for example, 60 [Hz]) of the grid AC voltage output from management circuit 435 and thereby calculates a frequency deviation. The frequency deviation output from subtractor 4331 is input to governor control circuit 4332. Since the operation of governor control circuit 4332 is the same as that in the first embodiment, the detailed description thereof will not be repeated.

The output of governor control circuit 4332 is added by adder 4333 to the power target value (Pref) output from management circuit 435. The power target value notified from CEMS 31 as described above is output from management circuit 435. The output of adder 4333 is subtracted by subtractor 4334 from the actually measured effective power output from effective power calculation circuit 432. The result of subtraction by subtractor 4334 is input to mass point-system computation circuit 4335. Since the operation of mass point-system computation circuit 4335 is the same as that in the first embodiment, the detailed description thereof will not be repeated. Thereby, mass point-system computation circuit 4335 outputs the same phase information and the same frequency command value (f*) as those in the first embodiment. As in the first embodiment, the phase information and the frequency command value output from mass point-system computation circuit 4335 are input to management circuit 435.

Then, the operation of inverter voltage control circuit 4095 according to the present third embodiment will be described with reference to FIGS. 32 and 33.

When the start-up of the microgrid is started by the standalone operation, fourth control circuit 409 first initializes various control parameters in power distribution grid storage battery power conversion device 44. When fourth control circuit 409 completes the initialization process, it instructs inverter voltage control circuit 4095 to start voltage control.

Upon receipt of the instruction, inverter voltage control circuit 4095 starts voltage control. When voltage control is started, fifth sinusoidal wave generation circuit 40957 in inverter voltage control circuit 4095 generates a target value of the grid AC voltage (target AC voltage Vtr) used during voltage control, based on the frequency command value (f*), the effective reactive power command value, the time information, and the like that have been notified from controller 43 and input via eighth control circuit 4097.

Then, the operation of fifth sinusoidal wave generation circuit 40957 according to the third embodiment will be described with reference to FIG. 33. In the first embodiment, in the case of generating target AC voltage Vtr, the zero cross point (zero cross point time) of the grid AC voltage output from power distribution grid storage battery power conversion device 44 is detected, and, based on the zero cross timing, the updated frequency command value and voltage amplitude command value notified from controller 43 are controlled to be reflected in target AC voltage Vtr. By such control, the continuity of target AC voltage Vtr can be ensured to minimize the disturbance occurring when changing the frequency command value and the voltage amplitude command value.

On the other hand, in the third embodiment, the frequency command value notified from controller 43 is reflected in target AC voltage Vtr by a method different from that in the first embodiment.

In FIG. 33, the frequency command value and the effective reactive power command value notified from CEMS 31 are stored in a register (not shown) in eighth control circuit 4097. Specifically, eighth control circuit 4097 is configured to acquire the frequency command value and the effective reactive power command value from communication interface 412 at the timing of detection of the zero cross point by AC frequency detection circuit 4091.

By multiplier 409573, the frequency command value (f*) output from eighth control circuit 4097 is multiplied by 2π and converted into an angular velocity. Subtractor 409571 subtracts the zero cross point detection time detected by AC frequency detection circuit 4091 from the current time indicated by the time information output from eighth control circuit 4097. Multiplier 409572 multiplies the output of subtractor 409571 by the angular velocity output from multiplier 409573. Thereby, as described above, the phase information (the phase angle) of the sinusoidal wave corresponding to the amplitude of the grid AC voltage (target AC voltage Vtr) is calculated. The output (the phase angle) of multiplier 409572 is input to the same sinusoidal wave table 409559 as that in the second embodiment. Thereby, sinusoidal wave table 409559 outputs the sinusoidal wave amplitude information (−1 to 1) with respect to the input phase information (the phase angle).

On the other hand, subtractor 409575 subtracts the actually measured value of the effective reactive power calculated by effective power calculation circuit 4092 from the effective reactive power command value notified from CEMS 31 and stored in a register (not shown) of eighth control circuit 4097. The output of subtractor 409575, i.e., the deviation of the effective reactive power with respect to the command value, is input to proportional integral control circuit 409576. Proportional integral control circuit 409576 performs proportional integral control (PI control) computation for compensating for the deviation output from subtractor 409575 (i.e., for eliminating the deviation to zero). The result of computation by proportional integral control circuit 409576 is input to limiter circuit 409557 as a voltage amplitude command value V* of target AC voltage Vtr and is subjected to limiter processing so as to fall within a prescribed range.

In the present third embodiment, by way of example, limiter circuit 409557 limits voltage amplitude command value V* such that the voltage amplitude command value V* of the input target AC voltage Vtr falls within a prescribed amplitude limit value range (for example, 6600 [V]±330 [V]), as in the second embodiment.

In the present third embodiment, as the control parameters (proportional gain and integration time) used in proportional integral control circuit 409576 and the amplitude limit value of limiter circuit 409577, the values notified from CEMS 31 and stored in a register (not shown) in eighth control circuit 4097 via controller 43 are assumed to be used. By multiplier 409578, the limiter-processed voltage amplitude command value V* output from limiter circuit 409577 is multiplied by the sinusoidal wave amplitude information (−1 to 1) output from sinusoidal wave table 409559. Thereby, multiplier 409578 generates target AC voltage Vtr. Target AC voltage Vtr is output to subtractor 40952 (FIG. 32) in inverter voltage control circuit 4095.

As a result, in FIG. 32, the actually measured value of the grid AC voltage output from voltmeter 410 is subtracted by subtractor 40952 from target AC voltage Vtr output from fifth sinusoidal wave generation circuit 40957, and thus, the grid AC voltage deviation is obtained. The grid AC voltage deviation output from subtractor 40952 is input to third PI control circuit 40953.

Third PI control circuit 40953 performs a control computation for compensating for the above-mentioned deviation output from subtractor 40952 (i.e., eliminating the deviation to zero). Note that the control parameters used in third PI control circuit 40953 are input from eighth control circuit 4097. The values of the control parameters are controlled to be changed if the changed control parameters are notified from CEMS 31.

The output of third PI control circuit 40953 is limited by first current limiting circuit 40955 such that the AC current output from power distribution grid storage battery power conversion device 44 does not exceed the capacity of power distribution grid storage battery power conversion device 44. Specifically, based on the results of measurement by ammeter 411, the limiting process for setting an upper limit for the output of third PI control circuit 40953 is performed.

The output of third PI control circuit 40953 that is obtained after the limiting process by first current limiting circuit 40955 is PWM-modulated by second PWM conversion circuit 40954 and converted into a control command value of second DC/AC conversion circuit 408. Second PWM conversion circuit 40954 outputs the control command value to second DC/AC conversion circuit 408. Second DC/AC conversion circuit 408 outputs a grid AC voltage to power distribution grid 24 in accordance with the control command value.

Also in the third embodiment, as in the first embodiment, based on the measurement value of the DC bus voltage measured by voltmeter 406, third control circuit 404 determines the electric power for charging or discharging of power distribution grid storage battery 40. Specifically, seventh control circuit 4044 in third control circuit 404 controls the charge/discharge power of power distribution grid storage battery 40 such that the voltage on DC bus 405 (the DC bus voltage) attains a predetermined target voltage. As described above, in the third embodiment, as in the first embodiment, virtual synchronous generator control is implemented in power distribution grid storage battery system 41, and second DC/AC conversion circuit 408 operates as a voltage source (voltage control). Thus, third control circuit 404 controls charging and discharging of power distribution grid storage battery 40 such that the DC bus voltage attains a constant value (a target voltage). Since the operation of third control circuit 404 is the same as that in the first embodiment, the detailed description thereof will not be repeated.

Since the present third embodiment is configured as described above, the input value to sinusoidal wave table 409559, i.e., the phase angle of sin indicating target AC voltage Vtr, is calculated from: the time difference between the time of detection of the zero cross point and the current time; and frequency command value f* updated at the timing of detection of the zero cross point. Therefore, even when frequency command value f* notified from CEMS 31 changes, the phase angle of target AC voltage Vtr is managed so as not to be discontinuous. This makes it possible to ensure the continuity of target AC voltage Vtr at the time when frequency command value f* is switched. Thereby, even when the measurement delay and the processing delay in controller 43 as well as the communication delay between controller 43 and power distribution grid storage battery power conversion device 44 lead to variability in delay time that further leads to an uneven timing at which external controller 43 notifies power distribution grid storage battery power conversion device 44 about frequency command value f*, the continuity of the target value of the grid AC voltage (target AC voltage Vtr) can be ensured. As a result, virtual synchronous power generation control can be implemented by external controller 43 without causing unnecessary disturbance in the grid.

In the configuration as described above, as in the first and second embodiments, also in the conventional storage battery power conversion device not implementing a virtual synchronous generator control function, the external controller is used to control the frequency of the grid AC voltage output from the storage battery power conversion device, to thereby make it possible to implement the virtual synchronous generator control function. Thereby, the existing conventional storage battery power conversion device can be configured to have a virtual synchronous generator control function by a small-scale modification, for example, by a modification of software, of changing the process (a functional portion of fifth sinusoidal wave generation circuit 40957) of generating a target value of the grid AC voltage (target AC voltage Vtr) output from power distribution grid storage battery power conversion device 44. Also in this case, even if an external controller notifies about the command values and control parameters for virtual synchronous generator control as described above, the grid AC voltage can be stably controlled so as to accommodate jitter (variations) mainly caused by communication.

In the present third embodiment, the sinusoidal wave phase angle indicating the target value of the grid AC voltage (target AC voltage Vtr) targeted when second DC/AC conversion circuit 408 is controlled by voltage control is calculated using: the frequency command value updated at the timing of detection of the zero cross point; and the time difference between the time of detection of the zero cross point and the current time, as described with reference to fifth sinusoidal wave generation circuit 40957. Thus, by managing the phase angle of the sinusoidal wave so as not to be discontinuous, the stability of the system can be improved as in the first embodiment.

Note that the configuration of fifth sinusoidal wave generation circuit 40957 is not limited to that shown in FIG. 33, but the same effect can be achieved if fifth sinusoidal wave generation circuit 40957 is configured to manage the voltage phase of the sinusoidal wave when generating the target value of the grid AC voltage (target AC voltage Vtr) targeted when second DC/AC conversion circuit 408 in power distribution grid storage battery power conversion device 44 is operated by voltage control.

Further, in the present third embodiment, the description has been given with regard to the case where the AVR function is implemented in power distribution grid storage battery power conversion device 44, but the location where the AVR function is implemented is not particularly limited as can be understood from the second embodiment. In other words, the AVR function may be implemented in external controller 43 in place of power distribution grid storage battery power conversion device 44. Further, when proportional integral control circuit 409576 shown in FIG. 33 is replaced with a circuit that executes other control computations for a proportional control circuit or a PID control circuit, the same effect can also be achieved. Further, as described in the second embodiment, the notification from CEMS 31 is not limited to the exemplified effective reactive power command, but the AVR function may be implemented, for example, by direct notification of the voltage amplitude command value of the grid AC voltage output from power distribution grid storage battery power conversion device 44, as in the first embodiment.

As described above, in the third embodiment, even if the command value from external controller 43 is received in various phases of the grid AC voltage when power distribution grid storage battery power conversion device 44 is operated as a voltage source using the command value from external controller 43, the sinusoidal wave phase angle indicating the target value of the grid AC voltage (target AC voltage Vtr) is controlled to be managed. Thereby, the continuity of target AC voltage Vtr at the time of changing of frequency command value f* can be ensured. As a result, the grid AC voltage can be output from power distribution grid storage battery power conversion device 44 so as to provide virtual synchronous generator control without causing unnecessary disturbance in the power distribution grid.

The present first to third embodiments are configured as described above.

Thus, even in a configuration in which virtual synchronous generator control is implemented in controller 43 external to power distribution grid storage battery power conversion device 44, and the frequency command value is communicated from controller 43 to power distribution grid storage battery power conversion device 44, unnecessary disturbance can be prevented from occurring in power distribution grid 24 when the frequency command value is changed. Specifically, there occur: a measurement delay in controller 43 (delay time occurring when calculating the effective power and detecting the AC frequency): a processing delay (processing time in calculation of a frequency command value and the like based on the measurement result); and a communication delay occurring when giving a notification about the frequency command value from controller 43 to power distribution grid storage battery power conversion device 44. Even when variations of the sum of these delay times cause jitter (variation) on the voltage phase at the timing at which the frequency command value or the voltage amplitude command value reaches power distribution grid storage battery power conversion device 44, the continuity of target AC voltage Vtr can be ensured. Thereby, power distribution grid storage battery power conversion device 44 can be operated as a voltage source so as to implement a virtual synchronous power generation control function by external controller 43 without causing unnecessary disturbance in power distribution grid 24.

Further, in the present first to third embodiments, in the configuration as described above, also in the conventional storage battery power conversion device (power distribution grid storage battery power conversion device 44) not implementing a virtual synchronous generator control function, by using the external controller having the function of controller 43, the frequency and the like of the grid AC voltage output from the storage battery power conversion device can be controlled by the virtual synchronous generator control function. Thereby, even in the existing storage battery power conversion device, the virtual synchronous generator control function can be provided by a small-scale modification as described above, for example, by a modification of software, for the process of calculating the target value of the grid AC voltage (target AC voltage Vtr).

In the present first and third embodiments, the target value of the grid AC voltage (target AC voltage Vtr) targeted when second DC/AC conversion circuit 408 is controlled by voltage control is generated by third sinusoidal wave generation circuit 40951 and fifth sinusoidal wave generation circuit 40957, while managing the sinusoidal wave phase angle calculated using the frequency command value and the time information (information about the current time and the time of detection of the zero cross points detected by AC frequency detection circuit 4091). This makes it possible to improve the stability of the system even when controller 43 notifies power distribution grid storage battery power conversion device 44 about various command values at irregular timings.

Further, in the present second embodiment, in the configuration in which the phase angle of the sinusoidal wave is generated from frequency command value f* and sampling interval ΔT when generating the target value of the grid AC voltage (target AC voltage Vtr), the same effect can be achieved as a matter of course even if this configuration is different from that of fourth sinusoidal wave generation circuit 40956 in FIG. 29. In other words, the configurations of fourth sinusoidal wave generation circuit 40956 and fifth sinusoidal wave generation circuit 40957 exemplified in the second and third embodiments are not limited to the examples illustrated in FIGS. 29 and 33, and the same effect can be achieved as a matter of course by configuring fourth sinusoidal wave generation circuit 40956 and fifth sinusoidal wave generation circuit 40957 so as to manage the phase angle of the sinusoidal wave when generating the target value of the grid AC voltage (target AC voltage Vtr) targeted when second DC/AC conversion circuit 408 in power distribution grid storage battery power conversion device 44 is operated by voltage control.

Further, as described in the present second and third embodiments, the AVR function can be implemented in each of power distribution grid storage battery power conversion device 44 and controller 43. Further, also for the control computation for the AVR function, any method such as P (proportional) control, PI (proportional integral) control, and PID (proportional integral differential) control can be applied. Further, CEMS 31 may directly notify power distribution grid storage battery power conversion device 44 about the voltage amplitude command value of the grid AC voltage output from power distribution grid storage battery power conversion device 44.

In the first to third embodiments, the description has been given with regard to an example in which frequency command value f* and voltage amplitude command value V* used for calculating target AC voltage Vtr are obtained by different methods, but the method of obtaining frequency command value f* (the first to third embodiments) and the method of obtaining voltage amplitude command value V* (the first to third embodiments) can be arbitrarily combined. For example, in the case where frequency command value f* is obtained by fourth sinusoidal wave generation circuit 40956 (the second embodiment), voltage amplitude command value V* may be the value notified from CEMS 31 to controller 43 as in the first embodiment, or may be set such that an AVR function is implemented in power distribution grid storage battery power conversion device 44 as in the third embodiment.

As described above, in the first to third embodiments, when power distribution grid storage battery power conversion device 44 is operated as a voltage source using the command value from external controller 43, even if the command value from controller 43 is received in various phases of the grid AC voltage, the continuity of target AC voltage Vtr at the time of changing of frequency command value f* can be ensured. This makes it possible to output the grid AC voltage from power distribution grid storage battery power conversion device 44 so as to provide virtual synchronous generator control without causing unnecessary disturbance in the power distribution grid.

In the present first to third embodiments, as to the control parameters for virtual synchronous generator control circuit 433 in controller 43 and inverter voltage control circuit 4095 in power distribution grid storage battery power conversion device 44 in power distribution grid storage battery system 41, different values are set by CEMS 31 depending on the number of static inverter power supplies implementing virtual synchronous generator control in the standalone grid, or depending on the number and type of distributed power supplies operating as a voltage source for synchronous generators and the like. Specifically, for example, in the case where two power distribution grid storage battery systems 41 are connected, when the load or the power generation amount abruptly changes in the standalone microgrid, the frequency of the grid AC voltage output from power distribution grid storage battery system 41 changes with delay from the change in electric power output from power distribution grid storage battery system 41. Thus, the phases of the grid AC voltages output from two power distribution grid storage battery systems 41 deviate from the optimum control point, which may cause a cross current between the two power distribution grid storage battery systems 41. At this time, if the response speed of the voltage control unit (inverter voltage control circuit 4095) in each power distribution grid storage battery system 41 is too high, the cross current disperses, with the result that the standalone microgrid may stop.

Accordingly, in the present first to third embodiments, CEMS 31 is configured to send the control parameters for the voltage control unit (inverter voltage control circuit 4095) to each power distribution grid storage battery system 41 according to the number of power distribution grid storage battery systems 41 each implementing a virtual synchronous generator control function and operating as a voltage source in the microgrid. Thereby, also when the standalone microgrid is configured of a plurality of power distribution grid storage battery systems 41 each implementing a virtual synchronous generator control function, the stability of the standalone microgrid can be ensured by setting the control parameters in inverter voltage control circuit 4095 in each power distribution grid storage battery power conversion device 44 so as to achieve an optimum response time according to the above-mentioned number of power distribution grid storage battery systems 41. Specifically, the control parameters are set such that, as the number of power distribution grid storage battery systems 41 (i.e., power distribution grid storage battery power conversion devices 44) operating as a voltage source is larger, the response time of the voltage control by inverter voltage control circuit 4095 becomes longer (the response speed becomes lower).

More specifically, in each of the first to third embodiments, when the standalone microgrid is configured of a plurality of power distribution grid storage battery systems 41 each implementing a virtual synchronous generator control function as in the first embodiment, the control parameters notified from CEMS 31 are set so as to decrease the control gain of third PI control circuit 40953 or lengthen the integration time, or so as to decrease the control gain and lengthen the integration time, in order to lengthen the response time (decrease the response speed) of inverter voltage control circuit 4095 as compared with the case where the standalone microgrid is configured of one power distribution grid storage battery system 41.

Similarly, also in the interconnection grid, the synchronous generator supporting the grid quickly responds. Thus, in order to ensure the stability of the power grid, it is preferable to change the response time (the response speed) of inverter voltage control circuit 4095 in power distribution grid storage battery power conversion device 44 from that in the case of supporting the standalone microgrid. Specifically, as to the response time with respect to the load fluctuation or the change in power generation amount, the control parameters notified from CEMS 31 are set such that the response time in the case of the operation of the interconnection grid is longer than the response time in the case where the standalone microgrid is supported by one power distribution grid storage battery system 41 implementing a virtual synchronous generator control function.

Thereby, also when power distribution grid storage battery system 41 implementing a virtual synchronous generator control function is operated to be interconnected to the grid, the inertial force can be applied to the grid without causing unnecessary disturbance in power distribution grid 24.

Similarly, in the present first to third embodiments, the control parameters for virtual synchronous generator control circuit 433 in controller 43 are also notified from CEMS 31 to controller 43. Also in this case, as described above, when external controller 43 is configured to have a virtual synchronous generator control function, there occurs a measurement delay, a processing delay, and a communication delay before a frequency command value is transmitted to power distribution grid storage battery power conversion device 44. Therefore, a delay time occurs before the frequency command value obtained by the virtual synchronous generator control is reflected in the grid AC frequency output from power distribution grid storage battery power conversion device 44. Accordingly, when a load fluctuation or a change in power generation amount occurs in the standalone microgrid, a plurality of power distribution grid storage battery systems 41 each implementing a virtual synchronous generator control function changes the output power (the grid AC voltage) of power distribution grid storage battery power conversion device 44 in response to the load fluctuation or the change in power generation amount, but the frequency does not change immediately in response to the command value from controller 43.

Thus, when the gain (particularly, braking coefficient Dg and speed adjustment rate Kgd) of virtual synchronous generator control circuit 433 in controller 43 is high and the response time of the virtual synchronous generator control is short (the response speed is high), the frequency of the grid AC voltage output from each power distribution grid storage battery system 41 significantly changes. Thereby, an unnecessary electric power exchange occurs between power distribution grid storage battery systems 41, and thus, the frequency of the grid AC voltage output from each power distribution grid storage battery system 41 oscillates, with the result that power distribution grid storage battery system 41 may finally stop.

In the present first to third embodiments, when a plurality of power distribution grid storage battery systems 41 each implementing virtual synchronous generator control are connected to the standalone grid and operate as a voltage source, at least braking coefficient Dg of the virtual synchronous generator control is changed according to the number of power distribution grid storage battery systems 41. Specifically, as the number of power distribution grid storage battery systems 41 is larger, braking coefficient Dg is set to be larger. Thereby, even when a plurality of power distribution grid storage battery systems 41 each implementing virtual synchronous generator control are connected to the standalone grid and operate as a voltage source, inertial force can be applied to power distribution grid 24 without causing unnecessary disturbance in power distribution grid 24.

When the response speed of the virtual synchronous generator control unit (virtual synchronous generator control circuit 433 or second virtual synchronous generator control circuit 436) is decreased, the control parameters notified from CEMS 31 can be set so as to increase the governor time constant (Tg), decrease speed adjustment rate Kgd (i.e., increase 1/Kgd), increase unit inertia constant M, or increase braking coefficient Dg.

Further, also in the case where the AVR function exemplified in the second and third embodiments is implemented in controller 43 or power distribution grid storage battery power conversion device 44, when a plurality of power distribution grid storage battery systems 41 each implementing virtual synchronous generator control operate as a voltage source in the standalone grid in the same manner as described above, it is preferable to change the control parameters (the proportional gain, the integration time, and the like) depending on the number of power distribution grid storage battery systems 41. Specifically, the control parameters notified from CEMS 31 are set to be variable such that, as the number of power distribution grid storage battery systems 41 is larger, the response speed becomes lower (the response time becomes longer).

Similarly, also in the interconnection grid, the synchronous generator supporting the grid responds quickly. Thus, in order to ensure the stability of the power grid, it is preferable that the control parameters (particularly, braking coefficient Dg and speed adjustment rate Kgd) in virtual synchronous generator control circuit 433 in controller 43 are set so as to decrease the response speed of the frequency change in the grid AC voltage with respect to the load fluctuation or the change in power generation amount. Specifically, as to the response time with respect to the load fluctuation or the change in power generation amount, the control parameters notified from CEMS 31 are set such that the response time is longer in the case of the operation in the interconnection grid than in the case where the standalone microgrid is supported by one power distribution grid storage battery system 41 implementing a virtual synchronous generator control function. Thereby, even when power distribution grid storage battery system 41 implementing a virtual synchronous generator control function is interconnected to the grid also in the interconnection grid, inertial force can be applied to the grid without causing unnecessary disturbance.

Further, in the first to third embodiments, when the control parameters (including the AVR function) for the virtual synchronous generator control unit (virtual synchronous generator control circuit 433 or second virtual synchronous generator control circuit 436) and the control parameters for inverter voltage control circuit 4095 are determined, for example, a distribution grid model (digital twin) subsequent to substation 20 may be implemented in CEMS 31 to generate the information necessary for calculating each control parameter so as to implement an optimal operation in the use case assumed using the power distribution grid model. Further, artificial intelligence (AI) or the like may be implemented to calculate control parameters, as a matter of course.

In the first to third embodiments, the communication period between CEMS 31 and DSO 21 is assumed to be 30 minutes, but the communication period can be set to be an arbitrary time length. For example, as a matter of course, the communication period between CEMS 31 and each power distribution grid storage battery system 41 may be one minute or even shorter.

In the first to third embodiments, the description has been given with regard to the case where the virtual synchronous generator control is implemented in power distribution grid storage battery system 41, but the present disclosure is not necessarily applied only to the storage battery system, and may be applied also to the case where the virtual synchronous generator control is implemented in a power conversion device disposed between a power distribution grid and an energy creation device such as a wind power generator, and thereby, the same effect can be achieved. In particular, since the wind power generator rotates a motor with its propeller to thereby generate electric power, the generator side has inertial force, so that the same effect can be suitably achieved.

Further, in the first to third embodiments, the description has been given with regard to the case where several large-capacity storage batteries such as power distribution grid storage battery 40 are implemented in the power distribution grid, but virtual synchronous generator control can be implemented also in the power conversion device for household storage battery or the power conversion device for electric vehicle by the same control as that in CEMS 31 in the present first to third embodiments. In this case, several hundreds of power conversion devices to be connected to power distribution grid 24 are assumed to be provided. Further, as a capacity of the storage battery, even in an arrangement of both a large capacity storage battery (for example, several hundred [KW] to several [MW]) such as power distribution grid storage battery 40 and a household storage battery (several [KW]), the same effect can be achieved as a matter of course.

Further, in the present first to third embodiments, the description has been given with regard to power distribution grid storage battery system 41, but the present disclosure is not necessarily applied only to this example, but can be widely applied to a system in which a static inverter is controlled as a voltage source and the electric power generated by a solar cell (not limited to a mega solar cell but also a household solar cell), a wind power generator, and a fuel cell is supplied to a grid. In other words, also in these systems, as described in the present disclosure, the same effect can be achieved when the control parameters from an external controller are used to operate the power conversion device as a voltage source implementing virtual synchronous generator control. Further, in the present disclosure, a storage battery mounted in a vehicle such as an electric vehicle (EV), a plug-in hybrid electric vehicle (PHEV), or a fuel cell vehicle (FCV) is also applicable as a storage battery.

In the present first to third embodiments, examples of application to the standalone microgrid have been described, but the present disclosure is not necessarily applied only to such application, and the same effects can be achieved also by applying the present disclosure to a power transmission grid or a normal power distribution grid. Further, a single-phase alternating current is exemplified for a power distribution grid, but the present disclosure can be applied in common, as a matter of course, even when the power distribution grid is configured of a single-phase three-wire alternating current or a three-phase alternating current. Further, also in a configuration in which a power distribution grid storage battery power conversion device (three-phase alternating current) and a household storage battery system (single-phase alternating current) coexist, the same effect can be achieved by generating a target value of the AC voltage output from each power conversion device in the same manner as in the present disclosure based on the control parameters for a synchronous generator control function from an external controller.

In the present first to third embodiments, the governor model in governor control circuit 4332 is modeled as a first-order lag system, but the governor model can also be configured by a second-order lag system, a low pass filter (LPF), or the like. Further, in the present first to third embodiments, the mass point-system computation circuit is modeled by the integrator and the feedback loop shown in FIG. 16, but the modeling method is not limited to this example. For example, the mass point-system computation circuit can also be modeled by a first-order lag system, a second-order lag system, an LPF, or the like. Further, the configuration of mass point-system computation circuit 4335 is also not limited to the configuration shown in FIG. 16. Further, the configuration of virtual synchronous generator control circuit 433 for providing a virtual synchronous generator control function is not limited to the example shown in FIG. 14, but the virtual synchronous generator control function can be implemented by an arbitrary control configuration as long as the frequency command value of an inverter operating as a voltage source can be generated so as to simulate the characteristics of the synchronous generator.

In the present first to third embodiments, the description has been given with regard to an example in which a virtual synchronous generator control function is implemented in the power conversion device (power distribution grid storage battery power conversion device 44) that operates as a voltage source in order to apply inertial force to power distribution grid storage battery system 41, but the present disclosure can also be applied to the case where the control function as a voltage source different from the virtual synchronous generator control function is implemented in the power conversion device by a command from external controller 43.

For example, when implementing a drooping characteristic control function in place of the virtual synchronous generator control function, external controller 43 may notify a power conversion device (power distribution grid storage battery power conversion device 44) about the frequency command value.

Figure 35A:
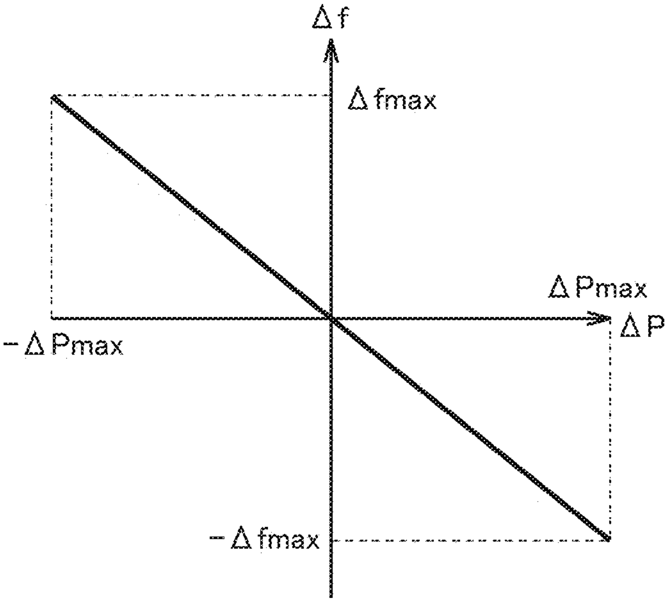
FIG. 35A is a first conceptual diagram illustrating an example of a drooping characteristic.
Figure 35B:
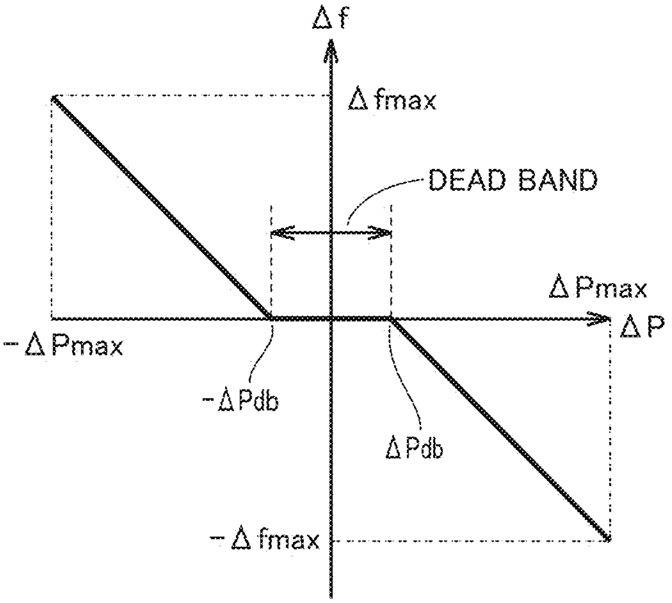
FIG. 35B is a second conceptual diagram illustrating an example of the drooping characteristic.

FIGS. 35A and 35B show conceptual diagrams for illustrating an example of the drooping characteristic.

In each of FIGS. 35A and 35B, the horizontal axis shows a power deviation ΔP corresponding to a difference between the electric power (the actually measured value) output from power distribution grid storage battery system 41 and the power target value notified from CEMS 31. Power deviation ΔP can be obtained in controller 43 shown in FIG. 13 by subtracting power target value Pref (as in FIG. 14) output from management circuit 435 from the actually measured effective power calculated by effective power calculation circuit 432.

Then, controller 43 can obtain a change amount Δf of the frequency command value with respect to the calculated power deviation ΔP according to the ΔP−Δf characteristic (drooping characteristic) shown in FIG. 35A or 35B. In the drooping characteristic shown in FIG. 35A, change amount Δf is calculated so as to be proportional to power deviation ΔP along with the limiting process of setting change amount Δf to fall within a range of −Δfmax to Δfmax. In the drooping characteristic shown in FIG. 35B, a condition Δf=0 is set such that frequency command value f* is maintained in a range (−ΔPdb≤ΔP≤ΔPdb) in which the absolute value of power deviation ΔP is small relative to the drooping characteristic shown in FIG. 35A.

Controller 43 can generate frequency command value f* of the power conversion device (power distribution grid storage battery power conversion device 44) for implementing the drooping characteristic by repeating the process of updating frequency command value f* to f*+Δf using Δf according to the drooping characteristic. Thereby, by a method different from virtual synchronous generator control circuit 433, controller 43 can implement the control for applying inertial force to a power conversion device (power distribution grid storage battery power conversion device 44) operating as a voltage source.

DESCRIPTION OF MODIFICATIONS

The present first to third embodiments have been described, for the sake of clarity of description, with reference to an example in which the control circuits in mega-solar power conversion device 27 and power distribution grid storage battery system 41 are configured by hardware (H/W) as shown in FIGS. 5 to 16 and the structure of CEMS 31 is also configured by hardware (H/W) as shown in FIGS. 3 to 4. However, even if the function of each block or some of the blocks shown in each block diagram is implemented by software (S/W) implemented on a central processing unit (CPU), the same control functions can be achieved. Alternatively, for at least some of the blocks, the same control function can also be implemented by dividing the functions of software and hardware.

It should be understood that the embodiments disclosed herein are illustrative and non-restrictive in every respect. The scope of the present disclosure is defined by the scope of the claims, rather than the description above, and is intended to include any modifications within the meaning and scope equivalent to the scope of the claims.

REFERENCE SIGNS LIST

20 substation, 21 power distribution automation system, 22*a*, 22*e*, 22*f*, 22*i*, 22*j*, 22*x*, 201, 206, 210, 401, 406, 410 voltmeter, 23*a*, 23*b*, 23*c* automatic voltage regulator, 24, 24*a*, 24*b*, 24*c*, 24*d* power distribution grid, 25, 45 communication line, 26 mega solar, 27 mega-solar power conversion device, 28 switch, 30*a*, 30*b* synchronous generator, 31 CEMS, 40, 40*a*, 40*b*, 40*c* power distribution grid storage battery, 41, 41*a*, 41*b*, 41*c* power distribution grid storage battery system, 42 current/voltage measurement device, 43 controller, 44, 44*a*, 44*b*, 44*c* power distribution grid storage battery power conversion device, 100*a*, 100*b*, 100*c*, 100*d* town, 101 factory, 102 building, 103 apartment, 202, 207, 211, 402, 407, 411 ammeter, 203 first DC/DC conversion circuit, 204 first control circuit, 205, 405 DC bus, 208 first DC/AC conversion circuit. 209 second control circuit, 212, 412, 434 communication interface, 311 communication circuit, 312 storage circuit, 314 operation plan creation circuit, 315 transmission data generation circuit, 316 distributed power supply management unit control circuit, 345, 435 management circuit, 403 second DC/DC conversion circuit. 404 third control circuit, 408 second DC/AC conversion circuit, 409 fourth control circuit, 431 second phase detection circuit, 432, 4092 effective power calculation circuit, 433 virtual synchronous generator control circuit, 436 second virtual synchronous generator control circuit, 2041 MPPT control circuit, 2042 voltage control circuit, 2043 first switching circuit, 2044 fifth control circuit, 2090 current control circuit, 2091, 40910 phase detection circuit, 2092 first sinusoidal wave generation circuit, 2094 first PI control circuit, 2097 sixth control circuit, 2098 second PI control circuit, 2099 first PWM conversion circuit, 3141 storage battery operation plan generation circuit, 3142 power generation amount prediction circuit, 3143 power consumption prediction circuit, 3145 distributed power supply operation plan creation management circuit, 3146 operation plan creation unit management circuit, 4041 charge control circuit, 4042 discharge control circuit, 4043 second switching circuit, 4044 seventh control circuit, 4091 AC frequency detection circuit, 4094 inverter current control circuit, 4095 inverter voltage control circuit, 4096 third switching circuit, 4097 eighth control circuit, 4332 governor control circuit, 4335 mass point-system computation circuit, 4337 proportional control circuit, 4338, 43323, 409557, 409577 limiter circuit, 40911 frequency detection circuit, 40912 second sinusoidal wave generation circuit, 40951 third sinusoidal wave generation circuit, 40953 third PI control circuit, 40954 second PWM conversion circuit, 40955 first current limiting circuit, 40956 fourth sinusoidal wave generation circuit, 40957 fifth sinusoidal wave generation circuit, 43322 first-order lag model, 43352 integrator, 43354, 409554 divider, 43356 phase calculation circuit, 409555 truncation circuit, 409558, 509558 register, 409559 sinusoidal wave table, 409576 proportional integral control circuit, Fref target frequency, Kgd speed adjustment rate, M unit inertia constant, M1 rotor, M2 regulation valve (governor), MPG synchronous generator model, Tg governor time constant, V* voltage amplitude command value, Vtr target AC voltage, f* frequency command value, tzc, tzcp detection time (zero cross point).

The invention claimed is:

1. A power conversion device that operates based on a command from a controller that controls a distributed power supply, the power conversion device comprising:

an inverter connected between an AC grid and the distributed power supply to operate as a voltage source for the AC grid based on the command;

a voltage measurement unit to measure a voltage value of a grid AC voltage output from the inverter to the AC grid;

a target AC voltage generation unit to generate a target AC voltage in a shape of a sinusoidal wave as an output target value of the inverter that operates as the voltage source; and a voltage control unit to control an operation of the inverter to compensate for a deviation between the voltage value measured by the voltage measurement unit and the target AC voltage, wherein the command from the controller includes a frequency command value of the grid AC voltage, and the target AC voltage generation unit calculates the target AC voltage using an amplitude command value of the grid AC voltage, the frequency command value output from the controller, and phase information of the grid AC voltage generated in the power conversion device.

2. The power conversion device according to claim 1, wherein the phase information is obtained from a periodic change in the voltage value measured by the voltage measurement unit.

3. The power conversion device according to claim 2, further comprising a phase detection unit to detect a zero cross point of the grid AC voltage based on the voltage value measured by the voltage measurement unit, wherein the frequency command value and the amplitude command value that are used for calculating the target AC voltage are updated at the zero cross point.

4. The power conversion device according to claim 3, wherein the target AC voltage generation unit generates the target AC voltage based on a phase angle of the sinusoidal wave as the phase information, the phase angle being calculated using an angular velocity corresponding to the frequency command value with respect to a phase angle at the zero cross point.

5. The power conversion device according to claim 1, wherein the phase information is obtained from the frequency command value output from the controller.

6. The power conversion device according to claim 5, wherein the target AC voltage generation unit calculates the target AC voltage based on a phase angle of the sinusoidal wave as the phase information, the phase angle being calculated by integration of a phase change amount in a predetermined time interval at an angular velocity corresponding to the frequency command value output from the controller.

7. The power conversion device according to claim 1, wherein the command includes a control parameter for adjusting a response speed of the voltage control unit, and in a case where the power conversion device supports the AC grid as a standalone grid by operating alone as the voltage source or by operating, as the voltage source, in parallel with at least one another power conversion device as a group of a plurality of the power conversion devices, the control parameter is set such that the response speed of the voltage control unit is lower when the plurality of the power conversion devices operate as a voltage source than when the power conversion device operates alone as a voltage source.

8. The power conversion device according to claim 1, wherein the target AC voltage generation unit calculates the target AC voltage using the amplitude command value output from the controller.

9. The power conversion device according to claim 8, wherein the frequency command value is generated in the controller by a control computation for compensating for a deviation between an actually measured value of effective reactive power obtained from a voltage measurement value of the AC grid and a command value of the effective reactive power.

10. The power conversion device according to claim 1, wherein the target AC voltage generation unit generates the amplitude command value by a control computation for compensating for a deviation between an actually measured value of effective reactive power obtained from the voltage value measured by the voltage measurement unit and a command value of the effective reactive power, and calculates the target AC voltage using the calculated amplitude command value.

11. The power conversion device according to claim 1, wherein the controller generates the frequency command value by virtual synchronous generator control for causing the inverter operating as the voltage source to have a characteristic of a synchronous generator based on a command from a management device that manages the distributed power supply.

12. A power conversion system comprising:

a controller for a distributed power supply, a virtual synchronous generator control function of simulating a characteristic of a synchronous generator being implemented in the controller; and a power conversion device to operate based on a command from the controller, the power conversion device including an inverter connected between an AC grid and the distributed power supply to operate as a voltage source for the AC grid based on the command, a voltage measurement unit to measure a voltage value of a grid AC voltage output from the inverter to the AC grid, a target AC voltage generation unit to generate a target AC voltage in a shape of a sinusoidal wave as an output target value of the inverter that operates as the voltage source, and a voltage control unit to control an operation of the inverter to compensate for a deviation between the voltage value measured by the voltage measurement unit and the target AC voltage, wherein the command from the controller includes a frequency command value of the grid AC voltage, and the target AC voltage generation unit calculates the target AC voltage using an amplitude command value of the grid AC voltage, the frequency command value output from the controller, and phase information of the grid AC voltage generated in the power conversion device.

13. The power conversion system according to claim 12, wherein the phase information is obtained from a periodic change in the voltage value measured by the voltage measurement unit.

14. The power conversion system according to claim 13, wherein the power conversion device further includes a phase detection unit to detect a zero cross point of the grid AC voltage based on the voltage value measured by the voltage measurement unit, and the frequency command value and the amplitude command value that are used for calculating the target AC voltage are updated at the zero cross point.

15. The power conversion system according to claim 14, wherein the target AC voltage generation unit generates the target AC voltage based on a phase angle of the sinusoidal wave as the phase information, the phase angle being calculated using an angular velocity corresponding to the frequency command value with respect to a phase angle at the zero cross point.

16. The power conversion system according to claim 12, wherein the phase information is obtained from the frequency command value output from the controller.

17. The power conversion system according to claim 12, wherein the command includes a control parameter for adjusting a response speed of the voltage control unit, and in a case where the power conversion device supports the AC grid as a standalone grid by operating alone as the voltage source or by operating, as the voltage source, in parallel with at least one another power conversion device as a group of a plurality of the power conversion devices, the controller sets the control parameter such that the response speed of the voltage control unit is lower when the plurality of the power conversion devices operate as a voltage source than when the power conversion device operates alone as a voltage source.

18. The power conversion system according to claim 12, wherein the target AC voltage generation unit calculates the target AC voltage using the amplitude command value output from the controller.

19. The power conversion system according to claim 18, wherein the frequency command value is generated in the controller by a control computation for compensating for a deviation between an actually measured value of effective reactive power obtained from a voltage measurement value of the AC grid and a command value of the effective reactive power.

20. The power conversion system according to claim 12, wherein the target AC voltage generation unit generates the amplitude command value by a control computation for compensating for a deviation between an actually measured value of effective reactive power obtained from the voltage value measured by the voltage measurement unit and a command value of the effective reactive power, and calculates the target AC voltage using the calculated amplitude command value.

* * * * *